US012237605B2

(12) United States Patent
Pavlovic et al.

(10) Patent No.: US 12,237,605 B2
(45) **Date of Patent: *Feb. 25, 2025**

(54) SHIELDED ELECTRICAL CONNECTOR SYSTEM WITH INTERNAL SPRING COMPONENT

(71) Applicant: Eaton Intelligent Power Limited, Dublin (IE)

(72) Inventors: Slobodan Pavlovic, Novi, MI (US); Mohamad Zeidan, Bloomfield Hills, MI (US); Brantley Natter, Brighton, MI (US); James Dawson, Carol Stream, IL (US)

(73) Assignee: Eaton Intelligent Power Limited, Dublin (IE)

( * ) Notice: Subject to any disclaimer, the term of this patent is extended or adjusted under 35 U.S.C. 154(b) by 512 days.

This patent is subject to a terminal disclaimer.

(21) Appl. No.: 17/376,390

(22) Filed: Jul. 15, 2021

(65) Prior Publication Data

US 2021/0344132 A1 Nov. 4, 2021

Related U.S. Application Data

(63) Continuation of application No. PCT/US2020/013757, filed on Jan. 15, 2020.

(Continued)

(51) Int. Cl.

*H01R 13/24* (2006.01)
*H01R 4/48* (2006.01)

(Continued)

(52) U.S. Cl.

CPC ........... *H01R 13/2407* (2013.01); *H01R 4/48* (2013.01); *H01R 13/055* (2013.01);

(Continued)

(58) Field of Classification Search

CPC .... H01R 13/187; H01R 13/18; H01R 13/428; H01R 13/648; H01R 13/6581; H01R 4/48;

(Continued)

(56) References Cited

U.S. PATENT DOCUMENTS 4,201,438 A 5/1980 Shea
4,416,504 A 11/1983 Sochor (Continued)

FOREIGN PATENT DOCUMENTS

CN 2406375 Y 11/2000
CN 1933252 A 3/2007

(Continued)

OTHER PUBLICATIONS

International Search Report from PCT/US2018/019787 dated Nov. 26, 2018 (3 pages).

(Continued)

*Primary Examiner* — Hae Moon Hyeon

(74) *Attorney, Agent, or Firm* — Meunier Carlin & Curfman LLC

(57) ABSTRACT

A shielded electrical connector system is disclosed. A male connector assembly includes a male terminal, a non-conductive internal male, and a conductive external male housing that receives an extent of the internal male housing. The male terminal includes a side wall arrangement defining a receiver and including at least one contact arm. An internal spring member resides within the male terminal receiver. A female connector assembly includes a female terminal with a receptacle that receives the male terminal and the spring member. Wherein in a connected position, the male terminal, the spring member, and the female terminal reside within an external female housing; the male terminal and the spring member reside within an internal female housing; the male (Continued)

terminal and the spring member reside within the internal male housing; and a major extent of both the male terminal and the spring member extend beyond the external male housing.

25 Claims, 33 Drawing Sheets

Related U.S. Application Data

(60) Provisional application No. 62/792,881, filed on Jan. 15, 2019.

(51) Int. Cl.
*H01R 13/05* (2006.01)
*H01R 13/187* (2006.01)
*H01R 13/428* (2006.01)
*H01R 13/502* (2006.01)
*H01R 13/6581* (2011.01)

(52) U.S. Cl.
CPC ......... *H01R 13/187* (2013.01); *H01R 13/428* (2013.01); *H01R 13/502* (2013.01); *H01R 13/6581* (2013.01); *H01R 2201/26* (2013.01)

(58) Field of Classification Search
CPC ............ H01R 13/2407; H01R 13/6591; H01R 13/502
See application file for complete search history.

(56) References Cited

U.S. PATENT DOCUMENTS

| | | | |
|---|---|---|---|
| 4,481,388 | A | 11/1984 | Gillam et al. |
| 4,534,610 | A | 8/1985 | Takihara |
| 4,540,235 | A | 9/1985 | Lolic |
| 4,583,812 | A | 4/1986 | Gross, Jr. |
| 4,593,464 | A | 6/1986 | Williams |
| 4,632,483 | A | 12/1986 | Verin |
| 4,713,018 | A | 12/1987 | Sutton |
| 4,895,531 | A | 1/1990 | Vignoli |
| 4,902,244 | A | 2/1990 | Endo |
| 4,932,877 | A | 6/1990 | Zinn |
| 1,938,720 | A | 7/1990 | Romak |
| 4,975,066 | A | 12/1990 | Sucheski |
| 4,983,127 | A | 1/1991 | Kawai |
| 5,007,865 | A | 4/1991 | Jakobeit |
| 5,035,661 | A | 7/1991 | Steinhardt |
| 5,042,433 | A | 8/1991 | Monnier |
| 5,062,918 | A | 11/1991 | Zodrow |
| 5,094,636 | A | 3/1992 | Zinn |
| 5,102,752 | A | 4/1992 | Hope |
| 5,120,255 | A | 6/1992 | Kouda |
| 5,162,004 | A | 11/1992 | Kuzuno |
| 5,169,336 | A | 12/1992 | Taguchi |
| 5,188,545 | A | 2/1993 | Hass |
| 5,240,439 | A | 8/1993 | Egenolf |
| 5,273,766 | A | 12/1993 | Long |
| 5,288,252 | A | 2/1994 | Steinhardt |
| 5,295,873 | A | 3/1994 | Walbrecht |
| 5,334,058 | A | 8/1994 | Hotea |
| 5,338,229 | A | 8/1994 | Egenolf |
| 5,361,377 | A | 11/1994 | Miller |
| 5,362,262 | A | 11/1994 | Hotea |
| 5,391,097 | A | 2/1995 | Kerul |
| 5,415,571 | A | 5/1995 | Lutsch |
| 5,419,723 | A | 5/1995 | Villiers |
| 5,437,566 | A | 8/1995 | Zinn |
| 5,486,123 | A | 1/1996 | Miyazaki |
| 5,536,184 | A | 7/1996 | Wright |
| 5,551,897 | A | 9/1996 | Alwine |
| 5,562,506 | A | 10/1996 | Wright |
| 5,573,434 | A | 11/1996 | Ittah |
| 5,607,328 | A | 3/1997 | Joly |
| 5,624,283 | A | 4/1997 | Hotea |
| 5,664,972 | A | 9/1997 | Zinn |
| 5,716,245 | A | 2/1998 | Kameyama |
| 5,810,627 | A | 9/1998 | Gierut |
| 5,827,094 | A | 10/1998 | Aizawa |
| 5,863,225 | A | 1/1999 | Liebich |
| 5,868,590 | A | 2/1999 | Dobbelaere |
| 5,938,485 | A | 8/1999 | Hotea |
| 5,941,740 | A | 8/1999 | Neuer |
| 5,951,338 | A | 9/1999 | Seko |
| 5,954,548 | A | 9/1999 | Stabroth |
| 5,975,964 | A | 11/1999 | Seko |
| 5,980,336 | A | 11/1999 | Hall |
| 6,042,433 | A | 3/2000 | Chen |
| 6,062,918 | A | 5/2000 | Myer |
| 6,102,752 | A | 8/2000 | Bommel |
| 6,126,495 | A | 10/2000 | Lolic |
| 6,186,840 | B1 | 2/2001 | Geltsch |
| 6,257,931 | B1 | 7/2001 | Sakurai |
| 6,261,116 | B1 | 7/2001 | Ceru |
| 6,273,766 | B1 | 8/2001 | Zennamo, Jr. |
| 6,361,377 | B1 | 3/2002 | Saka |
| 6,371,813 | B2 | 4/2002 | Ramey |
| 6,390,830 | B1 | 5/2002 | Onizuka |
| 6,394,858 | B1 | 5/2002 | Geltsch |
| 6,402,571 | B1 | 6/2002 | Muller |
| 6,475,040 | B1 | 11/2002 | Myer |
| 6,514,098 | B2 | 2/2003 | Marpoe, Jr. |
| 6,561,841 | B2 | 5/2003 | Norwood |
| 6,565,396 | B2 | 5/2003 | Saka |
| 6,679,736 | B2 | 1/2004 | Saka |
| 6,695,644 | B2 | 2/2004 | Zhao |
| 6,722,926 | B2 | 4/2004 | Chevassus-More |
| 6,761,577 | B1 | 7/2004 | Koehler |
| 6,814,625 | B2 | 11/2004 | Richmond |
| 6,824,170 | B2 | 11/2004 | Lee |
| 6,872,103 | B1 | 3/2005 | Flieger |
| 6,921,283 | B2 | 7/2005 | Zahlit |
| 6,994,600 | B2 | 2/2006 | Coulon |
| 7,014,515 | B2 | 3/2006 | Lutsch |
| 7,084,361 | B1 | 8/2006 | Bowes et al. |
| 7,150,660 | B2 | 12/2006 | Allgood |
| 7,175,488 | B2 | 2/2007 | Pavlovic |
| 7,192,318 | B2 | 3/2007 | Hotea |
| 7,223,469 | B2 | 5/2007 | Aisenbrey |
| 7,244,890 | B2 | 7/2007 | Aisenbrey |
| 7,278,891 | B2 | 10/2007 | Cvasa |
| 7,300,319 | B2 | 11/2007 | Lutsch |
| 7,314,377 | B2 | 1/2008 | Northey |
| 7,329,132 | B1 | 2/2008 | Kamath |
| 7,338,305 | B2 | 3/2008 | Norwood |
| 7,393,218 | B1 | 7/2008 | Pavlovic et al. |
| 7,491,100 | B2 | 2/2009 | Johannes |
| 7,494,352 | B2 | 2/2009 | Furio |
| 7,497,723 | B2 | 3/2009 | Brassell |
| 7,503,776 | B1 | 3/2009 | Pavlovic |
| 7,520,773 | B2 | 4/2009 | Siebens |
| 7,563,133 | B2 | 7/2009 | Stein |
| 7,568,921 | B2 | 8/2009 | Pavlovic |
| 7,586,722 | B2 | 9/2009 | Scholer et al. |
| 7,595,715 | B2 | 9/2009 | Pavlovic |
| 7,613,003 | B2 | 11/2009 | Pavlovic |
| 7,641,499 | B1 | 1/2010 | George et al. |
| 7,647,954 | B2 | 1/2010 | Garber |
| 7,651,344 | B2 | 1/2010 | Wu |
| 7,682,180 | B2 | 3/2010 | Brown |
| 7,708,920 | B2 | 5/2010 | Aisenbrey |
| 7,713,096 | B2 | 5/2010 | Pavlovic |
| 7,726,440 | B2 | 6/2010 | Aisenbrey |
| 7,758,369 | B2 | 7/2010 | Miller |
| 7,759,002 | B2 | 7/2010 | Aisenbrey |
| 7,766,706 | B2 | 8/2010 | Kawamura |
| 7,780,489 | B2 | 8/2010 | Stuklek |
| 7,829,006 | B2 | 11/2010 | Aisenbrey |
| 7,837,519 | B2 | 11/2010 | Copper |
| 7,876,193 | B2 | 1/2011 | Pavlovic |
| 7,892,050 | B2 | 2/2011 | Pavlovic |
| 7,927,127 | B1 | 4/2011 | Glick |

(56) References Cited

U.S. PATENT DOCUMENTS 7,942,682 B2 5/2011 Copper
7,942,683 B2 5/2011 Copper
7,963,782 B2 6/2011 Hughes
7,976,351 B2 7/2011 Boemmel
7,988,505 B2 8/2011 Hotea
8,111,052 B2 2/2012 Glovinsky
8,128,426 B2 3/2012 Glick
8,167,337 B2 5/2012 Bruno
8,202,124 B1 6/2012 Natter
8,206,175 B2 6/2012 Boyd
8,235,292 B2 8/2012 Talboys
8,242,874 B2 8/2012 Pavlovic
8,268,222 B2 9/2012 Aisenbrey
8,277,243 B1 10/2012 Hernandez
8,282,429 B2 10/2012 Glick
8,366,497 B2 2/2013 Glick
8,377,585 B2 2/2013 Aisenbrey
8,388,389 B2 3/2013 Costello
8,430,689 B2 4/2013 Myer
8,446,733 B2 5/2013 Hampo
8,449,338 B2 5/2013 Gong
8,475,220 B2 7/2013 Glick
8,597,043 B2 12/2013 Zhao
8,651,892 B2 2/2014 Arant
8,662,935 B2 3/2014 Jouas
8,668,506 B2 3/2014 Stack
8,678,867 B2 3/2014 Glick
8,758,043 B2 6/2014 Ohyama
8,795,007 B2 8/2014 Itou
8,840,428 B2 9/2014 Omae et al.
8,840,436 B2 9/2014 Mott
8,858,264 B2 10/2014 Mott
8,858,274 B2 10/2014 Jakoplic
8,941,731 B2 1/2015 Barba
8,944,844 B2 2/2015 Myer
8,956,190 B2 2/2015 Natter
8,968,021 B1 3/2015 Kennedy
8,974,244 B2 3/2015 Aihara
8,992,270 B2 3/2015 Glick
8,998,655 B2 4/2015 Glick
9,011,186 B2 4/2015 Wirth
9,048,552 B2 6/2015 Eyles
9,059,542 B2 6/2015 Oh
9,077,114 B2 7/2015 Oh
9,142,902 B2 9/2015 Glick
9,166,322 B2 10/2015 Glick
9,190,756 B2 11/2015 Glick
9,225,116 B2 12/2015 McKibben
9,236,682 B2 1/2016 Glick
9,257,804 B1 2/2016 Beck
9,293,852 B2 * 3/2016 Glick .................... H01R 13/18
9,300,069 B2 3/2016 Morello
9,353,894 B2 5/2016 Richards
9,356,394 B2 5/2016 Kennedy
9,368,904 B2 6/2016 Natter
9,379,470 B2 6/2016 Glick
9,431,740 B2 8/2016 Glick
9,437,974 B2 9/2016 Glick
9,444,168 B2 9/2016 Horiuchi
9,444,205 B2 9/2016 Rangi
9,455,516 B2 9/2016 Gutenschwager
9,502,783 B2 11/2016 Bleicher
9,525,254 B2 12/2016 Chen
9,537,241 B2 1/2017 Rivera
9,548,553 B2 1/2017 Glick
9,583,860 B1 2/2017 DeWitte
9,608,369 B1 3/2017 Brandt
9,620,869 B2 4/2017 Listing
9,653,859 B1 5/2017 Moore
9,680,256 B1 6/2017 Lane
9,705,229 B2 7/2017 Itou
9,705,254 B2 7/2017 Lampert
9,711,885 B2 7/2017 Hamai
9,748,693 B1 8/2017 Exenberger
9,841,454 B2 12/2017 Gelonese
9,847,591 B2 12/2017 Glick
9,876,317 B2 1/2018 Glick
9,905,950 B2 2/2018 Marsh
9,905,953 B1 * 2/2018 Pavlovic .............. H01R 13/187
9,948,044 B2 4/2018 Harris, III
10,014,614 B2 7/2018 Davies
10,014,631 B1 7/2018 Chambly
10,038,278 B2 7/2018 Lane
10,044,140 B1 8/2018 Gianrossi
10,122,117 B2 11/2018 Miller
10,135,168 B2 11/2018 Pavlovic
10,184,970 B2 1/2019 Maalouf
10,218,117 B1 2/2019 Probert
10,283,889 B2 5/2019 Glick
10,355,414 B1 7/2019 Alvarado
10,693,252 B2 6/2020 Pavlovic
11,069,999 B2 7/2021 Fisher
11,223,150 B2 1/2022 Pavlovic
11,398,696 B2 * 7/2022 Pavlovic .............. H01R 13/187
2001/0019924 A1 9/2001 Heimueller
2001/0021602 A1 9/2001 Zanten
2002/0019156 A1 2/2002 Fukamachi
2002/0049005 A1 4/2002 Leve
2002/0081888 A1 6/2002 Regnier
2002/0180272 A1 12/2002 Yuasa
2004/0150224 A1 8/2004 Lee
2005/0134037 A1 6/2005 Bruno
2005/0211934 A1 9/2005 Garber
2006/0040555 A1 2/2006 Chen
2006/0172618 A1 8/2006 Yamashita
2007/0123093 A1 5/2007 Lutsch
2007/0149050 A1 6/2007 Oka
2008/0261460 A1 10/2008 Hariharesan et al.
2009/0197457 A1 8/2009 Lanni
2011/0130023 A1 6/2011 Kataoka
2011/0168778 A1 7/2011 Talboys
2011/0171843 A1 7/2011 Casses
2012/0094551 A1 4/2012 Corman
2012/0100753 A1 4/2012 Omae et al.
2012/0108106 A1 5/2012 de Chazal et al.
2012/0129407 A1 5/2012 Glick
2012/0238124 A1 9/2012 Zhao
2012/0244756 A1 9/2012 Jouas
2013/0002102 A1 1/2013 Chen
2013/0004050 A1 1/2013 Wu
2013/0040505 A1 2/2013 Hirakawa
2013/0078874 A1 3/2013 Itou
2013/0109224 A1 5/2013 Chin
2013/0210292 A1 8/2013 Schmidt
2013/0215573 A1 8/2013 Wagner
2013/0337702 A1 12/2013 Pavlovic
2014/0087601 A1 3/2014 Glick
2014/0120768 A1 5/2014 Wetzel et al.
2014/0193995 A1 7/2014 Barthelmes
2014/0227915 A1 8/2014 Glick
2015/0038000 A1 2/2015 Glick
2015/0050838 A1 2/2015 Copper et al.
2015/0072207 A1 3/2015 Soleski
2015/0074996 A1 3/2015 Glick
2015/0079859 A1 3/2015 Glick
2015/0162706 A1 6/2015 Kennedy
2015/0255912 A1 9/2015 Natter
2015/0255924 A1 9/2015 Glick
2015/0280381 A1 10/2015 Rangi
2015/0303604 A1 10/2015 Rivera et al.
2016/0028169 A1 1/2016 Glick
2016/0043505 A1 2/2016 Wu
2016/0336572 A1 11/2016 Yoshida
2017/0338600 A1 11/2017 Tanaka
2018/0090900 A1 3/2018 Horiuchi
2018/0183165 A1 6/2018 Balser et al.
2018/0191095 A1 * 7/2018 Pavlovic .................. H01R 4/48
2018/0219305 A1 8/2018 Wavering
2018/0351282 A1 12/2018 Duan
2019/0027871 A1 1/2019 Data et al.
2019/0052025 A1 2/2019 Buechli
2019/0089083 A1 3/2019 Pavlovic
2019/0372262 A1 12/2019 Christiano

(56) References Cited

U.S. PATENT DOCUMENTS

| | | | |
|---|---|---|---|
| 2020/0395700 A1 | 12/2020 | Pavlovic | |
| 2021/0167538 A1 | 6/2021 | Pavlovic | |
| 2022/0131299 A1 | 4/2022 | Pavlovic | |

FOREIGN PATENT DOCUMENTS

| | | | |
|---|---|---|---|
| CN | 101291025 | A | 10/2008 |
| CN | 101557049 | A | 10/2009 |
| CN | 102474051 | A | 5/2012 |
| CN | 102714377 | A | 10/2012 |
| CN | 103141000 | | 6/2013 |
| CN | 103201912 | A | 7/2013 |
| CN | 203193080 | | 9/2013 |
| CN | 103430396 | A | 12/2013 |
| CN | 103794958 | A | 5/2014 |
| CN | 104614564 | A | 5/2015 |
| CN | 2015100485492 | | 5/2015 |
| CN | 204516966 | U | 7/2015 |
| CN | 105225040 | | 1/2016 |
| CN | 105474471 | A | 4/2016 |
| CN | 107453135 | A | 12/2017 |
| CN | 206908024 | U | 1/2018 |
| CN | 206931746 | U | 1/2018 |
| CN | 206962160 | | 2/2018 |
| CN | 107863610 | | 3/2018 |
| CN | 108258483 | A | 7/2018 |
| CN | 108475889 | A | 8/2018 |
| CN | 108539446 | A | 9/2018 |
| CN | 109004402 | A | 12/2018 |
| CN | 208284737 | U | 12/2018 |
| DE | 19817924 | | 10/1999 |
| DE | 102013211208 | | 12/2014 |
| EP | 1291979 | | 12/2004 |
| EP | 2109191 | A2 | 4/2009 |
| JP | S58157075 | A | 9/1983 |
| JP | H1040995 | | 2/1998 |
| JP | H1050376 | | 2/1998 |
| JP | H1050377 | | 2/1998 |
| JP | 2008041309 | A | 2/2008 |
| JP | 2011049107 | | 3/2011 |
| JP | 2012043739 | | 3/2012 |
| JP | 2017010755 | | 1/2017 |
| KR | 20160138442 | | 12/2016 |
| WO | 2017195092 | | 11/2017 |
| WO | 2019164536 | | 8/2019 |
| WO | 2019229587 | | 12/2019 |
| WO | 2019236976 | | 12/2019 |
| WO | 2019237009 | | 12/2019 |
| WO | 2019237046 | | 12/2019 |

OTHER PUBLICATIONS

Written Opinion from PCT/US2018/019787 dated Nov. 26, 2018 (10 pages).

International Search Report and Written Opinion issued in PCT/US2019/036070, dated Sep. 27, 2019, 8 pages.

International Search Report and Written Opinion issued in PCT/US2019/036010, dated Sep. 30, 2019, 13 pages.

International Search Report and written Opinion issued in PCT/US2019/036127, dated Oct. 4, 2019, 11 pages.

International Search Report and written Opinion issued in PCT/US2020/049870, dated Dec. 10, 2020, 20 pages.

International Search Report and written Opinion issued in PCT/US20/013757, dated Dec. 10, 2020, 7 pages.

International Search Report and Written Opinion issued in PCT/US20/14484, dated Mar. 31, 2020, 7 pages.

International Search Report and Written Opinion issued in PCT/US21/33446, dated Aug. 24, 2021, 17 pages.

International Search Report and Written Opinion issued in PCT/US21/43788, dated Dec. 23, 2021, 23 pages.

International Search Report and Written Opinion issued in PCT/US21/47180, dated Jan. 6, 2022, 18 pages.

International Search Report and Written Opinion issued in PCT/US21/43686, dated Dec. 23, 2021, 28 pages.

Office Action issued for Chinese Application No. 202080017856.3, dated Nov. 23, 2023.

* cited by examiner

| FREQUENCY | ABS/NIC | PA66/NIC | PA66/SS | PC-ABS/NIC | PC-ABS/SS | PC/NIC | PC/SS | PP/NIC | PP/SS |
|---|---|---|---|---|---|---|---|---|---|
| 30MHz | 66 | 60 | 73 | 70 | 72 | 62 | 69 | 70 | 67 |
| 100MHz | 70 | 62 | 79 | 76 | 84 | 68 | 76 | 77 | 71 |
| 200MHz | 77 | 66 | 89 | 85 | 90 | 75 | 83 | 85 | 77 |
| 300MHz | 83 | 70 | 97 | 92 | 0940 | 81 | 88 | 92 | 83 |
| 400MHz | 89 | 71 | 95 | 99 | 98 | 85 | 92 | 97 | 88 |
| 500MHz | 93 | 74 | 93 | 100 | 94 | 89 | 93 | 97 | 89 |
| 600MHz | 101 | 76 | 93 | 107 | 96 | 87 | 96 | 101 | 93 |
| 700MHz | 105 | 81 | 92 | 112 | 101 | 89 | 97 | 107 | 96 |
| 800MHz | 102 | 83 | 90 | 105 | 106 | 91 | 104 | 108 | 99 |
| 900MHz | 105 | 85 | 90 | 112 | 106 | 91 | 101 | 115 | 103 |
| 1000MHz | 109 | 87 | 90 | 111 | 107 | 93 | 105 | 113 | 105 |
| 1100MHz | 108 | 89 | 89 | 108 | 105 | 93 | 103 | 108 | 102 |
| 1200MHz | 113 | 91 | 89 | 111 | 112 | 97 | 108 | 112 | 102 |
| 1300MHz | 114 | 93 | 89 | 115 | 110 | 100 | 111 | 115 | 106 |
| 1400MHz | 109 | 93 | 89 | 114 | 107 | 96 | 108 | 111 | 106 |
| 1500MHz | 103 | 101 | 88 | 101 | 104 | 93 | 101 | 104 | 97 |

FIG. 45

SHIELDED ELECTRICAL CONNECTOR SYSTEM WITH INTERNAL SPRING COMPONENT

CROSS-REFERENCE TO RELATED APPLICATIONS

This application is a continuation of International Patent Application No. PCT/US20/13757, filed Jan. 15, 2020, which claims the benefit of U.S. Provisional Patent Application No. 62/792,881, filed on Jan. 15, 2019, which is incorporated in its entirety herein by reference and made a part hereof.

FIELD OF DISCLOSURE

The present disclosure relates to electrical connectors, and, in particular, to a shielded electrical connector system having a spring actuated electrical connector assembly. Specifically, the present disclosure relates to an electrical connector system for use in motor vehicles, including passenger and commercial vehicles, for high-power, high-current and/or high-voltage applications where connector assemblies are essential to provide mechanical and electrical connectivity while meeting strict industry standards, production, and performance requirements.

BACKGROUND

Over the past several decades, the number of electrical components used in automobiles, and other on-road and off-road vehicles such as pick-up trucks, commercial vans and trucks, semi-trucks, motorcycles, all-terrain vehicles, and sports utility vehicles (collectively "motor vehicles") has increased dramatically. Electrical components are used in motor vehicles for a variety of reasons, including but not limited to, monitoring, improving and/or controlling vehicle performance, emissions, safety and creates comforts to the occupants of the motor vehicles. These electrical components are mechanically and electrically connected within the motor vehicle by conventional connector assemblies, which consist of an eyelet and a threaded fastener. Considerable time, resources, and energy have been expended to develop connector assemblies that meet the varied needs and complexities of the motor vehicle market; however, conventional connector assemblies suffer from a variety of shortcomings.

Motor vehicles are challenging electrical environments for both the electrical components and the connector assemblies due to a number of conditions, including but not limited to, space constraints that make initial installation difficult, harsh operating conditions, large ambient temperature ranges, prolonged vibration, heat loads, and longevity, all of which can lead to component and/or connector failure. For example, incorrectly installed connectors, which typically occur in the assembly plant, and dislodged connectors, which typically occur in the field, are two significant failure modes for the electrical components and motor vehicles. Each of these failure modes lead to significant repair and warranty costs. For example, the combined annual accrual for warranty by all of the automotive manufacturers and their direct suppliers is estimated to be between $50 billion and $150 billion, worldwide.

A more appropriate, robust connector assembly that is impervious to harsh operating conditions, prolonged vibration and excessive heat, especially heat loads that accumulate "under the hood" of the vehicle. In order to create a robust solution, many companies have designed variations of spring-loaded connectors. Unfortunately, although the more recent connectors are an improvement over dated connectors using an eyelet and threaded connector, there are still far too many failures. Part of the reason that spring-actuated connector assemblies fail in motor vehicle applications is because of the design of the assembly—namely that the spring element, such as a tab, is located on the periphery of the connector. By placing the spring tab on the exterior surface of the connector, manufacturers attempt to make the engagement of the assembly's components obvious to the worker assembling the part in the factory. Unfortunately, for both plastic and metal, the increased temperatures of an automotive environment make a peripheral spring prone to premature failure. It is not uncommon for the engine compartment of a motor vehicle to exceed 100° C., with individual components of a motor vehicle engine reaching or exceeding 180° C. At 100° C., most plastics start to plasticize, reducing the retention force of the peripheral spring-actuated element. At 100° C., the thermal expansion of the spring steel will reduce the retention force of a peripheral spring-actuated connector. Also, spring-actuated features formed from spring steel are prone to residual material memory inherent in the spring steel as the spring steel is thermally cycled on a repeated basis between high and low temperatures. After many temperature cycles, the spring steel will begin to return to its original, pre-formed shape, which reduces the spring-actuated element's retention force with other components of the connector assembly. This behavior makes the conventional connector assembly susceptible to vibration and failure over time, each of which significantly reduces the performance and reliability of conventional connectors. Accordingly, it is desirable to provide a low-cost, vibration-resistant, temperature-resistant connector assembly.

Another problem in the art is that high power wires can emit electromagnetic fields ("EMF"), which can cause false signals in sensitive circuits found in motor vehicles (e.g., windshield wiper controls, heads-up display, accident recorder, instrument cluster, air deployment, electric power steering, automatic braking, and etc.). The suppression of EMF is becoming more important because today's electronic devices are using lower supply voltages, higher clock frequencies, and increased electronic packaging density. One approach to suppressing EMF's is to utilize a shielded cable. The effectiveness of the electromagnetic shielding is typically limited by openings or seams in the shield. To mitigate shielding loss from these openings or seams, it is desirable to shield the connectors that are coupled to the shielded cable.

Another problem in the art is that the female portion of the connector assembly must have an opening therein to receive the male portion of the connector assembly. Typically, this opening is large enough, such that a foreign object may accidentally touch a conductive part of the connector assembly. Accordingly, it is desirable to provide a connector that helps reduce the risk that a foreign body can come into contact with the conductive part of the connector assembly. Additionally, it is desirable to minimize the amount of time that foreign objects can come into contact with the terminal assemblies when power is applied to these terminals. Thus, it is desirable that the connector does not supply power to the terminals when the terminals are not properly connected within each other.

This disclosure addresses the shortcomings discussed above and other problems and provides advantages and aspects not provided by conventional connector assemblies and the prior art of this type. A full discussion of the features and advantages of the present disclosure is deferred to the following detailed description, which proceeds with reference to the accompanying drawings.

SUMMARY

The present disclosure relates to a shielded electrical connector system, which has a spring actuated electrical connector assembly residing within a housing assembly. The housing assembly provides shielding capabilities and contains: (i) certain components that are made from a conductive material and (ii) certain components that are made from a non-conductive material. The electrical connector system is primarily intended for use in motor vehicles, including passenger and commercial vehicles, for high-power, high-amperage, and/or high-voltage applications where connector assemblies are essential to meet industry standards, production, and performance requirements. The electrical connector system can also be used in military vehicles, such as tanks, personnel carriers and trucks, and marine applications, such as cargo ships, tankers, pleasure boats and sailing yachts, or telecommunications hardware, such as servers.

According to an aspect of the present disclosure, the shielded connector system includes a male connector assembly and a female connector assembly. Both the male and female connector assemblies have their own housing, which contains a terminal. The male terminal assembly is designed and configured to fit within the female terminal, which forms both a mechanical and electrical connection between these terminals. The male terminal assembly includes an internal spring actuator or spring member, which is designed to interact with an extent of the male terminal to ensure that a proper connection is created between the male terminal and the female terminal. More specifically, the female terminal forms a receiver that is configured to receive an extent of the male terminal assembly. The male terminal assembly has a male terminal body, which includes a plurality of contact arms. A spring member is nested inside the male terminal body. The spring member resists inward deflection and applies outwardly directed force on the contact arms thereby creating a positive connection and retention force between the male and female terminals. Unlike other prior art connection systems, the connection between the male terminal and the female terminal becomes stronger when the connector system experiences elevated ambient and/or operating temperatures, electrical power and loads.

The male and female terminals may be substantially encased by housings that are formed from non-conductive materials (e.g., non-conductive plastic). These non-conductive housings are in direct contact with the terminals and expose only certain extents of the male and female terminals (e.g., contact arms and an inner surface of the tubular member of the female terminal). Minimizing the exposure of the male and female terminals may be beneficial as it may reduce the chances of foreign metal objects being lodged within the connector assemblies. Also, certain parts of the non-conductive housings are substantially encased by housings that are made from conductive materials (e.g., conductive plastic). These conductive housings may be connected to ground and may act as a shield, which helps suppress EMFs when the shielded connector assembly is in operation.

In one embodiment, the female terminal has a tubular configuration that is fabricated from a sheet of highly conductive copper. The highly conductive copper can be C151 or C110. One side of the sheet of highly conductive copper can be pre-plated with silver, tin, or top tin, such that the inner surface of the tubular member may be plated. The male terminal assembly includes a male terminal body and a spring member. The male terminal body has a plurality of contact arms (e.g., four contact arms). The four contact arms can be placed at 90° increments, meaning that each contact arm has one arm directly opposing a side wall of the female terminal. Each contact arm has a thickness, a termination end, and a planar surface with a length and a width.

A spring member is configured to be nested inside the male terminal body. The spring member has spring arms, a middle section, and a rear wall or base. The spring arms are connected to the middle or base section. The spring arms have a termination end, a thickness, and a planar surface with a length and width. In the illustrated embodiments, the spring member has the same number of spring arms as the contact element has contact arms. In the illustrated embodiment, the spring arms can be mapped, one-to-one, with the contact arms. The spring arms are dimensioned so that the termination end of the associated contact arm engages the planar surface of the spring arm. The spring arms of the illustrated embodiments are even in number, symmetrical, and evenly spaced.

The male terminal fits inside the tubular member of the female terminal such that the contact arms engage the inner surface of the tubular member. The spring arms help ensure that the contact arms create an electrical connection with the tubular member. The termination end of the contact arm meets the planar surface of the spring arm, forcing the contact arm to form a substantially perpendicular or at least an obtuse angle with respect to the outer surface of the spring arm.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIG. 45 is a chart with values that corresponds to the graph of FIG. 44;

DETAILED DESCRIPTION

Figure 1:
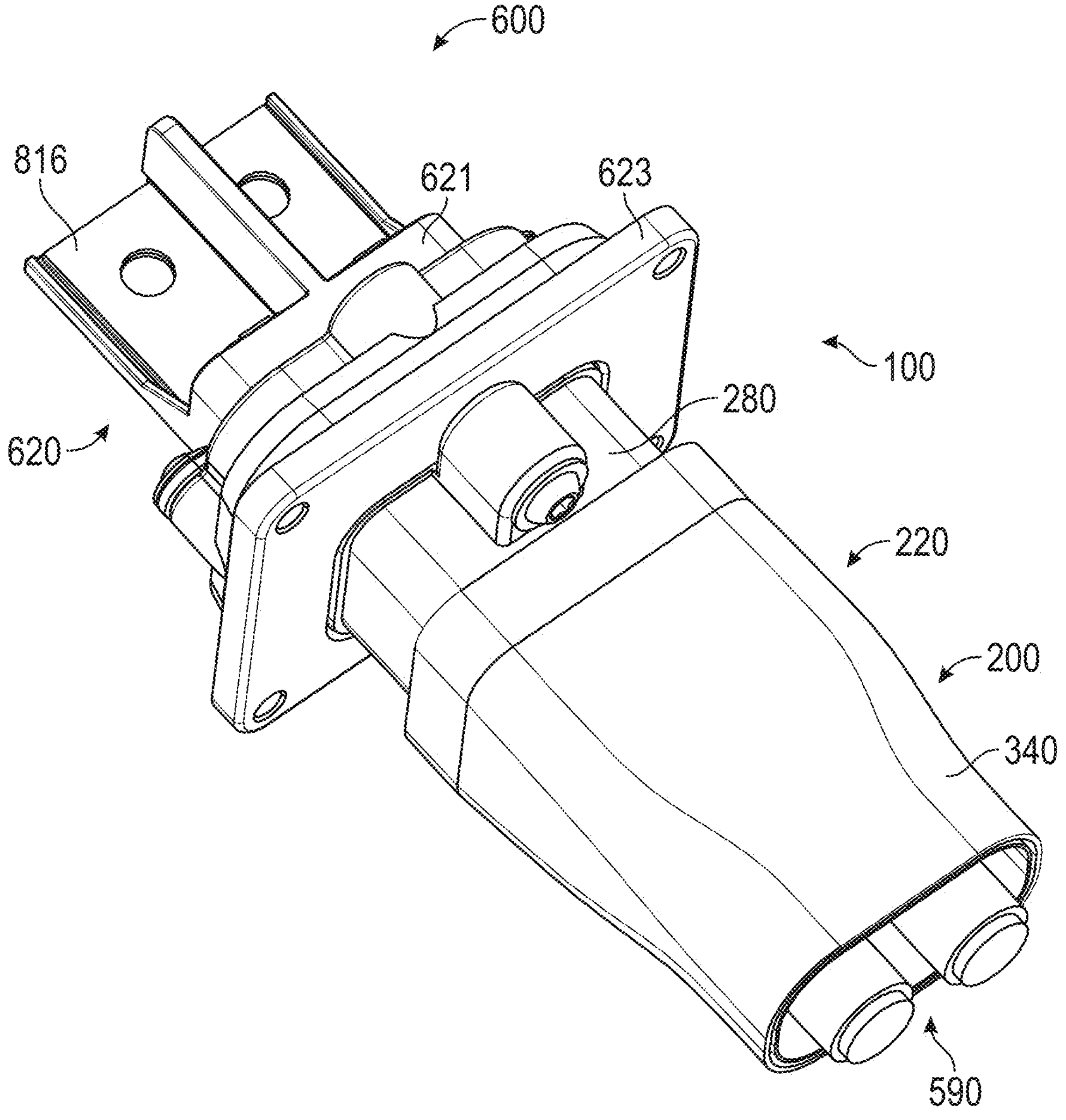
FIG. 1 is a perspective view of a first embodiment of a shielded connector system having a male connector assembly and a female connector assembly.

In the following detailed description, numerous specific details are set forth by way of examples in order to provide a thorough understanding of the relevant teachings. However, it should be apparent to those skilled in the art that the present teachings may be practiced without such details. In other instances, well-known methods, procedures, components, and/or circuitry have been described at a relatively high-level, without detail, in order to avoid unnecessarily obscuring aspects of the present teachings.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspects of the disclosed concepts to the embodiments illustrated. As will be realized, the disclosed methods and systems are capable of other and different configurations and several details are capable of being modified all without departing from the scope of the disclosed methods and systems. For example, one or more of the following embodiments, in part or whole, may be combined consistently with the disclosed methods and systems. As such, one or more steps from the flow charts or components in the Figures may be selectively omitted and/or combined consistently with the disclosed methods and systems. Accordingly, the drawings, flow charts and detailed descriptions are to be regarded as illustrative in nature, not restrictive or limiting.

The Figures show a shielded connector system 100, which is designed to mechanically and electrically couple a device (e.g., radiator fan, heated seat, power distribution component, or another current drawing component) to a power source (e.g., alternator, battery, or power distribution component). The shielded connector system 100 may be used in an electrical system, which may be contained within an airplane, motor vehicle, a military vehicle (e.g., tank, personnel carrier, heavy-duty truck, and troop transporter), a bus, a locomotive, a tractor, a boat, a submarine, a battery pack, a 24-48 volt system, for a high-power application, for a high-current application, for a high-voltage applications, or for another other application where electrical connector assemblies are essential to meet industry standards and production requirements. It should be understood that the shielded connector system 100 can be used in a single application. For example, a number of shielded connector systems 100 can be used with the various devices and component contained within a single motor vehicle. Other examples and additional details about how the shielded connector system 100 may be used are described in connection with PCT Application PCT/US2019/36127.

Figure 2:
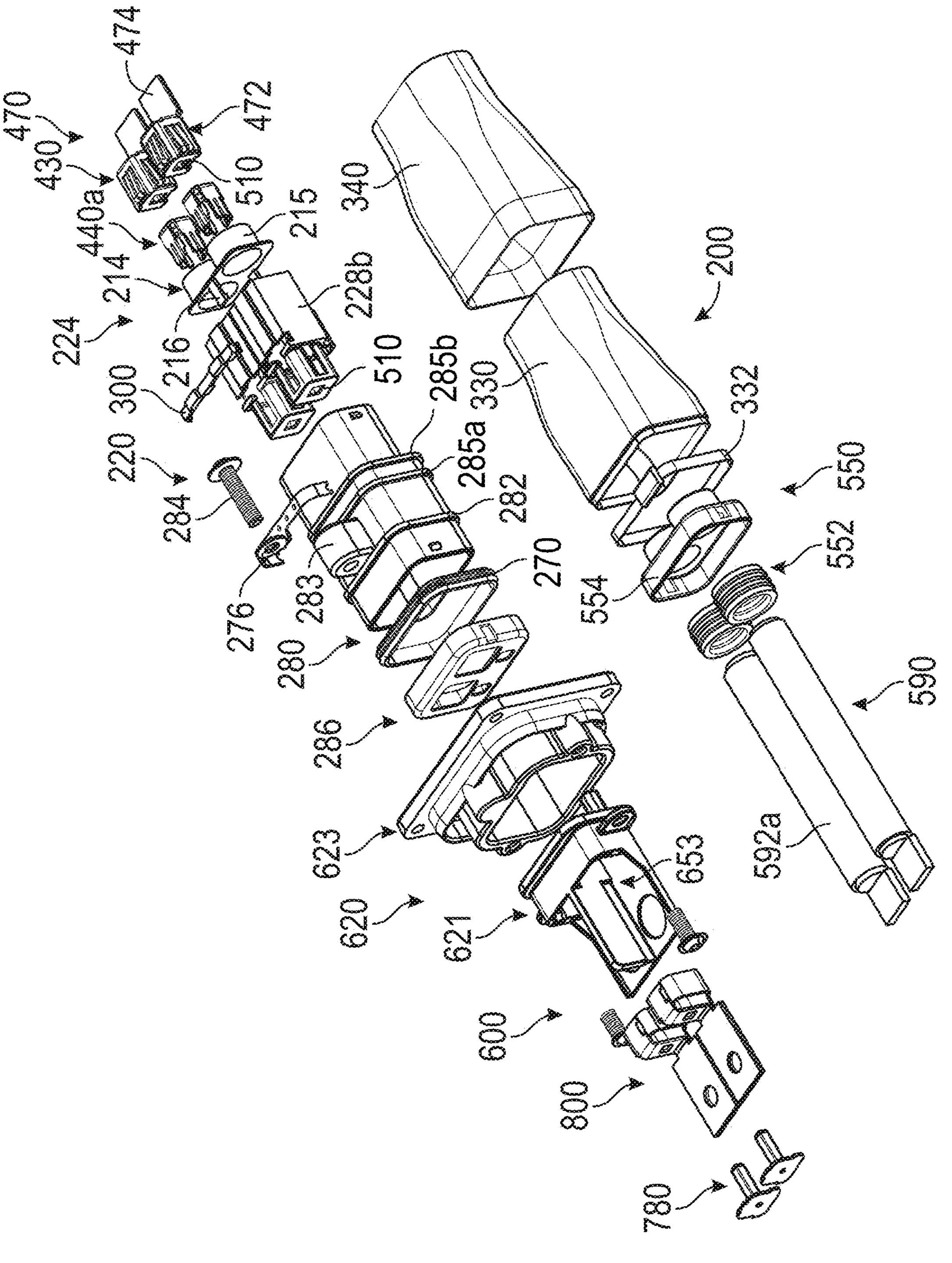
FIG. 2 is an exploded view of the connector system shown in FIG. 1.
Figure 3:
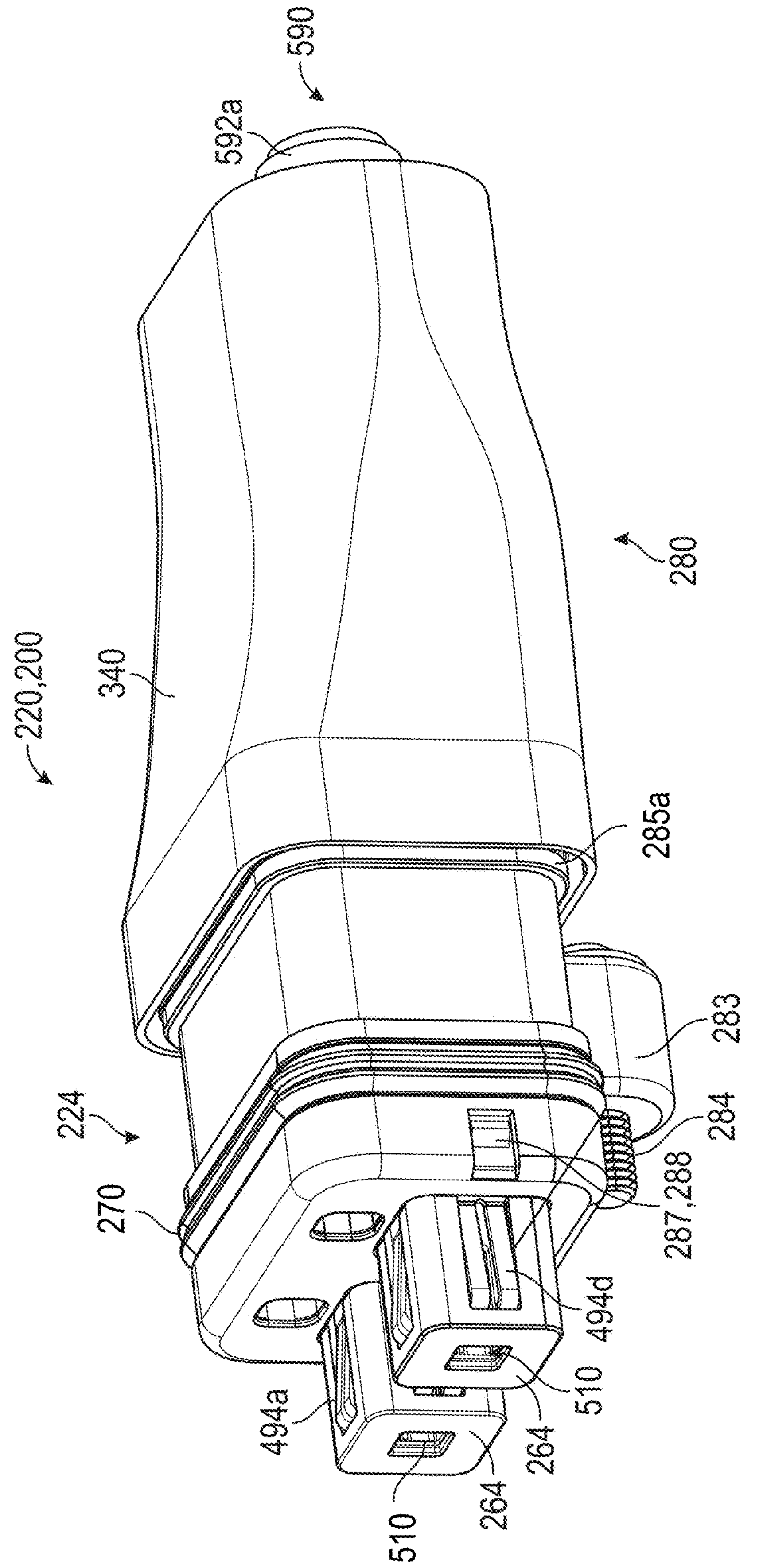
FIG. 3 is a perspective view of the male connector assembly shown in FIG. 1.
Figure 4:
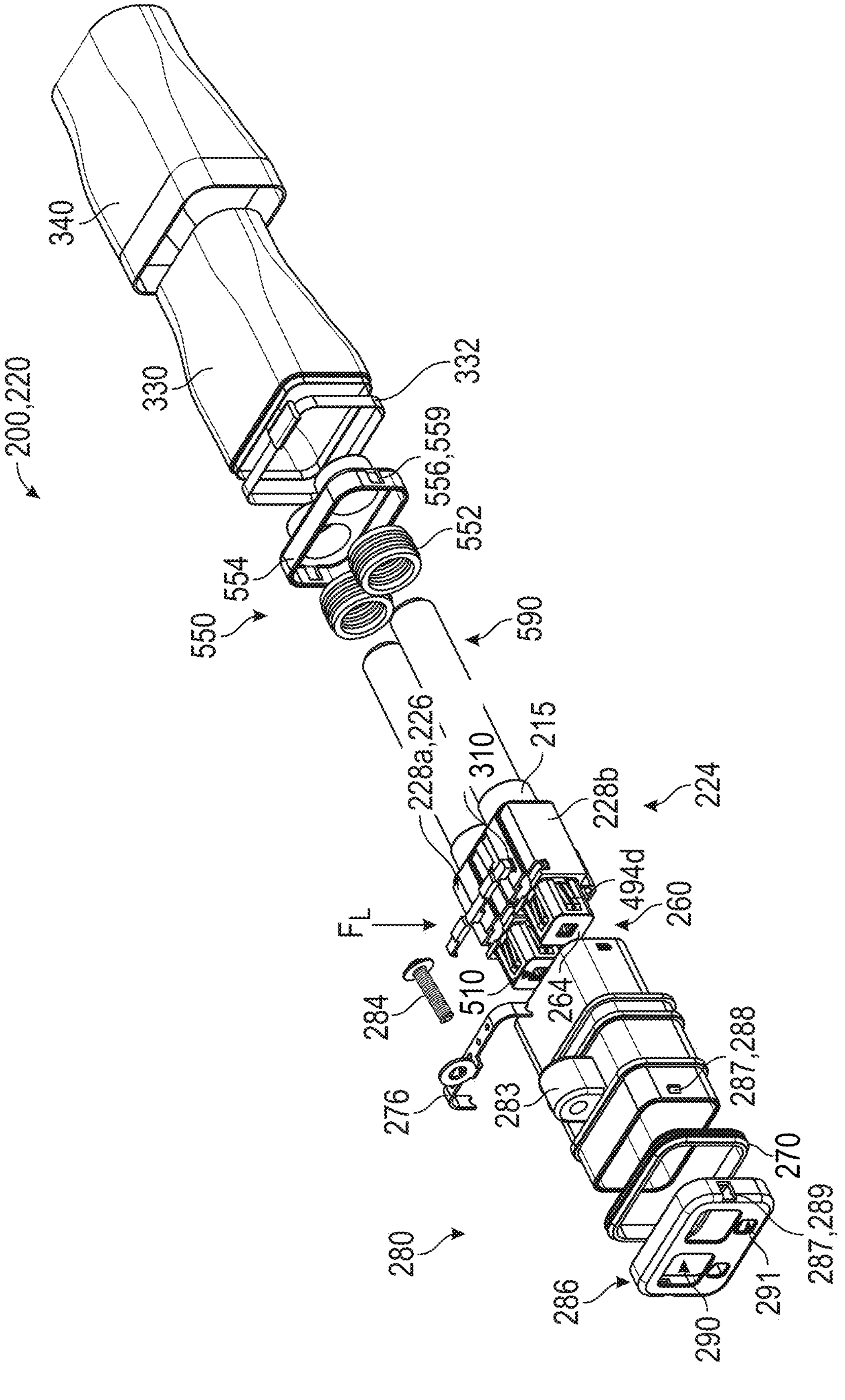
FIG. 4 is an exploded view of the male connector assembly shown in FIG. 2, wherein the male connector assembly has a male housing and a male terminal assembly.

Referring to FIGS. 1-40, a first embodiment of the shielded connector system 100 is comprises a male connector assembly 200 and a female connector assembly 600. The male connector assembly 200 includes the male housing assembly 220 that substantially encases the male terminal assembly 430. The male housing assembly 220 is designed to: (i) suppress EMF noise that is emitted from the shielded connector system 100, (ii) facilitate the coupling of the male terminal assembly 430 with an extent of the female terminal 800, (iii) minimize the chance that male terminal assembly 430 accidentally makes electrical contact with another device or component (e.g., structures contained within the engine compartment of a vehicle, such as the frame or body of the vehicle), and (iv) meet industry standards, such as USCAR (United States Council for Automotive Research) specifications. The male housing assembly 220 is typically formed from multiple components, wherein one component is an internal male housing 224 that is made from a non-conductive material and another component is an external male housing 280 that is made from a conductive material. These two components (the internal male housing 224 and the external male housing 280) are specifically designed to interact with one another in order to: (i) suppress EMF noise that is emitted from the shielded connector system 100, (ii) isolate electrical current that is configured to flow through the male terminal assembly 430 from the external male housing 280, and (iii) isolate electrical current that is configured to flow through the male terminal assembly 430 from foreign bodies. As shown in FIG. 2, the male connector assembly 200 may also include a cable strain relief component and/or a lead or wire 590. In alternative embodiments, the shielded connector system 100 may include a connector position assurance assembly ("CPA"), which is designed to enable the shielded connector system 100 to meet USCAR Specifications, including USCAR-12, USCAR-25, and USCAR-2. For example, the elongated fastener 284 and the grounding projection 283 could be replaced by the CPA assembly. Additionally, details and other examples of CPA assemblies are disclosed within PCT Application PCT/US2019/36127. The cable strain relief component, CPA assembly, and wire 590 may be omitted completely or replaced with different components. For example, the cable strain relief component and the wire 590 may be replaced in an embodiment where the male terminal assembly 430 is directly coupled or integrally formed with a device. Also, in an alternative embodiment, the cable strain relief component may be omitted due to the configuration (e.g., length, rigidity, positioning, or etc.) of the wire 590.

As shown in the FIG. 26-40, the female connector assembly 600 includes the female housing assembly 620 that substantially encases the female terminal 800. Like the male housing assembly 220, the female housing assembly 620 is designed to: (i) suppress EMF noise that is emitted from the shielded connector system 100, (ii) facilitate the coupling of the female terminal 800 with an extent of the male terminal assembly 430, (iii) minimize the chance that the female terminal 800 accidentally makes electrical contact with another device or component (e.g., structures contained within the engine compartment of a vehicle, such as the frame or body of the vehicle), and (iv) meet industry standards, such as USCAR specifications. The female housing assembly 620 is typically formed from multiple components, wherein one component is an internal female housing 621 that is made from a non-conductive material and another component is an external female housing 623 that is made from a conductive material. These two components—the internal female housing 621 and the external female housing 623—are specifically designed to interact with one another in order to: (i) suppress EMF noise that is emitted from the shielded connector system 100, (ii) isolate electrical current that is configured to flow through the female terminal 800 from the external female housing 623, and (iii) isolate electrical current that is configured to flow through the female terminal 800 from foreign bodies. The female connector assembly 600 may also include: (i) touch proof probe 780 and (ii) a mounting flange 670. The touch proof probe 780 and the mounting flange 670 are optional components that may be omitted completely or replaced with different components. For example, the mounting flange 670 may be completely replaced in an embodiment where the female terminal 800 is fixed to a cable strain relief component and a wire. Also in this alternative embodiment the cable strain relief component may be omitted due to the configuration (e.g., length, rigidity, positioning, or etc.) of the lead or wire.

It should be understood that these terms, as used herein, shall generally mean the following. "Non-conductive materials" shall include non-conductive plastic or a material that has a surface resistivity greater than a value derived from testing the material pursuant to one or more standards ESD STM 11.11, ASTM D257, FTMS 101C, FTMS 4046, and ASTM D4935. For example, testing of the material pursuant to these standards yields a value of 10^12 ohms/sq. Examples of non-conductive plastics include thermoplastics or other types of plastics such as (i) polyamide ("PA"), (ii) polyphthalamide ("PPA"), (iii) polyethylene ("PE"), (iv) polybutylene terephthalate ("PBT"), (v) polypropylene ("PP"), and (vi) polyvinyl-chloride ("PVC").

"Conductive materials" shall include conductive plastic or a material that has a surface resistivity less than a value derived from one or more standards ESD STM 11.11, ASTM D257, FTMS 101C, FTMS 4046, and ASTM D4935. For example, testing of the material pursuant to these standards yields a value of 10^12 ohms/sq. Examples of such include thermoplastics or other types of plastics that have at least one conductive additive such as (i) carbon, (ii) metals or (iii) conductive polymers. Further examples of both conductive and non-conductive materials are provided below.

"High power" shall mean an application experiencing: (i) a voltage of between 20 volts to 600 volts, regardless of the current or (ii) a current greater than or equal to 80 amps, regardless of the voltage. "High current" shall mean current greater than or equal to 80 amps, typically greater than 80 amps in the automotive industry, regardless of the voltage. "High voltage" shall mean between 20 volts to 600 volts, typically greater than 47 volts in the automotive industry, regardless of the current.

In the system 100, when structure A is encased by structure B, then structure A is enclosed by structure B. When structure A is substantially encased, then a major extent of structure A is enclosed by structure B, however, a small or minor extent of structure A is unenclosed by structure B. When structure A is partially encased, then a minor extent of structure A is enclosed by structure B, however, a greater or major extent of structure A is unenclosed by structure B.

I. Male Connector Assembly

Figure 25:
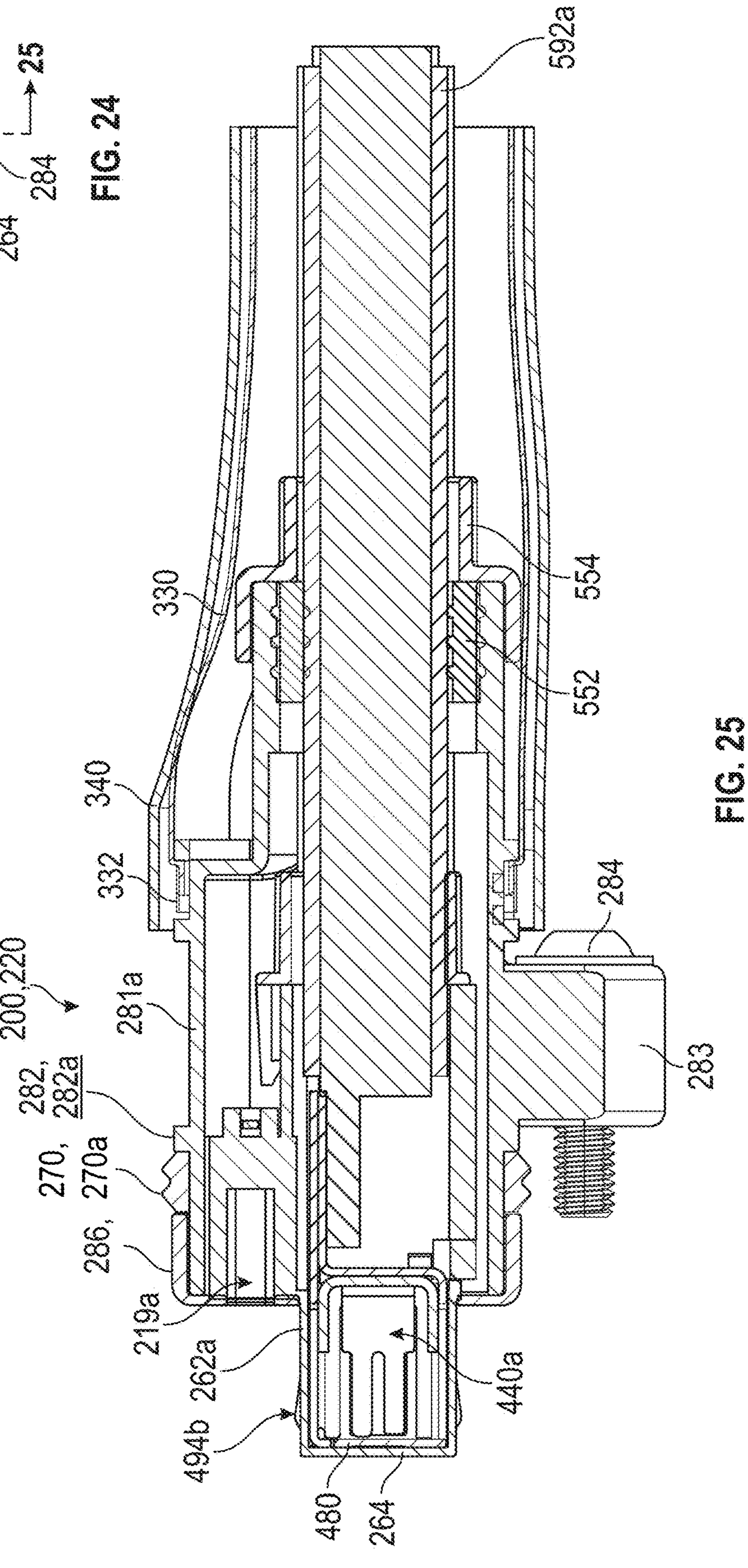
FIG. 25 is a cross-sectional view of the male connector assembly taken along the 25-25 line of FIG. 24.

FIGS. 1-25 and 35-40 provide various views of the male connector assembly 200 of the shielded connector system 100. The male connector assembly 200 includes: (i) the male housing assembly 220, (ii) the male terminal assembly 430, (iii) a male locking member 300, and (iv) a lead or wire 590. The male housing assembly 220 includes the internal or non-conductive internal male housing 224 and exterior or conductive external male housing 280. Both the internal male housing 224 and the external male housing 280 have complex geometries with a number of cooperatively positioned and dimensioned recesses, projections, and openings therethrough to allow for insertion of the internal male housing 224 within the external male housing 280. As shown in FIG. 25, the external male housing 280 substantially encases a majority of the internal male housing 224, including where the male terminal assembly 430 is coupled to the wire 590. It should also be understood that contact between the internal male housing 224 and the external male housing 280 is minimized and as such there are gaps that are formed between the internal male housing 224 and the external male housing 280.

A. External Male Housing

As shown in FIGS. 2-4 and 15-25, the external male housing 280 includes: (i) an arrangement of side walls 281*a*-281*d*, (ii) a seal retainer 282 that encircles the arrangement of side walls 281*a*-281*d*, (iii) a grounding projection 283 that is configured to accept an elongated fastener 284, (iv) a grounding channel 285 that is formed from two grounding projections 285*a*-285*b*, and (v) a frontal cap 286. The arrangement of side walls 281*a*-281*d* form a rectangular tube that is configured to receive an extent of the internal male housing 224, which is best shown in FIGS. 17, 20, 25, 36-37, and 39-40.

It should be understood that the external male housing 280 is made using any known technique (e.g., injection molding techniques, 3D printing, cast, thermoformed, or etc.) from a conductive material. In particular, the external male housing 280 may be made from a number of conductive plastics that are discussed below. Making the external male housing 280 from at least one of these conductive materials attenuates the EMF that is emitted through the system 100. Further, in order to increase the efficiency of the EMF shielding or increasing the attenuation, the openings within the external male housing 280 are minimized. Nevertheless, it should be understood that all openings cannot be eliminated because the wire 590 must enter the external male housing 280 and the male terminal assembly 430 must be able to be connected to the female terminal 800.

The seal 270 is configured to help seal the shielded connector system 100 by interacting with the female housing assembly 620. The seal 270 is positioned: (i) over the arrangement of side walls 281*a*-281*d* and (ii) between the seal retainer 282 and the frontal cap 286. The seal 270 may be made from a flexible non-conductive material (e.g. silicon) or may be made from a flexible conductive material (e.g., silicon that contains conductive particles, strands, etc.). As best shown in FIGS. 20, 25, 36-37, and 39-40, the seal 270 has an exterior surface 270*a* that extends beyond the exterior surfaces of the seal retainer 282 and the frontal cap 286. This configuration helps ensure that the seal 270 interacts with an extent of the inner surface of the female housing assembly 620 to help prevent external contaminants from interacting and/or interfering with the conductive elements of the shielded connector system 100.

Figure 17:
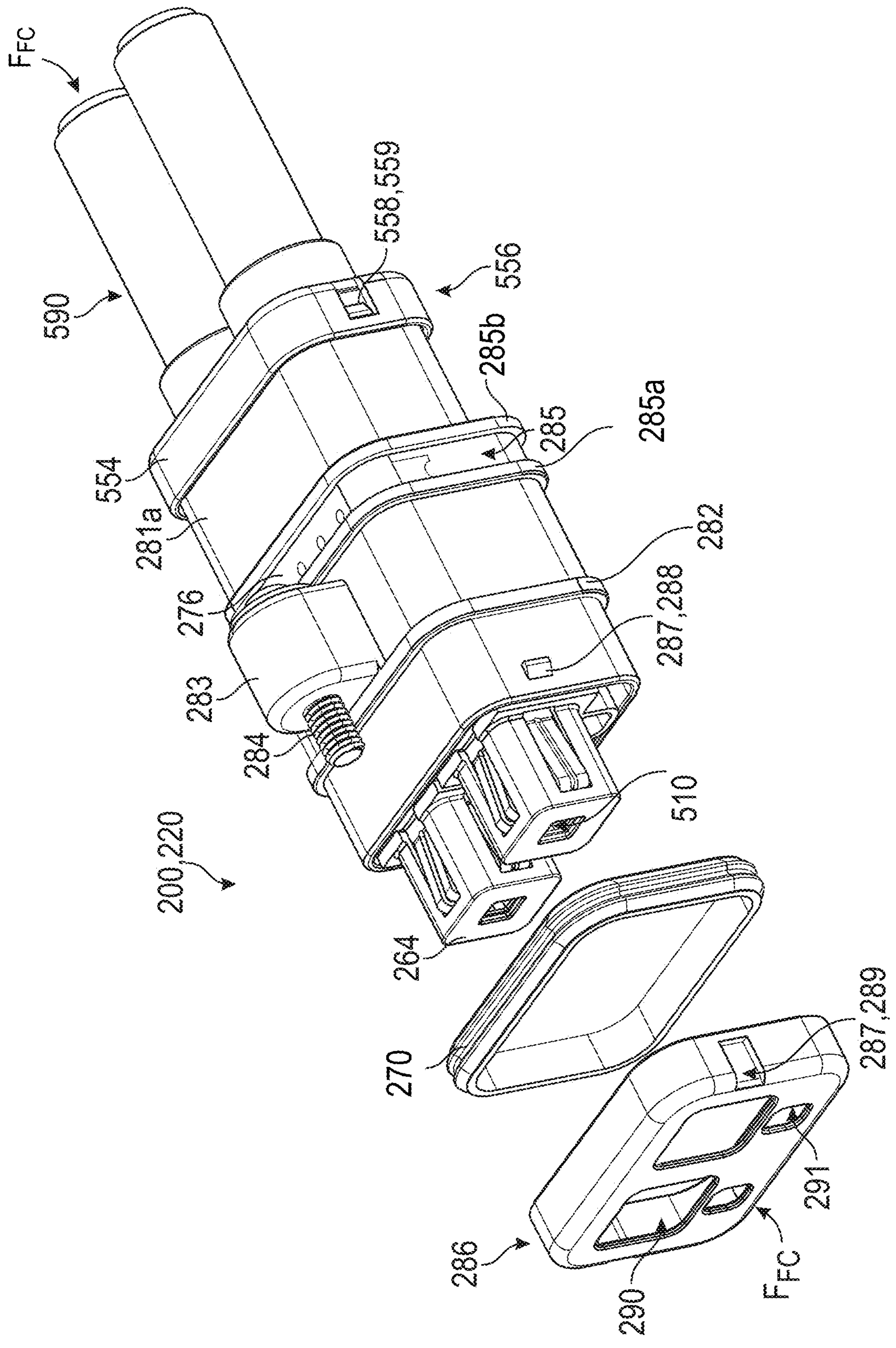
FIG. 17 is an exploded view of an extent of the male connector assembly of FIG. 3, wherein the male connector assembly is in a first partially assembled state.
Figure 18:
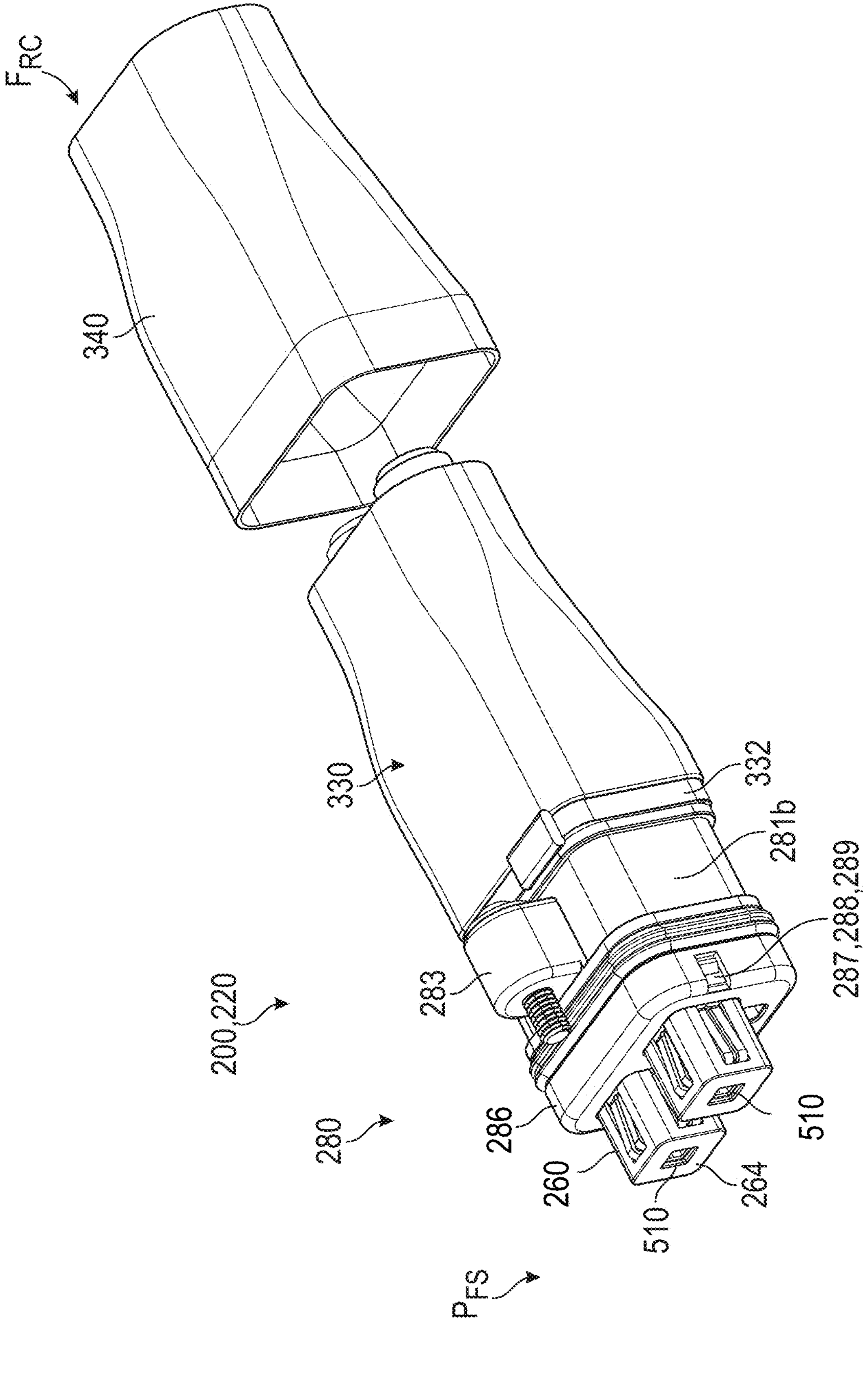
FIG. 18 is an exploded view of an extent of the male connector assembly of FIG. 3, wherein the male connector assembly is in a second partially assembled state.
Figure 19:
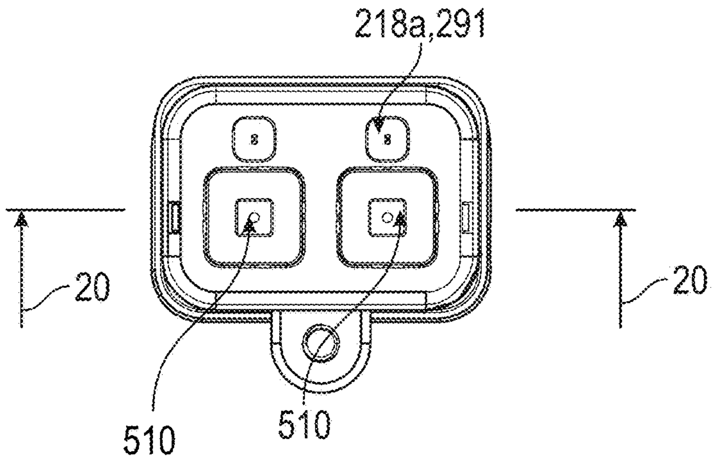
FIG. 19 is a front view of the male connector assembly of FIG. 3 in a fully seated position.
Figure 20:
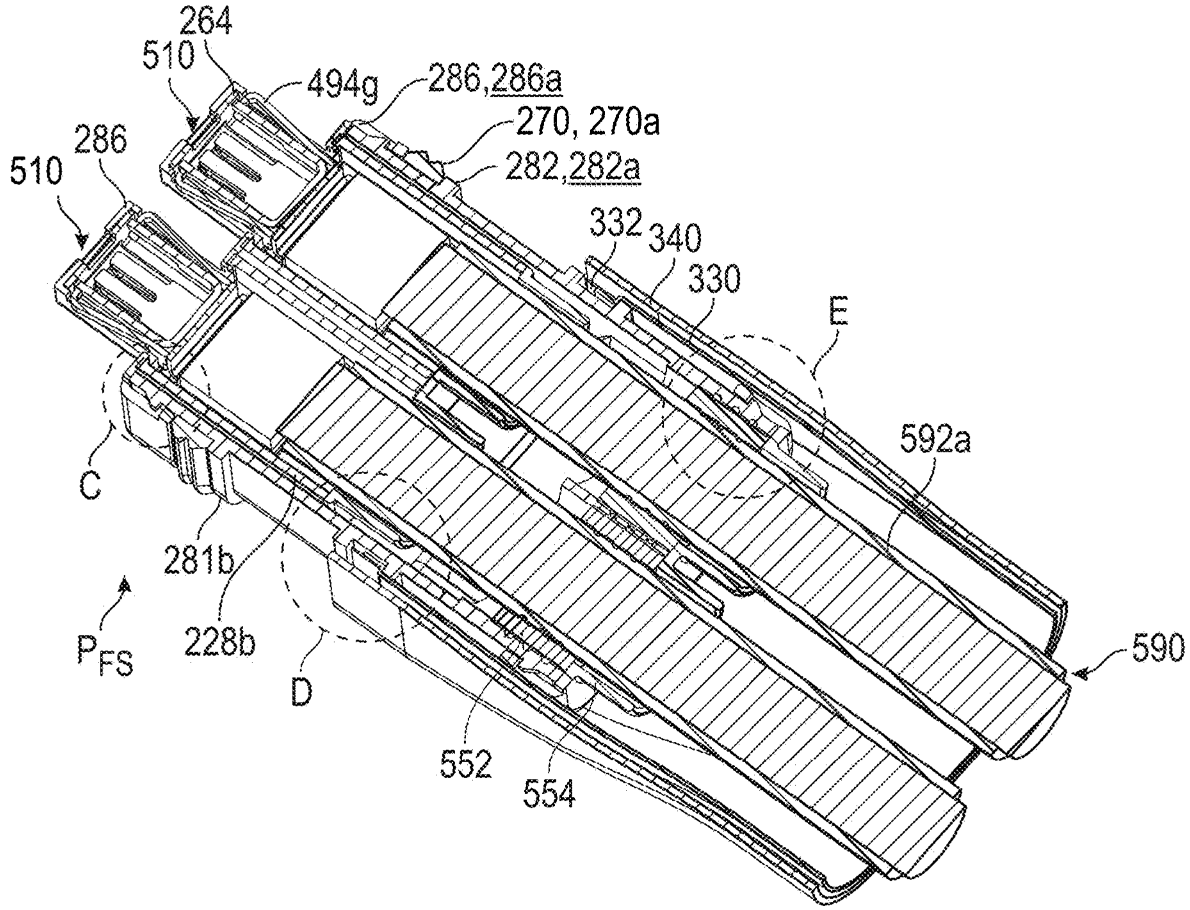
FIG. 20 is a perspective cross-sectional view of the male connector assembly taken along line 20-20 of FIG. 19.
Figure 22:
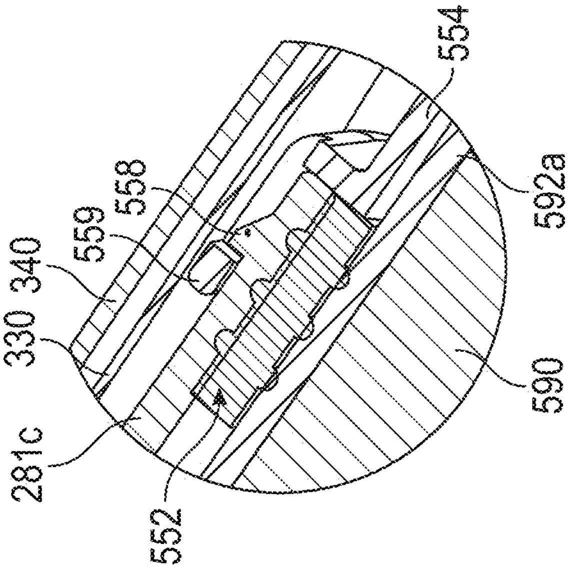
FIG. 22 is a zoomed-in view of area D of male connector assembly in FIG. 20.
Figure 23:
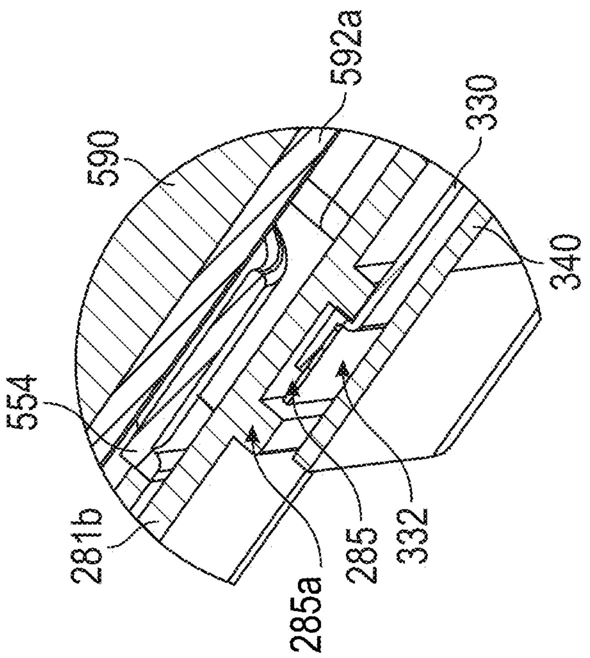
FIG. 23 is a zoomed-in view of area E of male connector assembly in FIG. 20.
Figure 21:
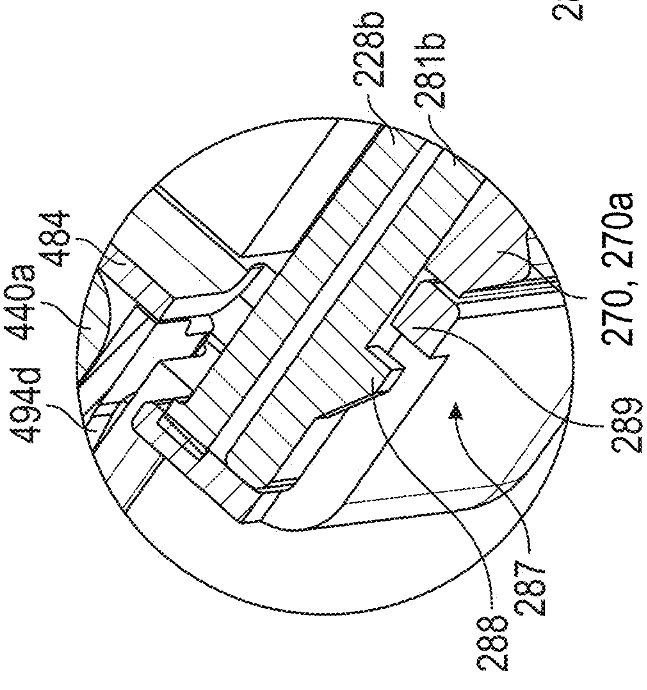
FIG. 21 is a zoomed-in view of area C of male connector assembly in FIG. 20.
Figure 24:
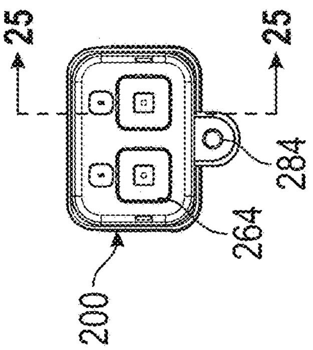
FIG. 24 is a front view of the male connector assembly of FIG. 3.

The frontal cap 286 includes a plurality of openings, wherein said openings include: (i) openings 290 for the male terminal assemblies 430, (ii) openings 291 for the high-voltage interlock 217, and (iii) opening 289, which is a part of the frontal cap coupling means 287. The frontal cap 286 is operably coupled to the arrangement of side walls 281*a*-281*d* by the frontal cap coupling means 287, which in this embodiment is: (i) a projection 288 that extends from side walls 281*b*, 281*d* and (ii) openings 289, which act as receivers for the projections 288. As shown in FIG. 17, the frontal cap 286 can be coupled to the arrangement of side walls 281*a*-281*d* by applying a force, $F_{FC}$, to the frontal cap 286. The force, $F_{FC}$, must be sufficient to temporally deform an extent of the frontal cap 286 to allow the frontal cap 286 to slide over the projections 288. The return of the frontal cap 286 may cause an audible sound (e.g., click) when it moves from the deformed state to the original or non-deformed state. This audible sound will inform the assembler that the m frontal cap 286 is properly connected to the external male housing 280; thus, meeting industry standards and/or requirements (e.g., USCAR).

Like the seal 270, the frontal cap 286 may be formed from a non-conductive material (e.g., thermoplastic) or may be made from a conductive material (e.g., thermoplastic that contains conductive particles, strands, etc.). In certain embodiments, it is desirable to use a non-conductive material for at least the frontal cap 286 to help ensure that the male terminal assembly 430 is isolated from the rest of the external male housing 280. This isolation helps ensure that the male terminal assembly 430 does not accidentally make contact with the ground or another foreign body.

The grounding channel 285 that is formed by two grounding projections 285*a*-285*b* is configured to receive a grounding leadframe 276. The grounding leadframe 276 is configured to be placed into contact with both the external male housing 280 and the fastener 284. The grounding leadframe 276 helps to ensure that electrostatic charges can be distributed throughout a portion of the external male housing 280 and are not just limited to where the fastener 284 couples the external male housing 280 to the ground. This configuration helps reduce failures in the external male housing 280. In some embodiments, the grounding leadframe 276 may have holes or openings formed therein, which are configured to interact with projections that extend from the outer surface of the external male housing 280. In another embodiment, the grounding leadframe 276 may be molded into the external male housing 280, while in other embodiments the grounding leadframe 276 may be formed separately from the external male housing 280 and press-fit into the external male housing 280. Further, in other embodiments, the grounding leadframe 276 may be coupled to the fastener 284, may be sprayed/painted onto the external male housing 280 (e.g., thermal spray, cold spray), welded (resistive, laser, sonic/vibe) to the external male housing 280, or thermally bonded to the external male housing 280.

This grounding leadframe 276 is made from a conductive material, such as metals or other materials disclosed herein. Examples of conductive materials that may be utilized include stainless steel, nickel, aluminum, silver, gold, copper, nickel-plated copper, nickel-plated glass, steel, zinc, brass, bronze, iron, platinum, lead, molybdenum, calcium, tungsten, lithium, tin, or other similar materials. In certain embodiments, the grounding leadframe 276 may be made from highly conductive plastics or other highly conductive materials. It should be understood that in certain embodiments it is desirable for the grounding leadframe 276 to have lower resistance in comparison to the external male housing 280 to help ensure that electricity flows from the external male housing 280, to the grounding leadframe 276, to the fastener 284, and finally to ground.

B. Internal Male Housing

As shown in FIGS. 2, 4, 7-14, 16, 20, and 25, the internal male housing 224 has: (i) a body 226, (ii) an internal male housing receptacle 260, (iii) retaining means 214, and (iv) an extent of a high-voltage interlock 217. The body 226 includes an arrangement of walls 228*a*-228*d* that form a receiver 230 that is configured to receive an extent of the male terminal assembly 430 and the wire 590 (see FIGS. 8 and 11). Side walls 228*a*, 228*b*, 228*d* also include a male locking means 256, which in this exemplary embodiment includes: (i) locking member opening 238 configured to receive an extent of a male locking member 300 and (ii) a plurality of locking member projections 234*a*, 234*b* that are configured to interact with a first extent 310 of the male locking member 300 to secure the male terminal assembly 430 within the male housing assembly 220. Each of the locking member openings 238 and the locking member projections 234*a*, 234*b* will be discussed in greater detail in connection with FIGS. 7-14. It should be understood that the male locking means 256 may include a different arrangement, combination, or number of components. For example, the side walls 228*b*, 228*d* may include a recess that interacts with a projection that is formed on the male locking member 300. In further embodiments, male locking means 256 may include structures that utilize magnetic forces, spring forces, material biasing forces, compression force or a combination of these forces.

As shown in FIGS. 7-14, the receptacle 260 is formed from an arrangement of terminal receptacle side walls 262*a*-262*d* and a terminal receptacle front wall 264. The side walls 262*a*-262*d* in combination with the front wall 264 forms a bowl-shaped receptacle 266. The receptacle 266 is configured to snugly receive a majority of the male terminal assembly 430. This configuration provides additional rigidity to the male terminal assembly 430 and limits the exposed amount of the male terminal assembly 430. However, the entire male terminal assembly 430 is not encased by the internal male housing 224. Thus, to facilitate the coupling of the male terminal assembly 430 to the female terminal 800, the side walls 262*a*-262*d* each have male terminal openings 268*a*-268*d* therethrough. The male terminal openings 268*a*-268*d* are disposed through an intermediate portion of the side walls 262*a*-262*d* and are configured to permit an extent of the male terminal assembly 430 to extend through or past the side walls 262*a*-262*d* to enable the male terminal assembly 430 to contact the female terminal 800. The male terminal openings 268*a*-268*d* may be configured such that they are not large enough to accept the insertion of an assembler's finger, a probe, or another foreign body.

It should be understood that the further the extent of the male terminal assembly 430 extends past the outer surface 274, there is a greater chance that this extent will accidentally come into contact with in a foreign body. Thus, the extent of the male terminal assembly 430 that extends past the outer surface 274 needs to balance the ability to form a proper connection with the female terminal 800. The design disclosed herein balances these factors and the extent of the male terminal assembly 430 extends beyond the outer surface 274 by less than 2 mm and preferably less than 0.5 mm. In comparison to the length of the male terminal openings 268*a*-268*d*, the extent of the male terminal assembly 430 extends beyond the outer surface 274 is less than 8% of the length and preferably less than 4% of the length.

The internal male housing 224 is configured to be placed in contact with the male terminal assembly 430 and thus it is desirable to form the internal male housing 224 from a non-conductive material (e.g., PA, PPA, PE, PBT, PP, PVC, other thermoplastics or other similar polymers and/or plastics). It should be understood that the non-conductive material that is chosen should be able to sufficiently isolate the male terminal assembly 430, even when a high current load is flowing through the male terminal assembly 430. As discussed above and in other parts of this application, the internal male housing 224 may be formed using any suitable method, such as injection molding techniques, 3D printing, cast, thermoformed, or any other similar technique.

Figure 51:
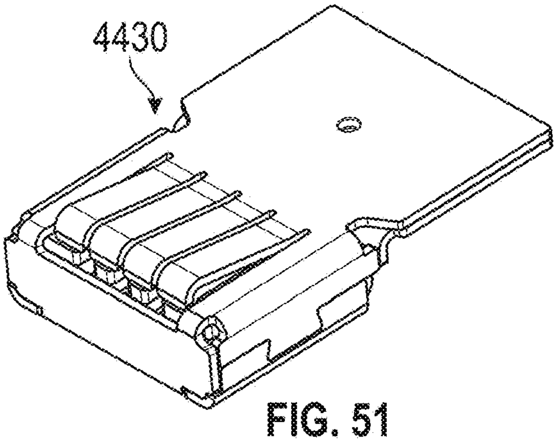
Figure 52:
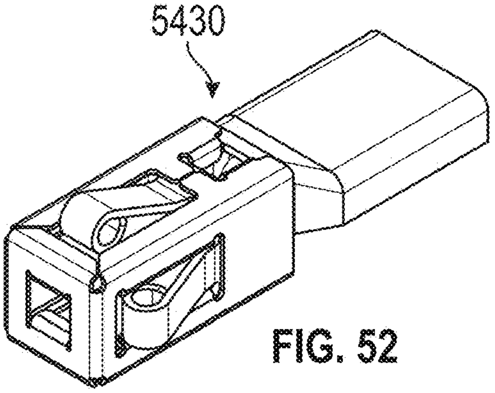
Figure 53:
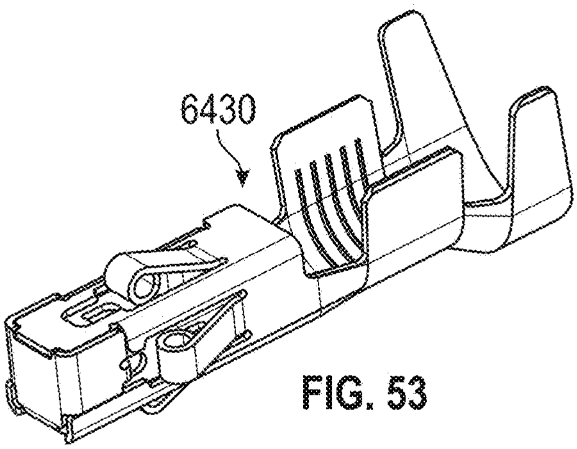
Figure 54:
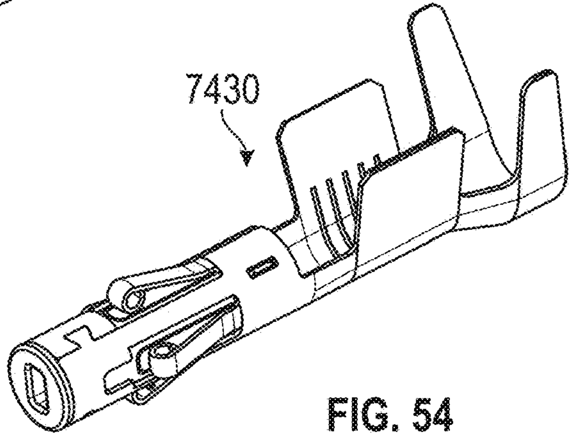
Figure 55:
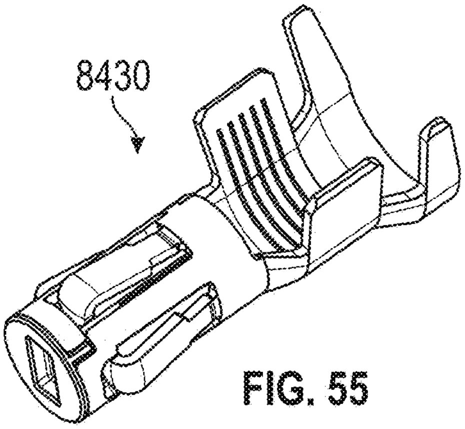

In other embodiments, the configuration of the receptacle 260 and the male terminal openings 268*a*-268*d* may have a different configuration to accommodate a different shaped male terminal assembly 430. For example, the receptacle 260 may have an elongated rectangular configuration to accept the male terminal assemblies shown in FIG. 51 and described within FIGS. 59-68 of PCT patent application PCT/US2019/036010. Also, in this embodiment from PCT patent application PCT/US2019/036010, the terminal receiver will not have male terminal openings positioned within an intermediate portion of side walls because the side walls do not have contact arms. Alternatively, the receptacle 260 may have a substantially circular configuration to accept the male terminal assemblies shown in FIG. 54 and described within FIGS. 87-96 of PCT patent application PCT/US2019/036010. In further embodiments, the receptacle 260 may be triangular, hexagonal or any shape.

The retaining means 214 of the internal male housing 224 is configured to aid in the retention of the male terminal assembly 430 within the internal male housing 224. Specifically, the retaining means 214 includes: (i) a wire receiver 215 with a diameter that is the same or just barely larger than the exterior diameter of the coating 592*a* that encircles the wire 590 and (ii) a coupling mechanism 216 that is configured to interact with a projection that extends from side walls 228*a*, 228*c*. The retaining means 214 helps prevent the wire 590 from applying stress on the male terminal assembly 430 or the area where the wire 590 is coupled to the male terminal assembly 430. The retaining means 214 is made from a non-conductive material and is typically formed from a rigid plastic.

The high-voltage interlock 217 of the internal male housing 224 is designed to prevent the terminals (the male terminal assembly 430 and the female terminal 800) from being exposed to forging bodies, when power is applied to them. Specifically, the high-voltage interlock 217 acts as a switch in a circuit loop consisting of any number of similar switches, any one of which, when opened, interrupts the flow of current through the entire loop. This opening of the circuit is a signal to a control device to take action to de-energize the power to the system 100. In other words, the system 100 does not apply power to the terminals (the male terminal assembly 430 and the female terminal 800) until the male terminal assembly 430 is properly connected within the female terminal 800. Typically, high-voltage interlocks 217 are required when the connector system is designed to handle more than 100 volts. Accordingly, the system 100 that is disclosed herein has a high-voltage interlock 217 because it is designed to handle more than 100 volts. Additional details about high-voltage interlocks are disclosed within the following U.S. patents, which are fully incorporated herein by reference, U.S. Pat. Nos. 7,084,361, 7,586,722, 7,641,499, and 8,597,043.

In this system 100, the high-voltage interlock 217 of the internal rale housing 224 includes an arrangement of side walls 218 that form a plurality of high-voltage interlock receivers 219*a*, 219*b*. Wherein each high-voltage interlock receiver within the plurality of high-voltage interlock receivers 219*a*, 219*b* is configured to receive a high-voltage interlock projection that is contained within the plurality of high-voltage interlock projections 690*a*, 690*b*, wherein the plurality of projections 690*a*, 690*b* extend from the internal female housing 621. Additionally, the plurality of high-voltage interlock receivers 219*a*, 219*b* contains a metallic element that extends between the high-voltage interlock receivers 219*a*, 219*b*. This metallic element forms a closed circuit with the wires contained within the plurality of high-voltage interlock projections 690*a*, 690*b* when the male terminal assembly 430 is properly connected within the female terminal 800. Closing this circuit allows power to be applied to the terminals (the male terminal assembly 430 and the female terminal 800). It should be understood that until and unless this circuit is completed, power will not be supplied to the terminals (the male terminal assembly 430 and the female terminal 800. As described above, this helps prevent foreign bodies from contacting the terminals the male terminal assembly 430 and the female terminal 800) when power is applied to them. It should be understood that other types of high-power interlocks may be utilized in addition to or in replace of the interlock 217 disclosed herein. Such interlocks may be described within U.S. Pat. Nos. 7,084,361, 7,586,722, 7,641,499, and 8,597,043. The high-voltage interlock receivers 219*a*, 219*b* and high-voltage interlock projections 690*a*, 690*b* are made from a non-conductive material and are typically formed from a rigid plastic.

C. Male Terminal Assembly

FIGS. 2-14, 16-20, 25, 35-40, and 42-43, provide various views of the male terminal assembly 430 for this first embodiment, while other embodiments of the male terminal assembly are shown in FIGS. 49-55. Referring specifically to the first embodiment, the male terminal assembly 430 includes a spring member 440*a* and a male terminal 470. The male terminal 470 includes a male terminal body 472 and a male terminal connection member or plate 474. Said male terminal body 472 includes: (i) a first or front male terminal wall 480, (ii) an arrangement of male terminal side walls 482*a*-482*d*, and (iii) a second or rear male terminal wall 484. The combination of these walls (the front male terminal wall 480 and the arrangement of male terminal side walls 482*a*-482*d*) forms a spring receiver 486. The spring member 440*a* includes an arrangement of spring member side walls 442*a*-442*d* and a rear spring wall 444.

Figure 5:
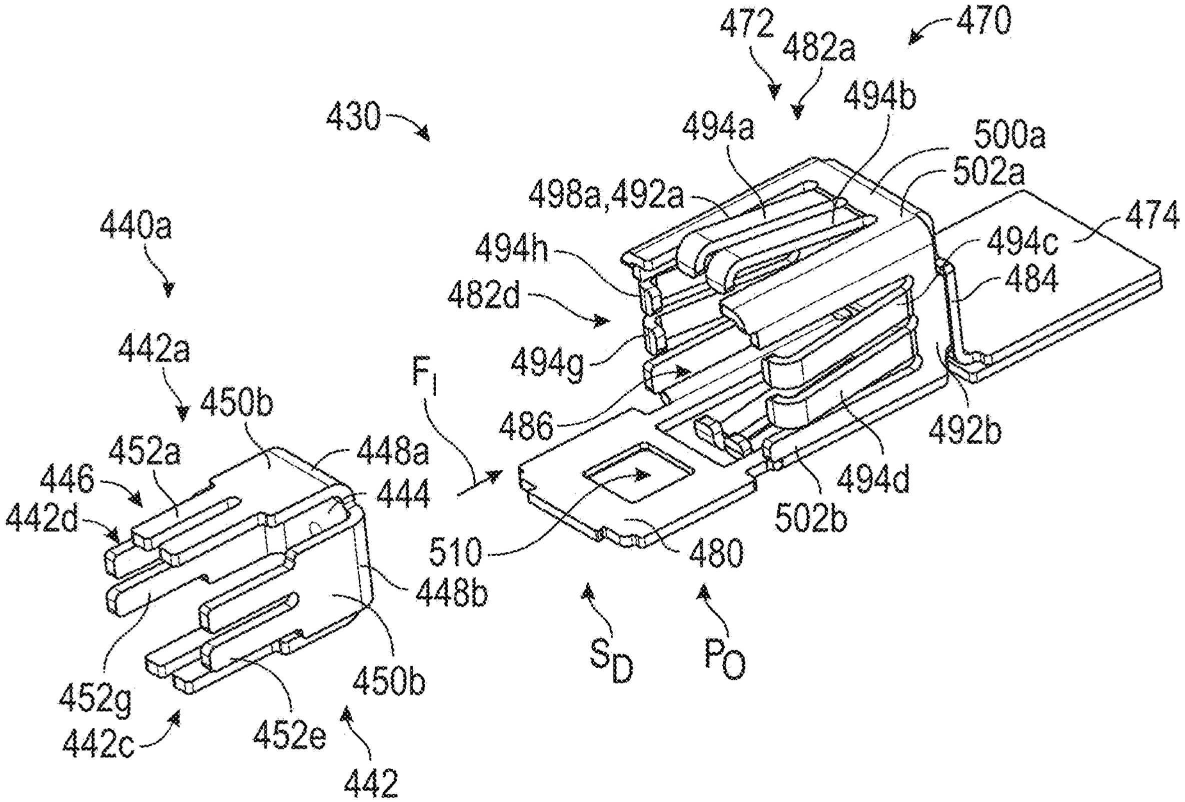
FIG. 5 is a frontal view of the male terminal assembly, wherein a spring member is separated from a male terminal.
Figure 6:
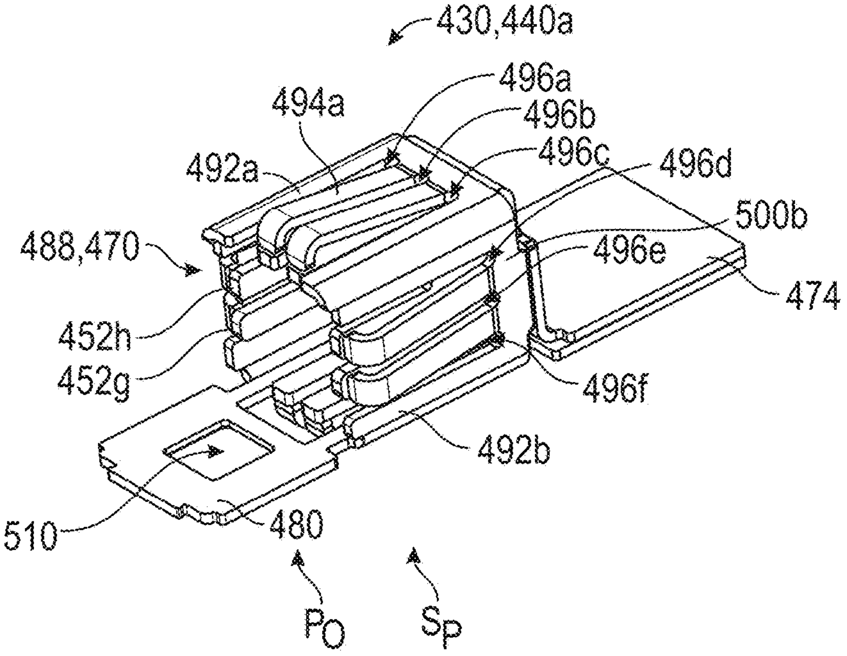
FIG. 6 is a frontal view of the male terminal assembly, wherein the spring member is positioned within the male terminal receiver.

Referring to FIGS. 5-6, the arrangement of spring member side walls 442*a*-442*d* each is comprised of: (i) a first or arched spring section 448*a*-448*d*, (ii) a second spring section, a base spring section, or a middle spring section 450*a*-450*d*, and (iii) a third section or spring arm 452*a*-452*h*. The arched spring sections 448*a*-448*d* extend between the rear spring wall 444 and the base spring sections 450*a*-450*d* and position the base spring sections 450*a*-450*d* substantially perpendicular to the rear spring wall 444. In other words, the outer surface of the base spring sections 450*a*-450*d* is substantially perpendicular to the outer surface of the rear spring wall 444.

The base spring sections 450*a*-450*d* are positioned between the arched spring sections 448*a*-448*d* and the spring arms 452*a*-452*h*. As shown in FIG. 5-6, the base spring sections 450*a*-450*d* are not connected to one another and thus middle section gaps are formed between the base spring sections 450*a*-450*d* of the spring member 440*a*. The gaps aid in omnidirectional expansion of the spring arms 452*a*-452*h*, which facilitates the mechanical coupling between the male terminal 470 and the female terminal 800. The spring arms 452*a*-452*h* extend from the base spring sections 450*a*-450*d* of the spring member 440*a*, away from the rear spring wall 444, and terminate at the free end 446. The spring arms 452*a*-452*h* are generally coplanar with the base spring sections 450*a*-450*d* and as such the outer surface of the spring arms 452*a*-452*h* are coplanar with the outer surface of the base spring sections 450*a*-450*d*. Unlike the spring arm 31 that is disclosed within FIGS. 4-8 of PCT/US2018/019787, the free end 446 of the spring arms 452*a*-452*h* does not have a curvilinear component. Instead, the spring arms 452*a*-452*h* have a substantially planar outer surface. This configuration is beneficial because it ensures that the forces associated with the spring member 440*a* are applied substantially perpendicular to the free end 488 of the male terminal body 472. In contrast, the curvilinear components of the spring arm 31 are disclosed within FIGS. 4-8 of PCT/US2018/019787 do not apply a force in this manner.

Like the base spring sections 450*a*-450*d*, the spring arms 452*a*-452*h* are not connected to one another. In other words, there are spring arm openings that extend between the spring arms 452*a*-452*h*. Due to the spring arm openings and the spring finger apertures, the individual spring arms 452*a*-452*h* are not connected to one another or connected to a structure other than the base spring sections 450*a*-450*d*. This configuration allows for the omnidirectional movement of the spring arms 452*a*-452*h*, which facilitates the mechanical coupling between the male terminal 470 and the female terminal 800. In other embodiments, the spring arms 452*a*-452*h* may be coupled to other structures to restrict their omnidirectional expansion. The number and width of individual spring arms 452*a*-452*h* and openings may vary. In addition, the width of the individual spring arms 452*a*-452*h* is typically equal to one another; however, in other embodiments one of the spring arms 452*a*-452*h* may be wider than other spring arms.

The spring member 440*a* is typically formed from a single piece of material (e.g., metal). Therefore, the spring member 440*a* is a one-piece spring member 440*a* or has integrally formed features. In particular, the following features are integrally formed: (i) the rear spring wall 444, (ii) the arched spring sections 448*a*-448*d*, (iii) the base spring sections 450*a*-450*d*, and (iii) the spring arm 452*a*-452*h*. To integrally form these features, the spring member 440*a* is typically formed using a die forming process. The die forming process mechanically forces the spring member 440*a* into shape. As discussed in greater detail below and in PCT/US2019/036010, when the spring member 440*a* is formed from a flat sheet of metal, installed within the male terminal 472 and connected to the female terminal 800, and is subjected to elevated temperatures, the spring member 440*a* applies an outwardly directed spring thermal force $S_{TF}$ on the contact arms 494*a*-494*h* due in part to the fact that the spring member 440*a* attempts to return to a flat sheet. However, it should be understood that other types of forming the spring member 440*a* may be utilized, such as casting or using an additive manufacturing process (e.g., 3D printing). In other embodiments, the features of the spring member 440*a* may not be formed from a one-piece or be integrally formed, but instead formed from separate pieces that are welded together.

Figure 48A:
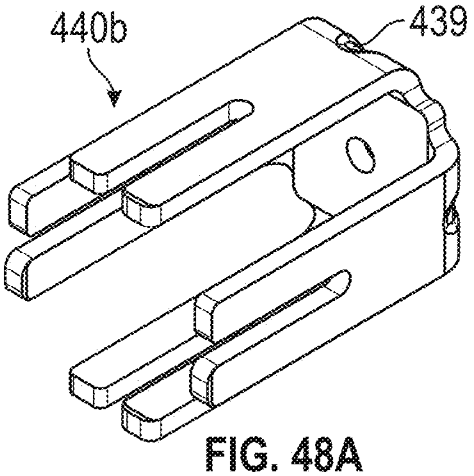
FIG. 48A-48B show a second embodiment of a spring that may be utilized in connection with the first and second shielded connector systems.
Figure 48B:
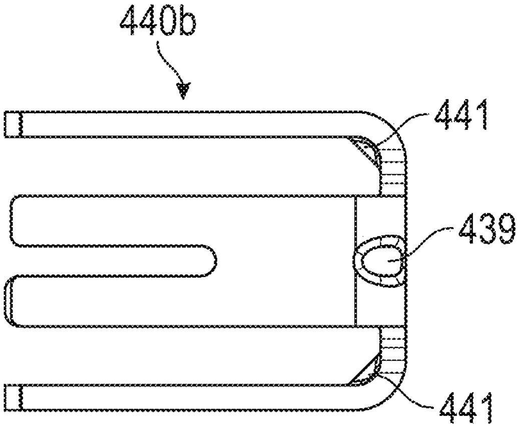
Figure 49:
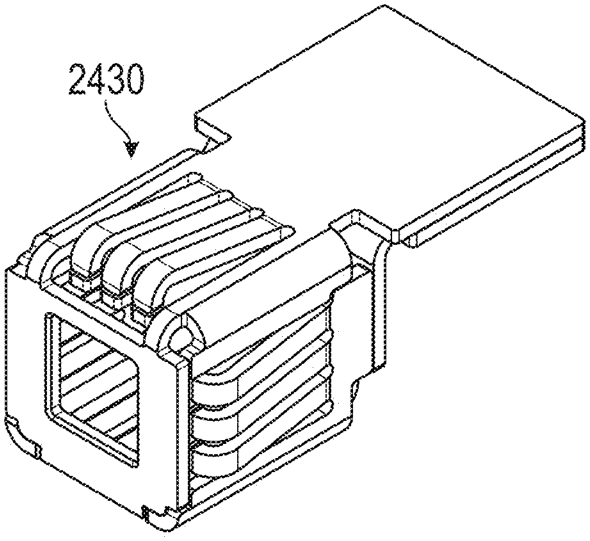
FIGS. 49-55 show alternative embodiments of male terminal assemblies that may be utilized in connection with the first and second shielded connector systems.
Figure 50:
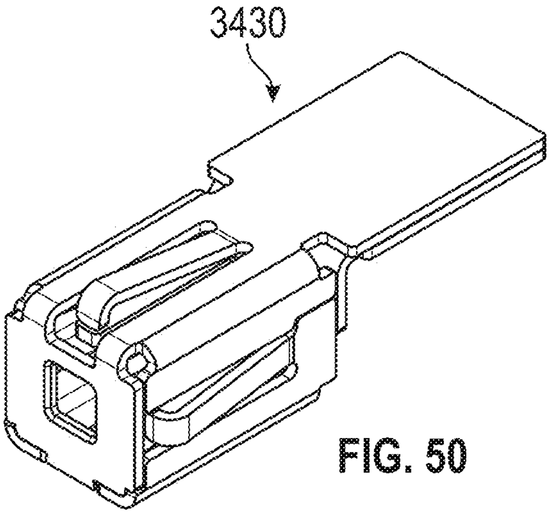

FIGS. 48A-48B show views of a different embodiment of the spring member 440*b* that are configured to function with the first embodiment of the male terminal 470. The primary differences between the first and second embodiments include two alterations to the configuration of the spring members 440*a*, wherein these alterations include: (i) recess 439 and associated strengthening rib 441 and (ii) the width of the base spring sections 450*a*-450*d*. As discussed in PCT/US2019/036010, these changes to the configuration of the spring members 440*a* alter the forces that are associated with the spring member 440*a*. In particular, the spring biasing force $S_{BF}$ is the amount of force that is applied by the spring member 440*a* to resist the inward deflection of the free end 446 of the spring member 440*a* when the male terminal assembly 430 is inserted within the female terminal 800. Specifically, this inward deflection occurs during the insertion of the male terminal assembly 430 due to the fact that an extent of an outer surface of the male terminal body 472 is slightly larger than the interior of the female terminal 800. Thus, when the male terminal assembly 430 is inserted into the female terminal 800, the extent of the outer surface is forced towards the center 490 of the male terminal 470. This inward force on the outer surface displaces the free end 446 of the spring member 440*a* inward (i.e., towards the center 490). The spring member 440*a* resists this inward displacement by providing a spring biasing force $S_{BF}$. Also, as discussed within PCT/US2019/036010, the first embodiment of the spring member 440*a* has a higher insertion force and thus a larger spring biasing force $S_{BF}$ in comparison to the second embodiment of the spring member 440*b*.

FIGS. 4, 7-14, and 16-25 show the first embodiment of the male terminal 470. As discussed above, the first embodiment of the male terminal 470 includes the male terminal body 472 and a male terminal connection plate 474. Specifically, the male terminal connection plate 474 is coupled to the male terminal body 472 and is configured to receive an extent of a structure (e.g., lead or wire, as shown in FIGS. 8 and 11) that connects the male terminal assembly 430 to a device (e.g., an alternator) outside of the shielded connector system 100. The wire 590 is typically welded to the connection plate 474; however, other methods (e.g., forming the wire 590 as a part of the connection plate 474) of connecting the wire 590 to the connection plate 474 are contemplated by this disclosure.

As shown in FIGS. 2, 8, 11, 20, 25, and 42-43, the arrangement of male terminal side walls 482*a*-482*d* are coupled to one another and generally form a rectangular prism. The arrangement of male terminal side walls 482*a*-482*d* includes: (i) a side wall portion 492*a*-492*d*, which generally has a “U-shaped” configuration, (ii) contact arms 494*a*-494*h*, and (iii) a plurality of contact arm openings 496*a*-496*l*. As best shown in FIGS. 2, 5-6, and 42, the side wall portions 492*a*-492*d* are substantially planar and have a U-shaped configuration. The U-shaped configuration is formed from three substantially linear segments, wherein a second or intermediate segment 500*a*-500*d* is coupled on one end to a first or end segment 498*a*-498*d* and on the other end to a third or opposing end segment 502*a*-502*d*. The contact arms 494*a*-494*h* extend: (i) from an extent of the intermediate segment 500*a*-500*d* of the side wall portion 492*a*-492*d*, (ii) away from the rear male terminal wall 484, (iii) across an extent of the contact arm openings 496*a*-496*l*, and (iv) terminate just short of the front male terminal wall 480. This configuration is beneficial over the configuration of the terminals shown in FIGS. 9-15, 18, 21-31, 32, 41-42, 45-46, 48 and 50 in PCT/US2018/019787 because it allows for: (i) can be shorter in overall length, which means less metal material is needed for formation and the male terminal 470 can be installed in narrower, restrictive spaces, (ii) has a higher current carrying capacity, (iii) is easier to assemble, (iv) improved structural rigidity because the contact arms 494*a*-494*h* are positioned inside of the first male terminal side wall portion 492*a*-492*d*, (iv) benefits that are disclosed in connection with PCT/US2019/036010, and (v) other beneficial features that are disclosed herein or can be inferred by one of ordinary skill in the art from this disclosure.

The arrangement of contact arm openings 496*a*-496*l* is integrally formed with the intermediate portion 500*a*-500*d* of the male terminal side walls 482*a*-482*d*. The contact arm openings 496*a*-496*l* extend along the lateral length of the contact arms 494*a*-494*h* in order to create a configuration that permits the contact arms 494*a*-494*h* not to be laterally connected to: (i) another contact arm 494*a*-494*h* or (ii) a structure other than the extent of the male terminal side wall portion 492*a*-492*d* to which the contact arms 494*a*-494*h* are coupled thereto. Additionally, the contact arm openings 496*a*-496*l* are aligned with the spring arm openings. This configuration of openings forms the same number of spring arms 452*a*-452*h* as the number of contact arms 494*a*-494*h*. In other words, FIGS. 5-6 show eight spring arms 452*a*-452*h* and eight contact arms 494*a*-494*h*. Additionally, these figures show that the width of the spring arms 452*a*-452*h* substantially matches the width of the contact arms 494*a*-494*h*. It should be understood that in other embodiments, the number of spring arms 452*a*-452*h* may not match the number of contact arms 494*a*-494*h*. For example, there may be fewer one spring arms 452*a*-452*h*.

Figure 39:
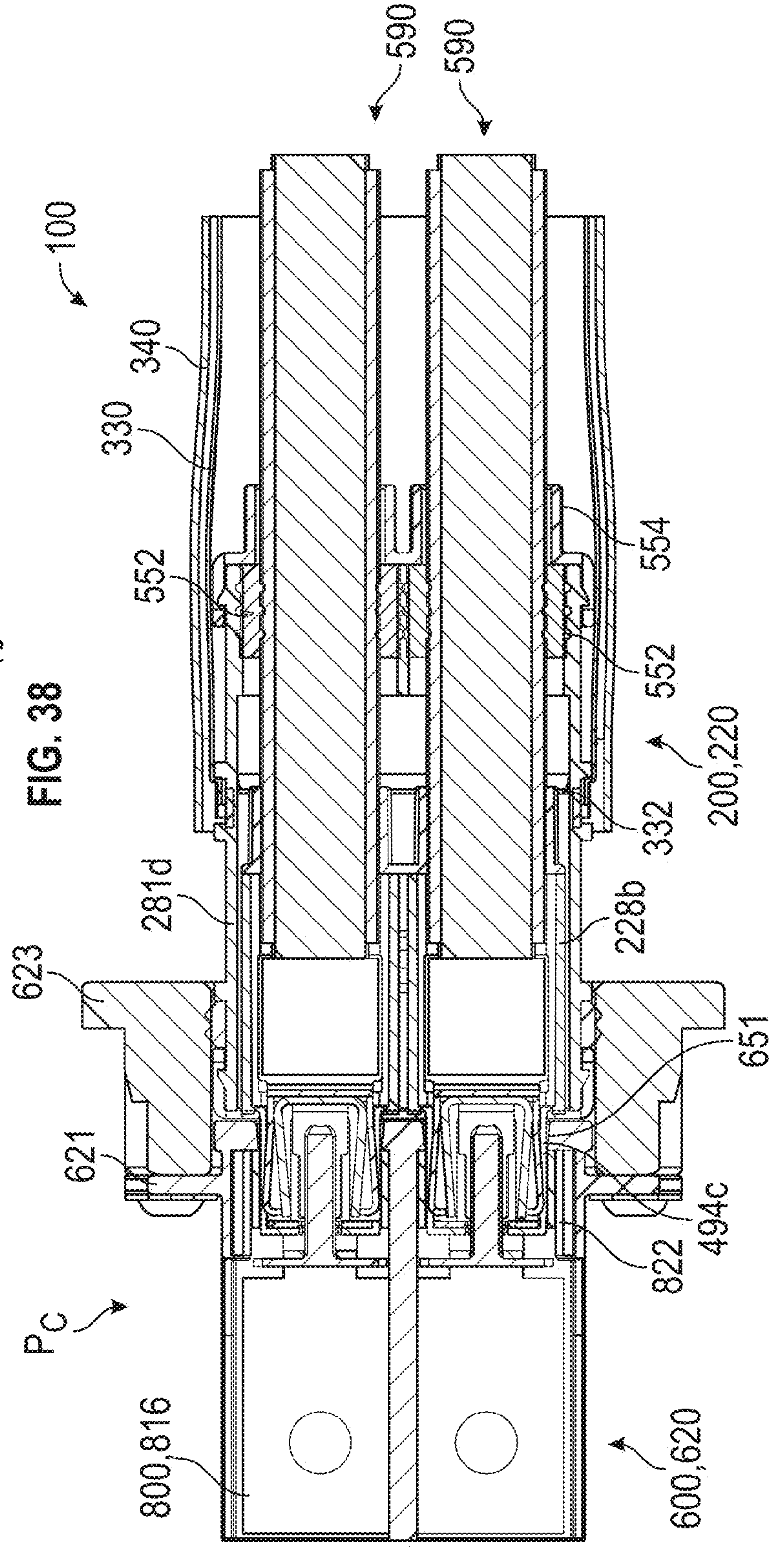
FIG. 39 is a cross-sectional view of the shielded connector system taken along the 39-39 line of FIG. 38.
Figure 40:
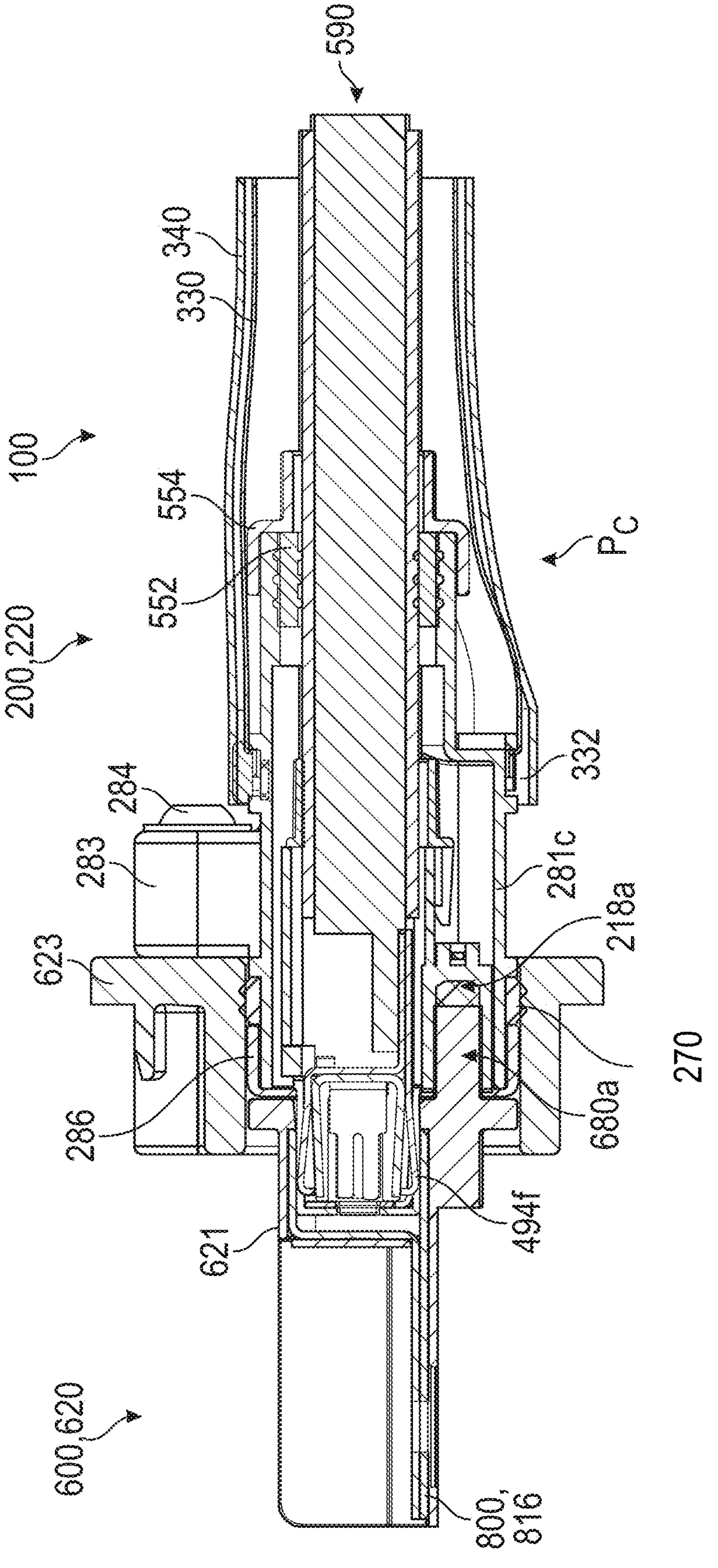
FIG. 40 is a cross-sectional view of the shielded connector system taken along the 40-40 line of FIG. 38.

The contact arms 494*a*-494*h* extend away from the rear male terminal wall 484 at an outward angle. In particular, the outward angle may be between 0.1 degree and 16 degrees between the outer surface of the extent of the male terminal side wall 492*a*-492*d* and the outer surface of the first extent of the contact arms 494*a*-494*h*, preferably between 5 degrees and 12 degrees and most preferably between 7 degrees and 8 degrees. This outward angle is shown in multiple figures, but may be best visualized in connection with FIGS. 25, 36-37, 39, and 40. This configuration allows the contact arms 494*a*-494*h* to be deflected or displaced inward and towards the center 490 of the male terminal 470 by the female terminal 800, when the male terminal assembly 430 is inserted into the female terminal 800. This inward deflection is best shown in FIGS. 39-40 and other figures contained within PCT/US2019/036010. This inward deflection helps ensure that a proper mechanical and electrical connection is created by ensuring that the contact arms 494*a*-494*h* are placed in contact with the female terminal 800.

As shown in FIGS. 5-6, 20, 36-37, and 39-40, the terminal ends of the contact arms 494*a*-494*h* are positioned: (i) within an aperture formed by the U-shaped side wall portions 492*a*-492*d*, (ii) within the spring receiver 486, (iii) substantially parallel to the male terminal side wall portions 492*a*-492*d*, and (iv) in contact the planar outer surface of the spring arms 452*a*-452*h*, when the spring member 440*a* is inserted into the spring receiver 486. This configuration is beneficial over the configuration shown in FIGS. 3-8 in PCT/US2018/019787 because the assembler of the male terminal assembly 430 does not have to apply a significant force in order to deform a majority of the contact arms 494*a*-494*h* outward to accept the spring member 440*a*. This required deformation can best be shown in FIG. 6 of PCT/US2018/019787 due to the slope of the contact arm 11 and the fact the outer surface of the spring arm 31 and the inner surface of the contact arm 11 are adjacent to one another without a gap formed therebetween. In contrast to FIGS. 3-8 in PCT/US2018/019787, FIGS. 6, 37-38, 40, 43, and 46 of the present application show a gap that is formed between the outer surfaces of the spring member 440*a* and the inner surface of the contact arms 494*a*-494*h*. Accordingly, very little force is required to insert the spring member 440*a* into the spring receiver 486 due to the fact the assembler does not have to force the contact arms 494*a*-494*h* to significantly deform during the insertion of the spring member 440*a*.

The male terminal 470 is typically formed from a single piece of material (e.g., metal). Therefore, the male terminal 470 is a one-piece male terminal 470 and has integrally formed features. To integrally form these features, the male terminal 470 is typically formed using a die-cutting process. However, it should be understood that other types of forming the male terminal 470 may be utilized, such as casting or using an additive manufacturing process (e.g., 3D printing). In other embodiments, the features of the male terminal 470 may not be formed from a one-piece or be integrally formed, but instead formed from separate pieces that are welded together. In forming the male terminal 470, it should be understood that any number (e.g., between 1 and 100) of contact arms 494*a*-494*h* may be formed within the male terminal 470.

Positioning the spring member 440*a* within the male terminal assembly 430 occurs across multiple steps or stages. FIG. 5 provides the first embodiment of the male terminal assembly 430 in a disassembled state $S_D$ FIG. 6 provides the first embodiment of the male terminal assembly 430 in a partially assembled state $S_P$ and FIG. 8 provides the first embodiment of the male terminal assembly 430 in an assembled state $S_A$. The first stage of assembling the male terminal assembly 430 is shown in FIG. 5, where the front male terminal wall 480 is in an open or flat position $P_O$ and the spring member 440*a* is separated from the male terminal 470. In this open position $P_O$ the front male terminal wall 480 is substantially co-planar with the male terminal side wall 482*c*. This configuration of the male terminal 470 exposes the spring receiver 486 and places the male terminal 470 in a state that is ready for receiving the spring member 440*a*. The second stage of assembling the male terminal assembly 430 is shown in FIG. 6, where the front male terminal wall 480 is in an open or horizontal position $P_O$ and the spring member 440*a* is positioned within or inserted into the spring receiver 486. To reach the inserted state, an insertion force, $F_I$, has been applied to the spring member 440*a* to insert the spring member 440*a* into the spring receiver 486. The insertion force, $F_I$, is applied on the spring member 440*a* until the second or rear male terminal wall 484 is positioned adjacent to the rear spring wall 444, a free end 488 of the male terminal 470 is substantially aligned with a free end 446 of the spring member 440*a*, and a portion of the male terminal side walls 482*a*-482*d* are positioned adjacent a portion of the spring member side walls 442*a*-442*d*.

The third stage of assembling the male terminal assembly 430 is shown in FIG. 8, where: (i) the front male terminal wall 480 is closed or vertical $P_{CL}$ and (ii) the spring member 440*a* is positioned within the spring receiver 486. To close the front male terminal wall 480, an upward directed force is applied to the front male terminal wall 480 to bend it about its seam to place it adjacent to the side walls 482*a*-482*d*. After the front male terminal wall 480 is in the proper position, the top edge is coupled (e.g., welded) to the side wall 482*a*-482*d* of the male terminal body 472. Here, the closed or vertical $P_{CL}$ of the front male terminal wall 480 ensures that the spring member 440*a* is retained within the male terminal 470. It should be understood that in other embodiments, the front male terminal wall 480 may be omitted, may not have a touch proof probe opening 510 therethrough, may not extend the entire way from side wall 482*a*-482*d* (e.g., partially extending from any side wall 482*a*-482*d*), or may be a separate piece that is coupled to both side walls 482*a*-482*d*.

D. Coupling of the Male Terminal within the Internal Male Housing

Figure 7:
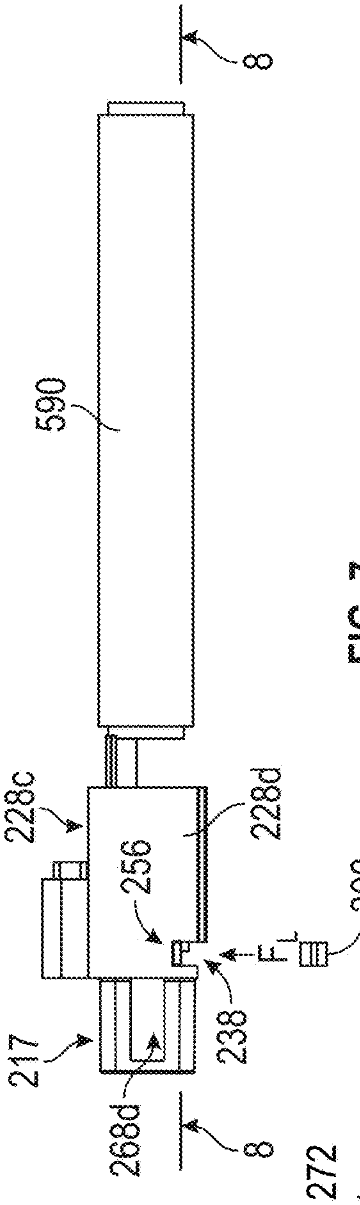
FIG. 7 is a side view of an extent of the male connector assembly of FIG. 3 in a partially installed state, wherein the male terminal is partially inserted into the interior male housing, male locking member is separated from the male housing, and the external housing of the male connector assembly is omitted.
Figure 9:
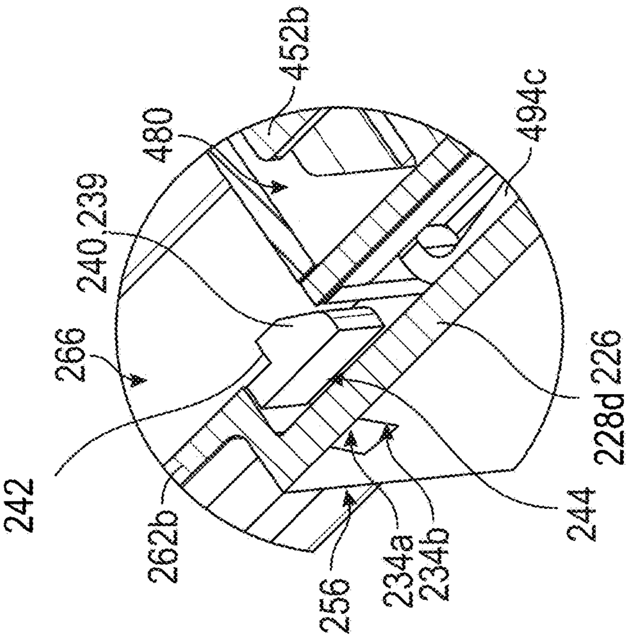
FIG. 9 is a zoomed-in view of area A of male connector assembly in FIG. 8.
Figure 8:
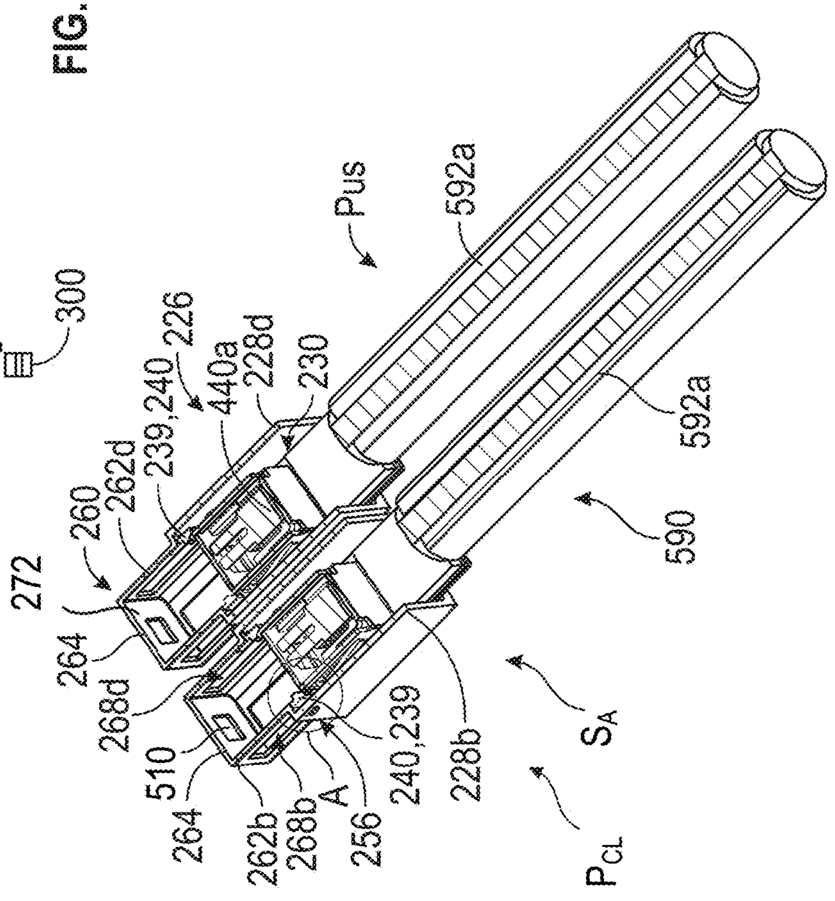
FIG. 8 is a cross-sectional view of the male connector assembly taken along line 8-8 of FIG. 7.

FIGS. 4 and 7-12 show the positioning of the male terminal assembly 430 within the internal male housing 224, which occurs across multiple steps or stages to move the male terminal assembly 430 from an unseated position $P_{US}$ into a seated position $P_S$. The first step in this process is shown in FIGS. 7-9 and starts with securing the male terminal assembly 430 within the receptacle 260 using a male securing means 239. The male securing means 239 in this exemplary embodiment includes a securing arm 240. A first insertion force, $F_I$, on the male terminal assembly 430 causes securing arms 240 to interact with the front male terminal wall 480 of the male terminal assembly 430. This interaction will cause the securing arms 240 to elastically deform outward and towards the side walls 228*b*, 228*d* of the front male housing body 226 and into the securing arm gap 244. Positioning an extent of the securing arms 240 within the securing arm gap 244 will increase the size of the opening and will allow the male terminal assembly 430 to be inserted into the receptacle 260. It should be understood that the assembler must apply a sufficient amount of insertion force, $F_I$, to cause the securing arms 240 to elastically deform. Without applying a sufficient amount of insertion force, $F_I$, the assembler will not be able to cause the securing arms 240 to elastically deform; thus, the assembler will not be able to position the male terminal assembly 430 within the male housing assembly 220. Also, it should be understood that the width of the securing arm projection 242, the length the securing arm 240, the thickness of the securing arm 240, and the material of the securing arm 240 will alter the amount of insertion force $F_I$ that is necessary to couple the male terminal assembly 430 to the male housing assembly 220.

Figure 10:
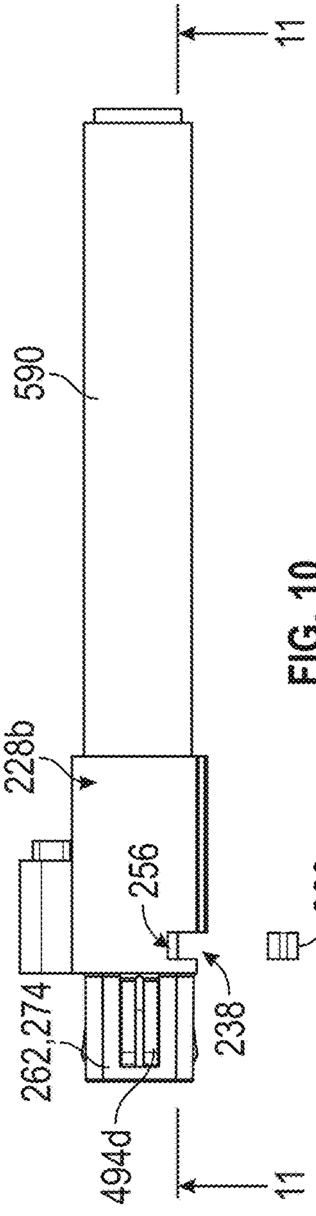
FIG. 10 is a side view of an extent of the male connector assembly of FIG. 3 in a seated and unlocked positon, wherein the male terminal assembly is fully inserted within an extent of the male housing and male locking member is separated from the male housing.
Figure 11:
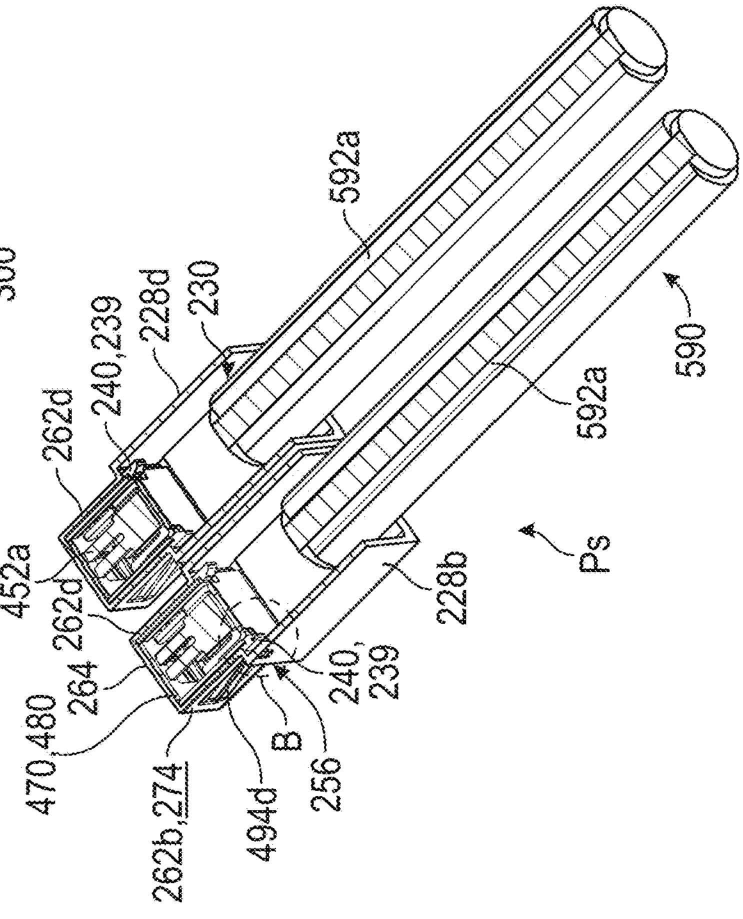
FIG. 11 is a perspective cross-sectional view of the male connector assembly taken along line 11-11 of FIG. 10.
Figure 12:
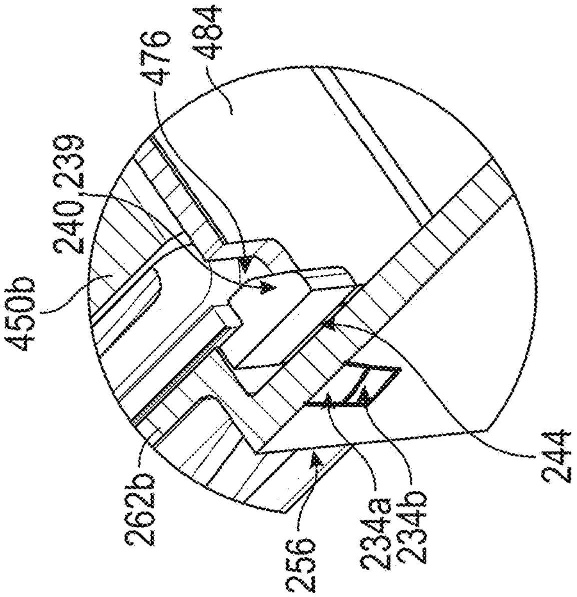
FIG. 12 is a zoomed-in view of area B of male connector assembly in FIG. 11.

The next step in the process is shown in FIGS. 10-12 and occurs when the assembler applies a second insertion force, $F_I$, on the male terminal assembly 430 to cause: (i) the front male terminal wall 480 to be positioned against the inner surface 272 of the front wall 264, (ii) the contact arms 494*a*-494*h* to be positioned within the male terminal openings 268*a*-268*d*. At this point, the securing arms 240 can return to their original or non-deformed state due to the fact the securing arms 240 can fit into a securing arm receiver 476 that is formed in the rear male terminal wall 484 of the male terminal 470. The return of the securing arms 240 may cause an audible sound (e.g., click) when it moves from the deformed state to the original or non-deformed state. This audible sound will inform the assembler that the male terminal assembly 430 is properly connected within the male housing assembly 220; thus meeting industry standards and/or requirements (e.g., USCAR). Once the securing arms 240 are returned to their original state, the male terminal assembly 430 is fully seated within the internal male housing 224.

Figure 13:
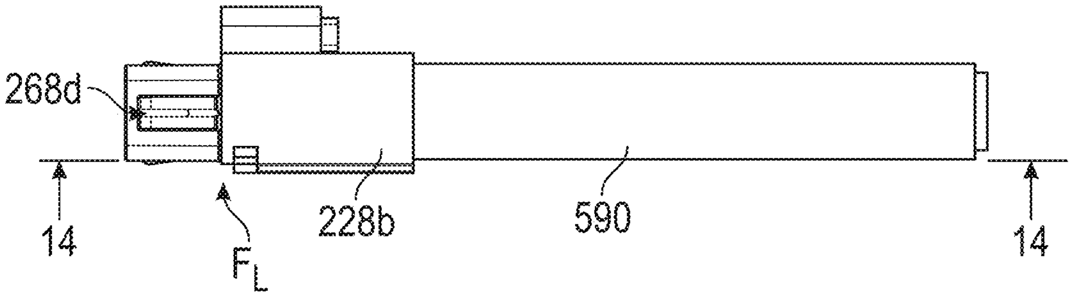
FIG. 13 is a side view of an extent of the male connector assembly of FIG. 3 in a seated and locked positon, wherein the male terminal assembly is fully inserted within an extent of the male housing and the male locking member is engaged with the male housing.
Figure 14:
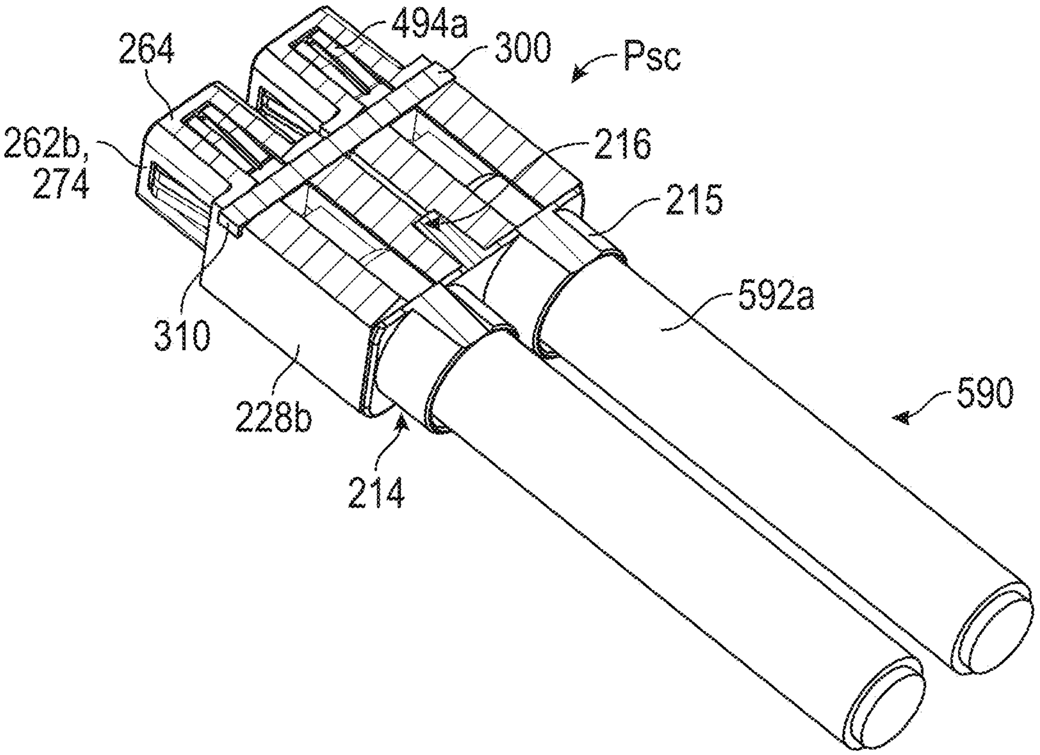
FIG. 14 is a perspective cross-sectional view of the male connector assembly of FIG. 13, taken along line 14-14 of FIG. 13.
Figure 15:
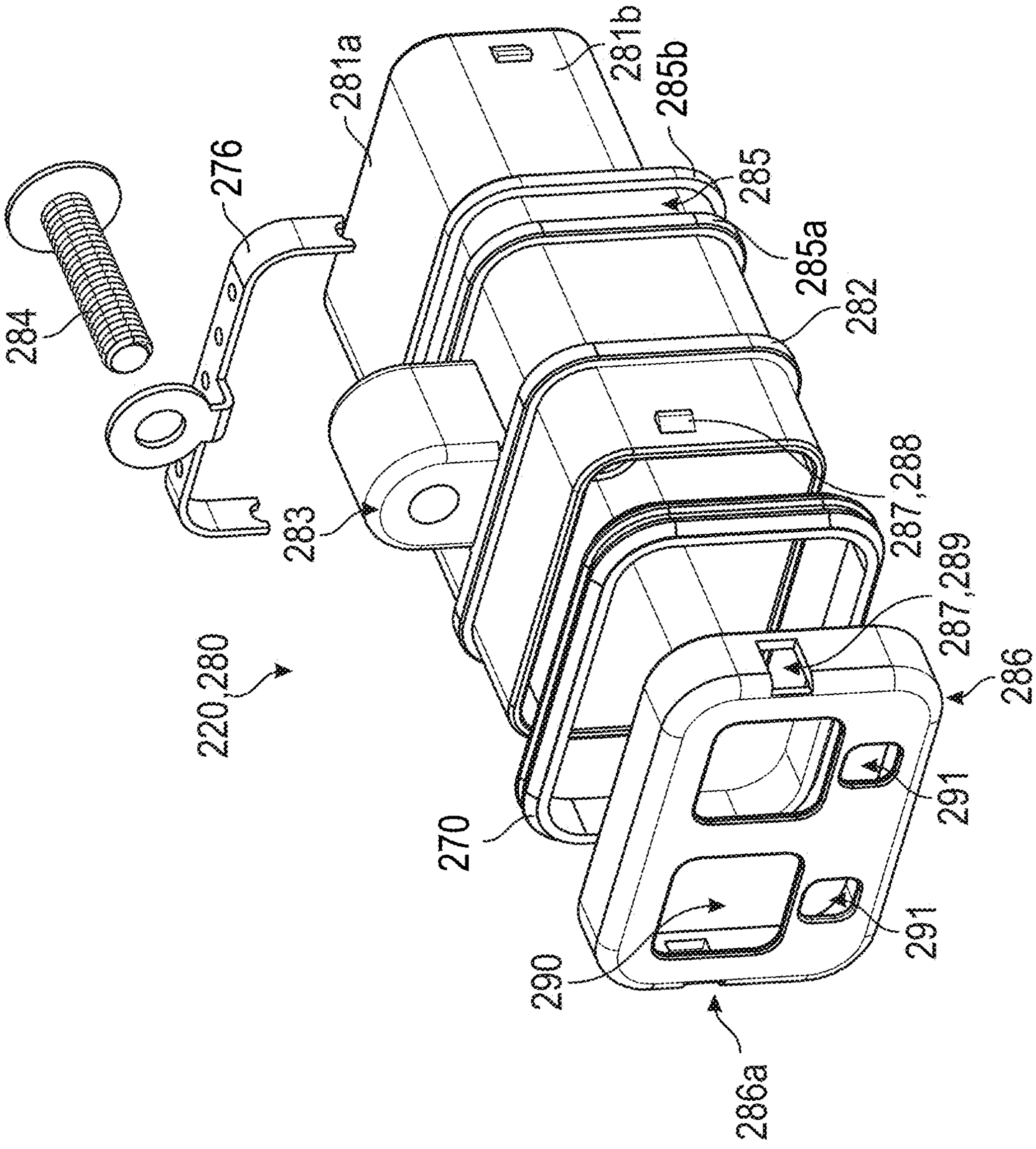
FIG. 15 is an exploded view of an extent of the male housing of FIGS. 2-4.
Figure 16:
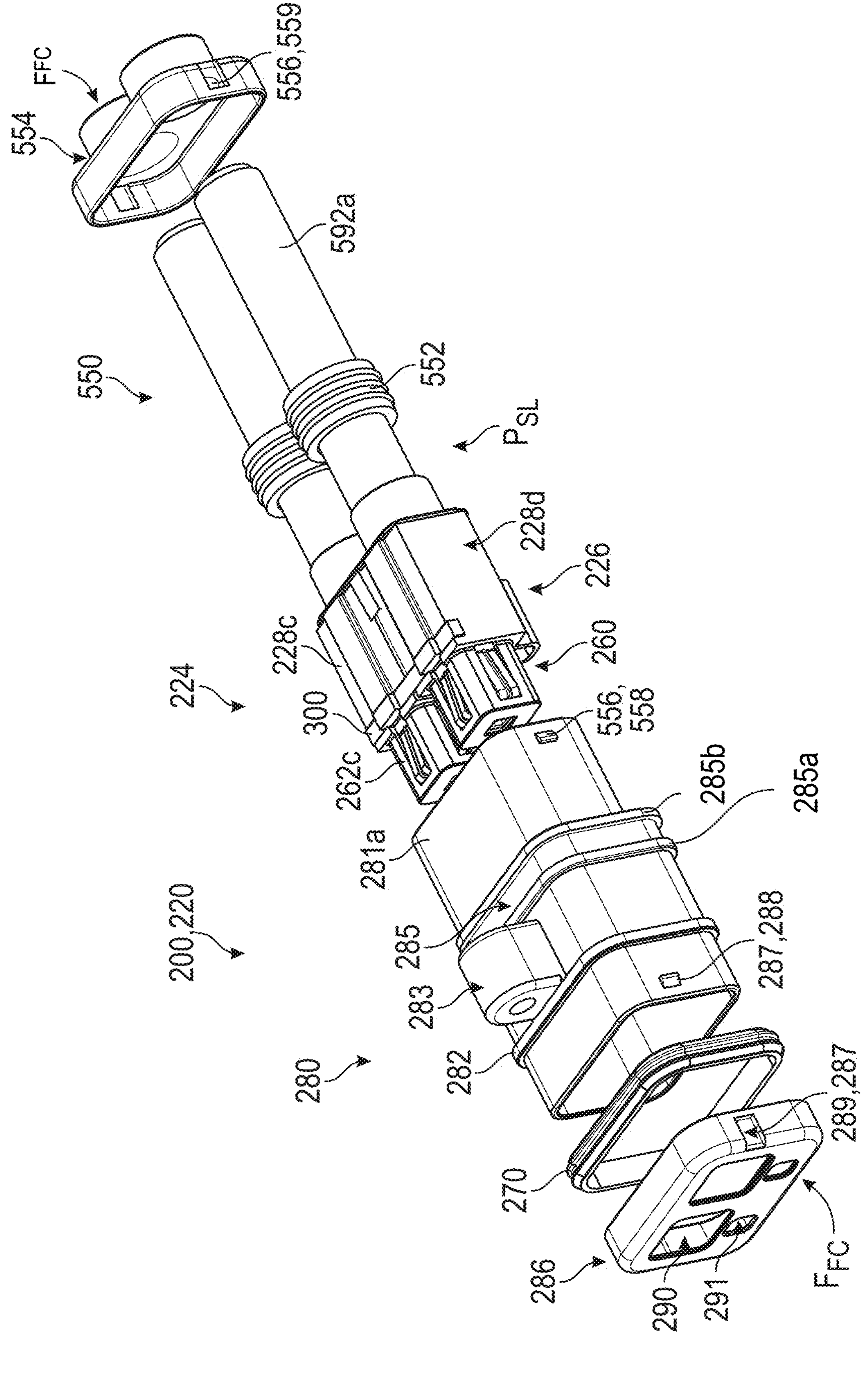
FIG. 16 is an exploded view of an extent of the male connector assembly of FIG. 3.

The final step in the process is shown in FIGS. 13-14 and occurs when the assembler applies a locking force, $F_L$, on the male locking member 300. The application of the locking force $F_L$ on the male locking member 300 will cause a first extent 310 of the male locking member 300 to elastically deform outward in order to overcome the male locking member projections 234*a*, 234*b*. Meanwhile, the application of the locking force, $F_L$, on the male locking member 300 will not cause a second extent of the male locking member 300 to elastically deform in the same manner as the first extent 310. The first extent 310 elastically deforms in a different manner than the second extent due to the configuration of the internal male housing 224. Specifically, the first extent 310 travels against the outside surface of the side walls 228*b*, 228*d* and must pass over the locking member projections 234*a*, 234*b*, while the second extent travels against the inside surface of the side walls 228*b*, 228*d* and does not have to pass over any locking member projections 234*a*, 234*b*.

Once the male locking member 300 has overcome the second male locking member projection 234*b*, the first extent 310 of the male locking member 300 will return to its original or non-deformed state. The return of the first extent 310 of the male locking member 300 may cause an audible sound (e.g., click) when it moves from the deformed state to the non-deformed state. This audible sound will inform the assembler that the male locking member 300 is properly connected to the internal male housing 224; thus meeting industry standards and/or requirements (e.g., USCAR). Additionally, when the male locking member 300 is properly connected to the male housing assembly 220 (see FIG. 12), the second extent is positioned within the securing arm gap 244. Positioning the second extent within the securing arm gap 244 ensures that the male terminal assembly 430 cannot be removed from the male housing assembly 220 without damaging the housing 220 because the securing arms 240 cannot be elastically deformed into the securing arm gap 244 as the securing arm gap 244 is occupied by the second extent. At this point, the male terminal assembly 430 is in a seated and locked position $P_{SL}$, wherein the male terminal assembly 430 is properly coupled to the male housing assembly 220.

The male locking member 300 may also position an extent (not shown) of the male locking member 300 behind the male terminal assembly 430, when the male locking member 300 is properly connected to the male housing assembly 220. The extent of the male locking member 300 may be similar to the secondary lock, which is shown and described in connection with FIGS. 2, 19-20 and 25-29 of PCT/US2019/36070. This additional secondary lock may help further secure the male terminal assembly 430 to the internal male housing 224 and may reduce vibrational forces that are experienced by the male terminal assembly 430. In further embodiments, additional locking features may be utilized to lock the male terminal assembly 430 within the male terminal housing 220.

Without being able to disconnect the male terminal assembly 430 from the male housing assembly 220, it would be difficult for the assembler to couple (e.g., weld) the wire 590 to the male terminal assembly 430 without potentially compromising the integrity of the male housing assembly 220. Nevertheless, there are alternative embodiments that need this functionality. For example, the wire 590 may be coupled to the male terminal assembly 430 and then the housing may be formed around the male terminal assembly 430 using an injection molding or additive manufacturing process. In another example, the male housing assembly 220 may not need to be capable of being disassembled, if a different method (e.g., push in attachment method) of connecting the wire 590 to the male terminal assembly 430 was utilized. In further embodiments, the male housing 220 may be configured to provide a secondary locking component, such as the component 712 that is described in connection with the female housing in PCT/US2019/36070.

FIGS. 1-4, 7-12, and 30-49 show that the male connector assembly 200 has a linear configuration. In other words, an extent of the male terminal assembly 430 is positioned substantially parallel to the wire 590. When coupling the male connector assembly 200 to the female connector assembly 600, the assembler will apply a coupling force, $F_C$, that is substantially parallel to the wire 590. As discussed above, the male connector assembly 200 may have other configurations. For example, the overall shape of the male connector assembly 200 may be substantially "L-shaped." In other embodiments, the overall shape of the male connector assembly 200 may be between linear and L-shaped.

E. Cable Strain Relief Assembly

FIGS. 2, 4, 16-17, 20, 23, 25, 36-37, and 39-40 show views of a strain relief assembly 300, which is configured to: (i) absorb or suppress stress or strain that is applied to the cables 590 and (ii) seal the rear extent of the external male housing 280 in order to help maximize the efficiency of the external male housing's 280 shielding effects. To accomplish this, the strain relief assembly 550 utilizes a cable seal 552 and a retainer 554. The cable seals 552 are configured to fit over the cable and interact with the exterior coating 592*a* of the cable or wire 590. The cable seals 552 may be made form a flexible non-conductive material (e.g., silicon).

The cable seals 552 help absorb forces that may be applied to the cables 590. The retainer 554 has a rear wall that is configured to keep the cable seals 552 in the correct position. Like the seal 270 and the frontal cap 286, the retainer 554 may be formed from a non-conductive material (e.g., thermoplastic) or may be made from a conductive material (e.g., any of the materials discussed below). In certain embodiments, it is desirable to use a conductive material for at least the retainer 554 to help maximize the efficiency of the external male housing's 280 shielding effects.

The retainer 554 is configured to be coupled to the arrangement of side walls 281*a*-281*d* by a retainer coupling means 556. Specifically, the retainer coupling means 556 in this embodiment is: (i) a projection 558 that extends from side walls 281*b*, 281*d* and (ii) openings 559, which act as receivers for the projections 558. As shown in FIGS. 2, 4, 16-17, 20, 23, 25, 36-37 and 39-40, the retainer 554 can be coupled to the arrangement of side walls 281*a*-281*d* by applying a force, $F_{FC}$, to the retainer 554. The force, $F_{FC}$, must be sufficient to temporally deform an extent of the retainer 554 to allow the retainer 554 to slide over the projections 558. The return of the retainer 554 may cause an audible sound (e.g., click) when it moves from the deformed state to the original or non-deformed state. This audible sound will inform the assembler that the retainer 554 is properly connected to the external male housing 280; thus, meeting industry standards and/or requirements (e.g., USCAR).

F. Casing and a Securing Member

FIGS. 1-4, 18, 20, 25, 36-37, and 39-40 show a casing 330 and a securing member 332. The casing 330 is configured to be in electrical and mechanical contact with the external male housing 280 and is designed to cover at least an extent of the cable 590. Preferably, the casing 330 covers the entire cable and creates an electrical ground from end to end. The securing member 332 may be a ratchet type strap or may have a crimp type connector that couples both ends of the strap together. The securing member 332 is configured to fit between the grounding projections 285*a*, 285*b* and over the grounding leadframe 276. This configuration helps ensure that there is a proper ground path that extends from the fastener 284 to: i) the grounding leadframe 276, ii) the external male housing 280, and iii) the casing 330, which is facilitated by the strap or securing member 332.

Both the casing 330 and the securing member 332 may be made from a conductive material (e.g., metal or any conductive material that is described below). It should be understood that the casing 330 may be made from a woven or braided metal material or may be made from flexible conductive plastic. Specifically, the casing 330 and the securing member 332 may be made from stainless steel, nickel, aluminum, silver, gold, copper, nickel-plated copper, nickel-plated glass, steel, zinc, brass, bronze, iron, platinum, lead, molybdenum, calcium, tungsten, lithium, tin, or other similar metals. This design may be most effective for high energy electromagnetic fields created by alternated currents.

G. Protective Member

FIGS. 1-4, 18, 20, 25, 36-37, and 39-40 a protective member 340. The protective member 340 is configured to fit over the casing 330 and is designed to protect the casing 330 from the elements and foreign objects. The protective member 34 is made from a non-conductive material (e.g., rubber or heat shrink material). This helps isolate the casing 330 from other electrical systems contained within the system.

II. Female Connector Assembly

FIGS. 1-2 and 26-40 provide various views of the female connector assembly 600. The female connector assembly 600 includes: (i) a female housing assembly 620, (ii) a female terminal 800, and (iii) a touch proof probe 780. Like the male housing assembly 220, the female housing assembly 620 has complex geometry with a number of recesses and projections. In particular, the female housing assembly 620 has: (i) an external female housing 623 that is made from a conductive material and (ii) an internal female housing 621 that is made from a non-conductive material.

A. External Female Housing

Figure 30:
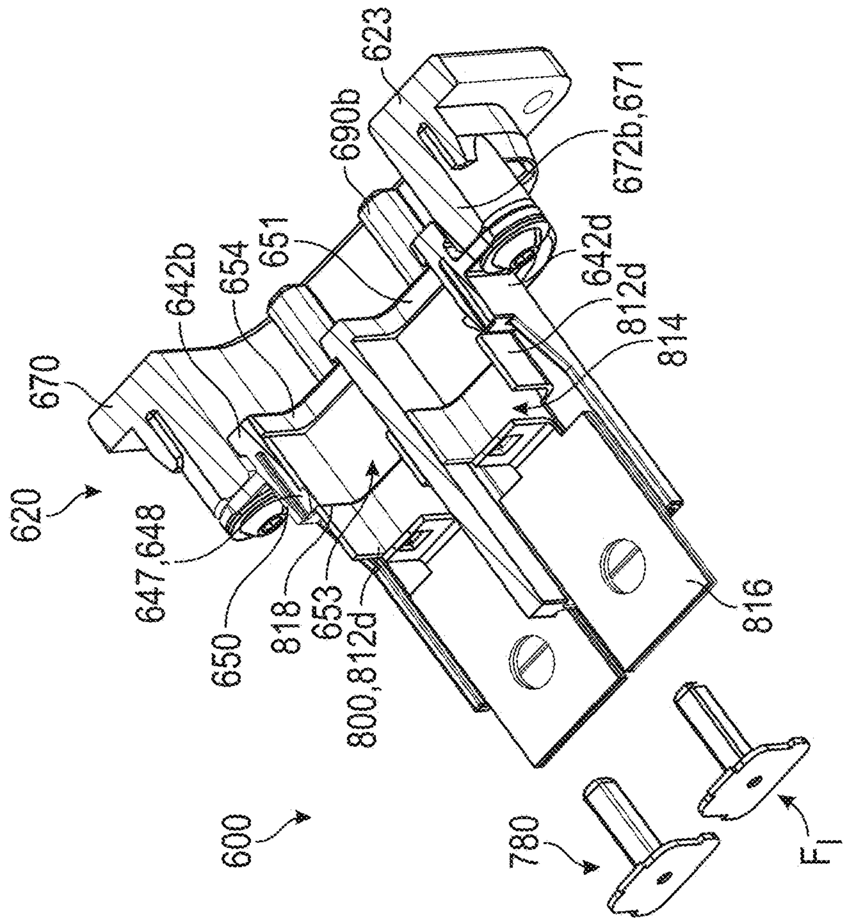
FIG. 30 is a cross-sectional view of the female connector assembly taken along the 30-30 line of FIG. 29.
Figure 29:
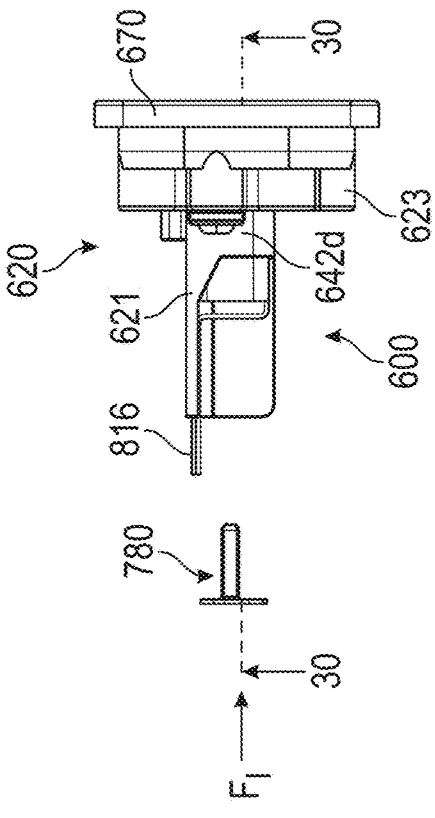
FIG. 29 is a side view of the female connector assembly of FIGS. 26 and 27, wherein the touch proof probe and the female terminal are partially separated from the female housing.
Figure 31:
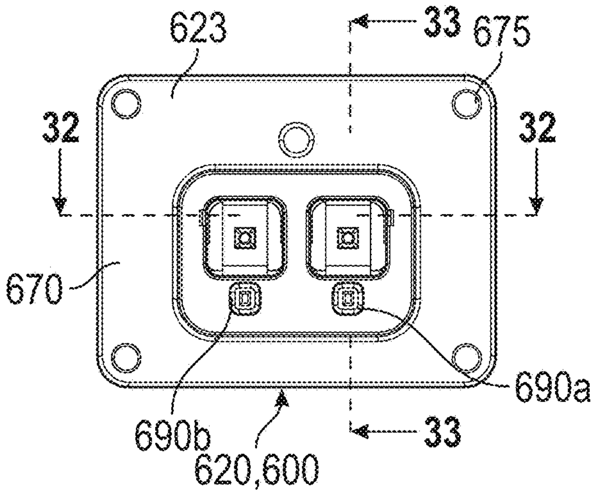
FIG. 31 is a front view of the female connector assembly of FIGS. 26 and 27.
Figure 32:
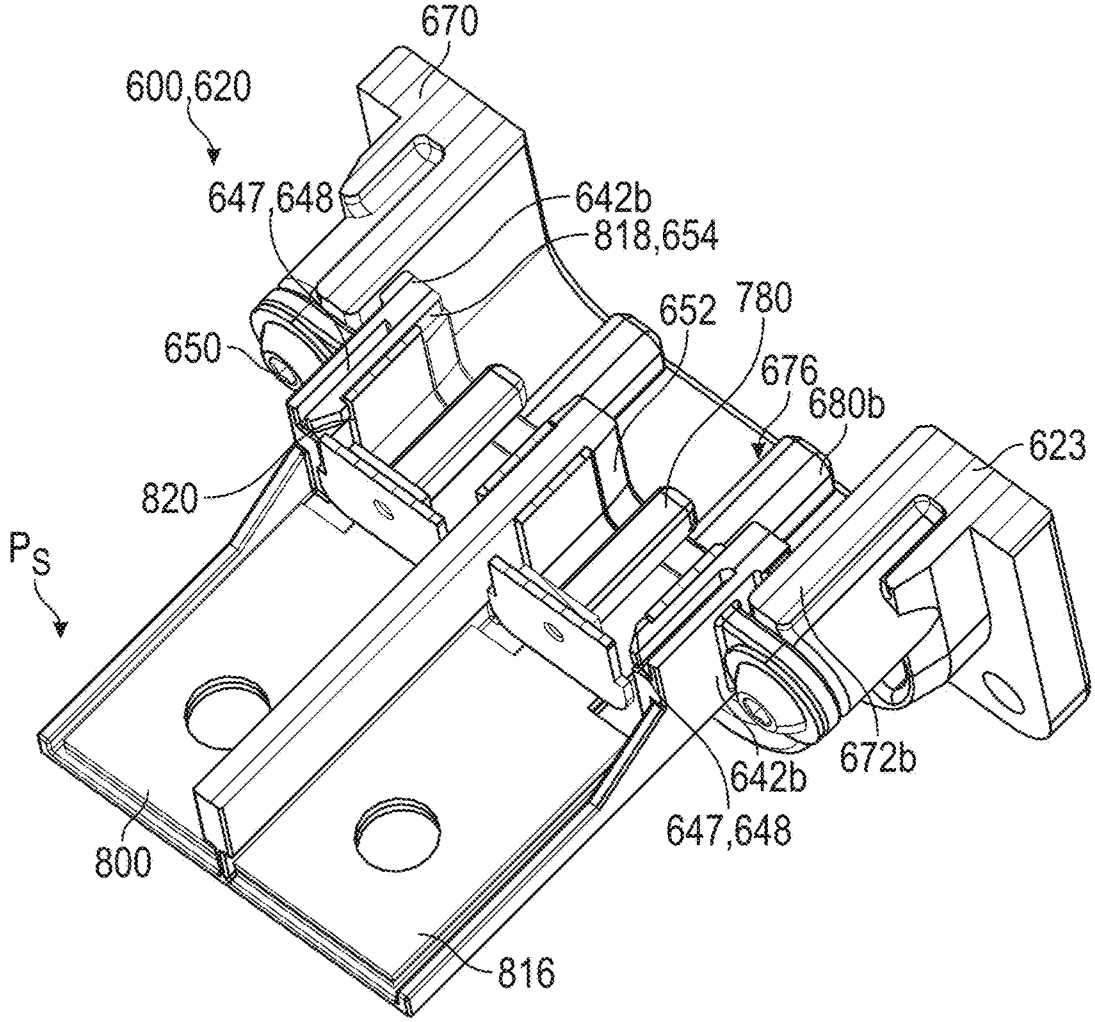
FIG. 32 is a cross-sectional view of the female connector assembly taken along the 32-32 line of FIG. 31.

The external female housing 623 includes: (i) a mounting flange 670, (ii) a body 671 that is formed from an arrangement of side walls 672*a*-672*d*, (iii) and female house coupling means 674. The mounting flange 670 has a substantially rectangular shape and includes multiple openings 675 therethrough, wherein the openings 675 are configured to receive elongated fasteners to enable the mounting flange 670 to be coupled to a device (e.g., alternator, power distribution system, a starter, etc.). As shown in FIGS. 30 and 32, the mounting flange 670 is integrally formed with the body 671. The body 671 and its arrangement of side walls 672*a*-672*d* are configured to for an external housing receiver 676 that is designed to receive: (i) an extent of the internal female housing 621 and (ii) an extent of the male housing 220 (see FIGS. 39-40). When the internal female housing 621 is properly positioned within the external housing receiver 676, the female connector assembly is in a fully seated position $P_{FS}$. The body 671 is also integrally formed with one component of the female house coupling means 674. Specifically, the body 671 is integrally formed with the external housing receiver 675 (see FIG. 28) that is configured to receive the elongated fastener 630 in order to couple the internal female housing 621 to the external female housing 623.

It should be understood that the external female housing 623 is made using any known technique (e.g., injection molding techniques, 3D printing, cast, thermoformed, or etc.) from a conductive material. In particular, the external male housing 280 and the external female housing 623 may be made from a number of conductive plastics that are discussed below. Making the external female housing 623 from at least one of these conductive materials attenuates the EMF that is emitted through the system 100.

B. Internal Female Housing

Figure 34:
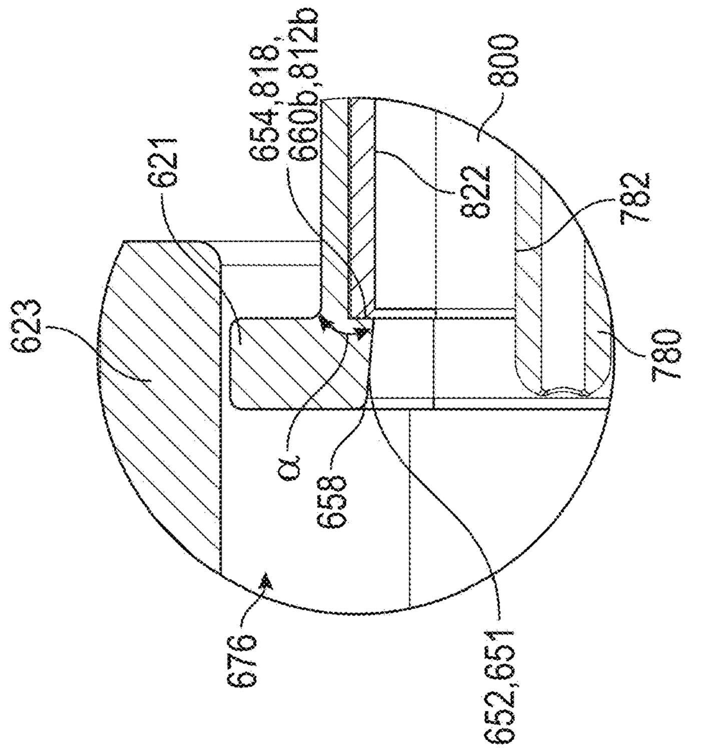
FIG. 34 is a zoomed-in view of area F of the female connector assembly, as shown in FIG. 33.

The internal female housing 621 further includes a body 640 and an interface area 680. The body 640 is comprised of an arrangement of side walls 642*a*-642*d* that form an internal female housing receptacle 653, which is configured to receive the female terminal 800 (see FIGS. 29-34). At least one of the side walls 642*a*-642*d* of the female housing assembly 620 has means for displacing the contact arms 494*a*-494*h* during insertion of the male terminal assembly 430. Referring specifically to FIGS. 34, the side walls 642*a*-642*d* of the female housing assembly 620 an internal segment 651 designed to slidingly engage with an extent of the contact arms 494*a*-494*h* of the male terminal assembly 430 during insertion of the male connector assembly 200 into the receptacle 653 of the female housing assembly 620, as detail below. The internal segment 651 is angled or sloped relative to the outer surface of the side walls 642*a*-642*d* at an internal angle, α. In this exemplary embodiment, the internal angle α is between 0.01 degrees and 15 degrees, preferably between 1 degree and 7 degrees and most preferably 5 degrees. Also, the internal angle α is substantially constant. This angled internal segment 651 is designed to compress contact arms 494*a*-494*h* inward as these two components slidingly engage while the operator (e.g., a worker or a robot) inserts the male connector assembly 200 into the receiver 814 of the female connector assembly 600.

Figure 33:
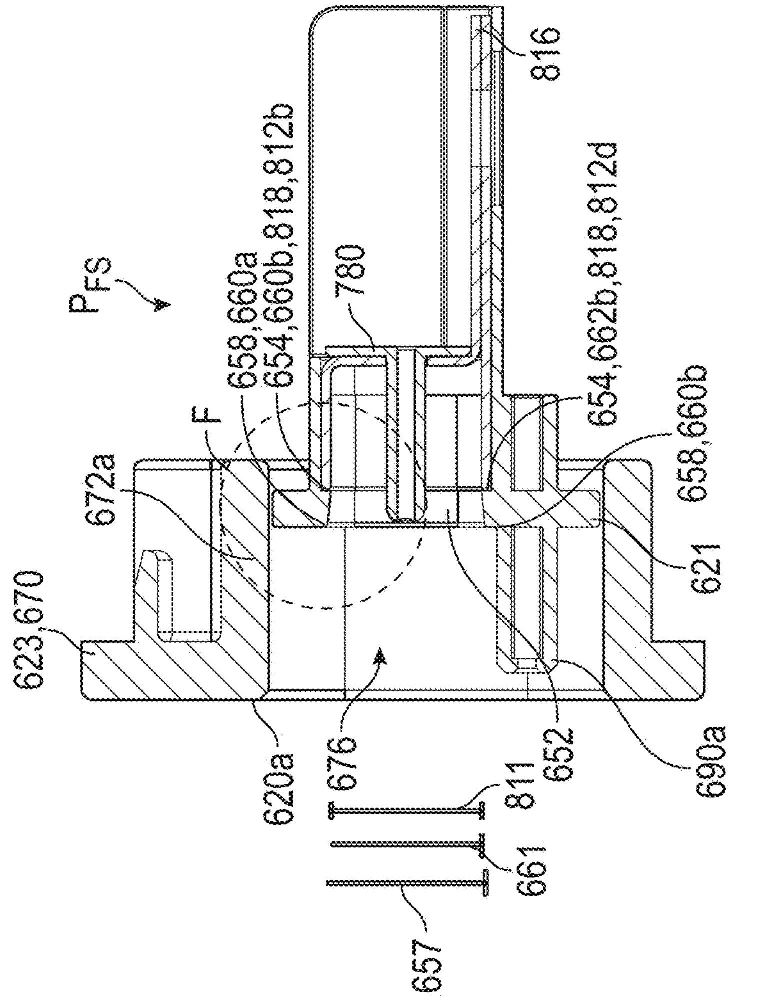
FIG. 33 is a cross-sectional view of the female connector assembly taken along the 33-33 line of FIG. 31.
Figure 35:
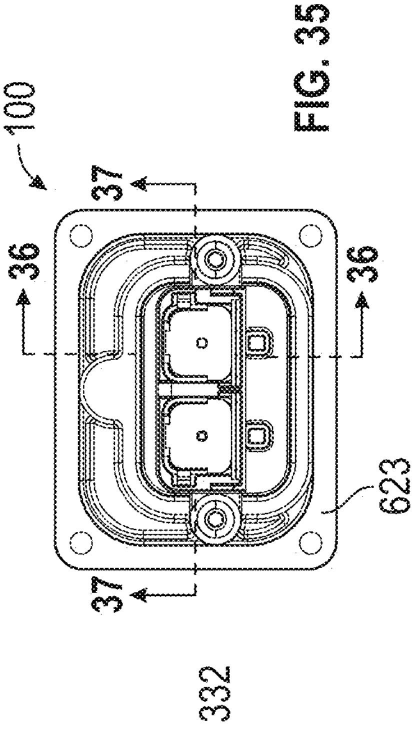
FIG. 35 is a rear view of the shielded connector system of FIG. 1, wherein the connector system is in an intermediate position of the system.
Figure 36:
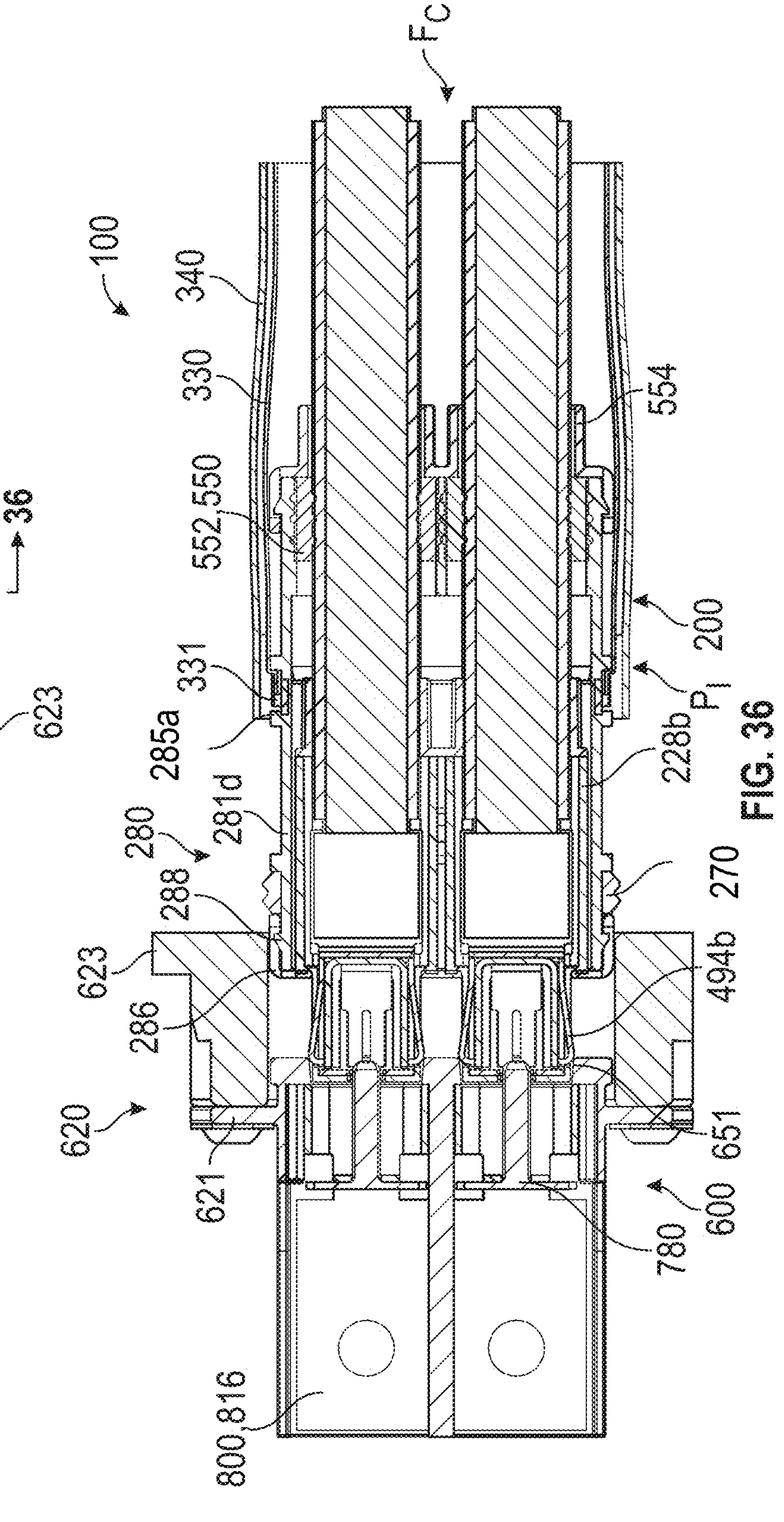
FIG. 36 is a cross-sectional view of the shielded connector system taken along the 36-36 line of FIG. 35.
Figure 37:
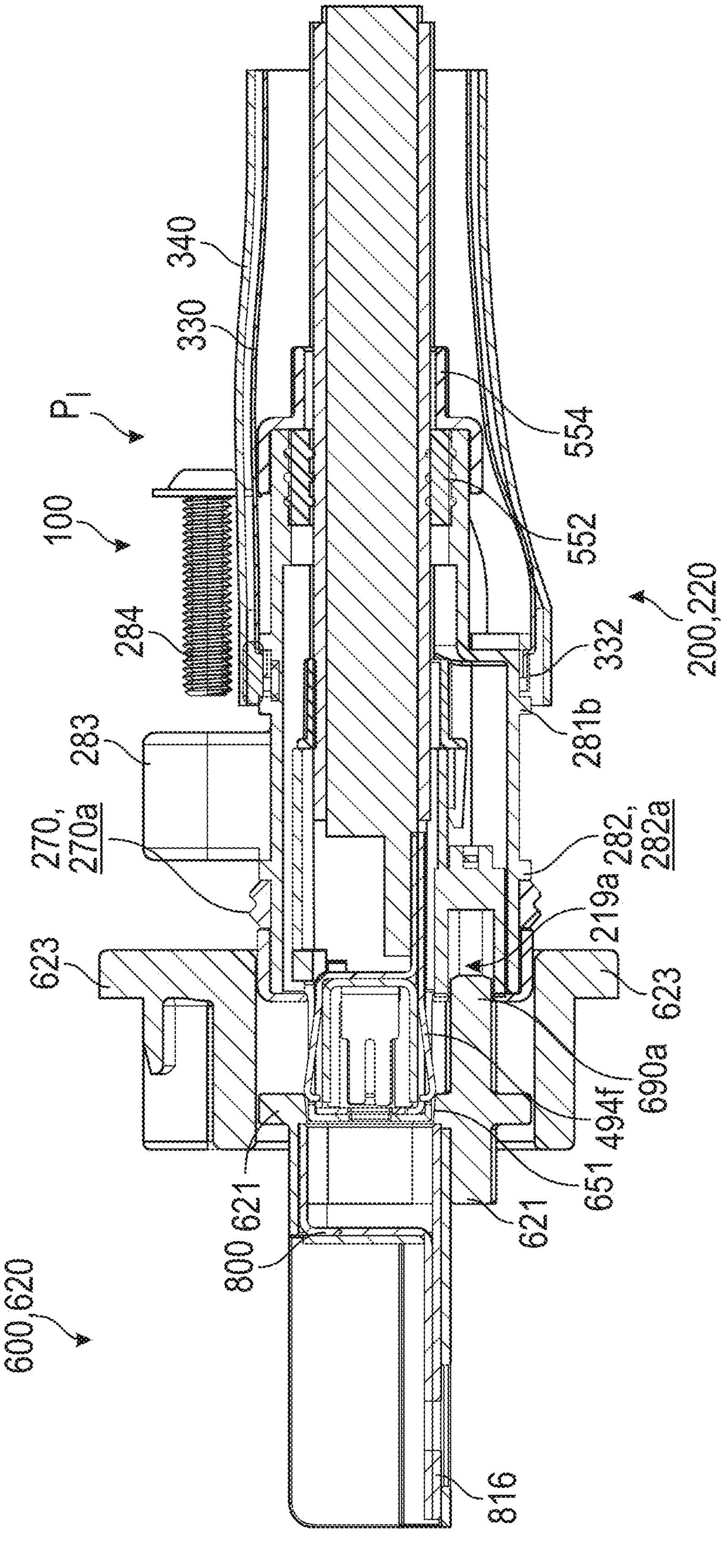
FIG. 37 is a cross-sectional view of the shielded connector system taken along the 37-37 line of FIG. 35.
Figure 38:
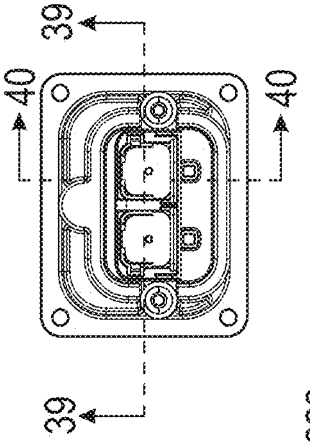
FIG. 38 is a rear view of the shielded connector system of FIG. 1, wherein the connector system is in a connected position of the system.

As best shown in FIG. 34, the angled internal segment 651 includes a leading, forwardmost extent 658 and a trailing, rearmost extent 654, which defines a length of the internal segment 651. The forwardmost extent 658 and the rearmost extent 654 are recessed from the leading edge 620*a* of the female housing assembly 620. The rearmost extent 654 is positioned adjacent to the forwardmost extent 818 of the female terminal 800, when the female terminal is received by the receptacle 653. Also, as shown in FIG. 33 and due to its angled configuration, the angled internal segment 651 has a forward width 657 that extends between the forwardmost extent 658 of a first edge 660*a* of the internal segment 651 and an opposing forwardmost extent 658 of a first edge 660*b* of the internal segment 651. The forward width 657 is approximately 1% to 15% larger than a rear width 661 of the internal segment 651 that extends between a rearmost extent 654 of a first edge 662*a* of the internal segment 651 and an opposing rearmost extent 654 of a first edge 662*b* of the internal segment 651. In other words, the forward internal segment width 657 is greater than the rear internal segment width 661, which facilitates in the inward compression of the contact arms 494*a*-494*h* as the male connector assembly 200 is slidingly inserted into the receptacle 653 of the female connector assembly 600.

Again referring to FIGS. 33 and 34, the rearmost extent 654 of the internal angled segment 651 is at least positioned coplanar with the inside surface 822 of the female terminal 800 and preferably positioned inward of the inside surface 822. Stated another way, the rear internal segment width 661 is smaller than a front receiver width 811 that extends between the forwardmost extent 818 of the inner surface 822 of one side wall 812*b* and the opposed forwardmost extent 818 of the inner surface 822 of one side wall 812*d*. In this exemplary embodiment, the rear width 661 may be 0.6 mm smaller than the receiver width 811.

It should be understood that in other embodiments, the sloped or angled configuration of the internal segment 651 may not be constant, may not be recessed from the leading edge of the female housing assembly 620, the dimensions may be different, and the internal segment 651 may not be continuous within the female housing assembly 620; instead, it may be discontinuous and thus only be present in certain locations. It should also be understood that the internal segment 651 is typically formed from the same material that the rest of the female housing is formed from, such as a polymer (e.g., nylon or plastic). Utilizing a polymer material is beneficial because there is less friction between the metal contact arms 494*a*-494*h* and the polymer material in comparison to the friction between the metal contact arms 494*a*-494*h* and the metal female terminal 800. In alternative embodiments, a coating, liner or other materials may be used to line or coat the internal surface 652 to reduce the friction with the contact arms 494*a*-494*h*.

Figure 26:
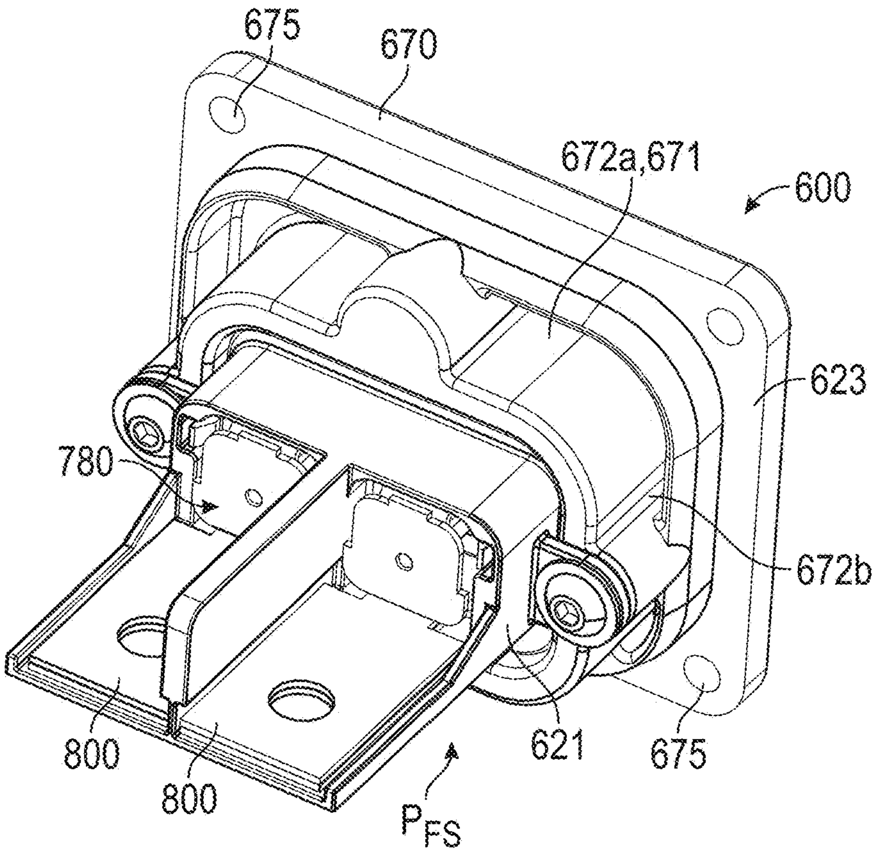
FIG. 26 is a rear perspective view of the female connector assembly of FIG. 1.
Figure 27:
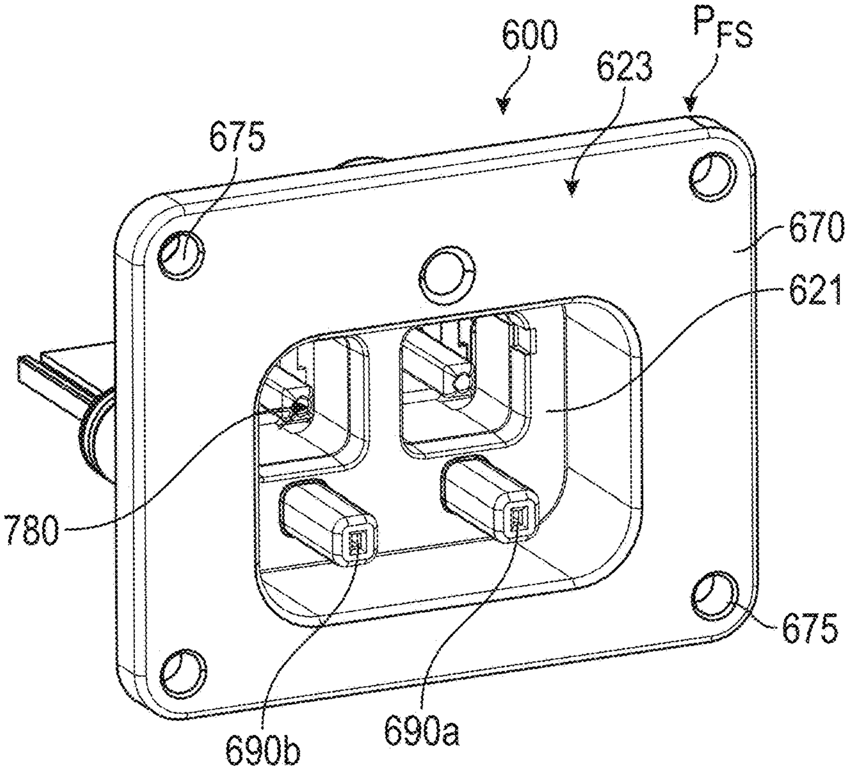
FIG. 27 is a front view of the female connector assembly of FIGS. 1.
Figure 28:
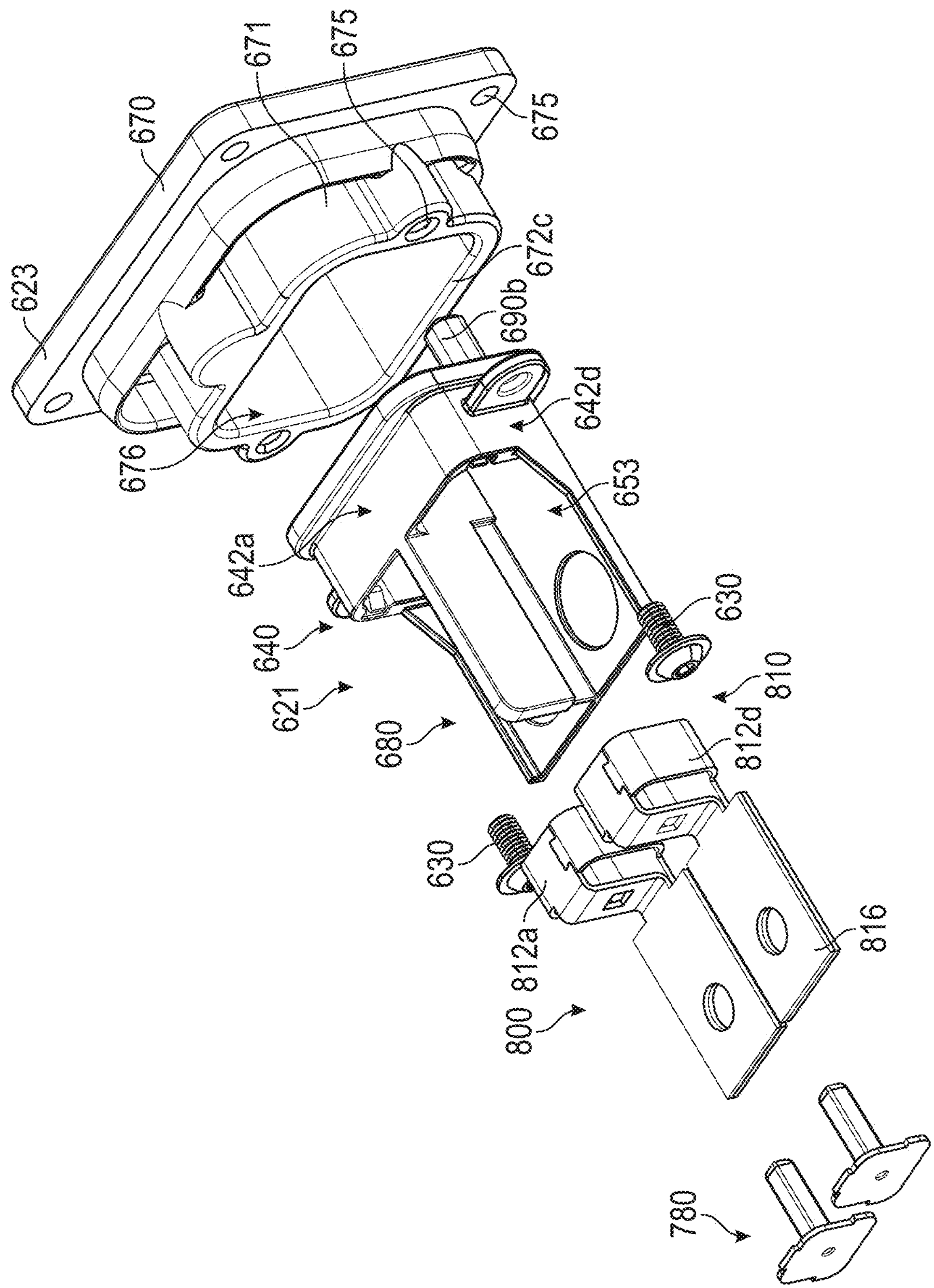
FIG. 28 is an exploded view of the female connector assembly of FIGS. 26 and 27, wherein the female connector assembly has a female housing and a female terminal.

As shown in the Figures, including FIG. 26, an opening extends outward from the side walls 642*b*, 642*d*. In the embodiment depicted therein, the elongated fastener 630 extends through the opening that extends outward from the side walls 642*b*, 642*d* and into opening 675 to couple the internal female housing 621 to the external female housing 623. The internal female housing 621 is configured to be placed in contact with the female terminal 800 and thus it is desirable to form the internal female housing 621 from a non-conductive material (e.g., PA, PPA, PE, PBT, PP, PVC, other thermoplastics or other similar polymers and/or plastics). It should be understood that the non-conductive material that is chosen should be able to sufficiently isolate the female terminal 800, even when a high current load is flowing through the female terminal 800. As discussed above and in other parts of this application, the internal female housing 621 may be formed using any suitable method, such as injection molding techniques, 3D printing, cast, thermoformed, or any other similar technique.

C. Female Terminal

FIGS. 2, 28-30, 32, 33-34, 36-37, and 39-40, depict various views of the female terminal 800. The female terminal 800 includes: (i) a female terminal body 810 and (ii) a female terminal connection plate 816. The female terminal connection plate 816 is directly connected to the female terminal body 810 and is configured to be connected to an extent of a structure (e.g., a radiator fan) outside of the shielded connector system 100. The female terminal body 810 has a tubular configuration and is comprised of an arrangement of female terminal side walls 812*a*-812*d* that are coupled to one another to form a substantially rectangular shape. Specifically, one female terminal side wall 812*a* of the arrangement of female terminal side walls 812*a*-812*d* is: (i) substantially parallel with another one female terminal side wall 812*c* of the arrangement of female terminal side walls 812*a*-812*d* and (ii) substantially perpendicular to two female terminal side wall 812*b*, 812*d* of the arrangement of female terminal side walls 812*a*-812*d*. The female terminal body 810 defines a female terminal receiver 814. The female terminal receiver 814 is designed and configured to be coupled, both electrically and mechanically, to an extent of the male terminal 470, when the male terminal 470 is inserted into the female terminal receiver 814.

The female terminal 800 is typically formed for a single piece of material (e.g., metal). Therefore, the female terminal 800 is a one-piece female terminal 800 and has integrally formed features. In particular, the female terminal connection plate 816 is integrally formed with female terminal body 810 and specifically is integrally formed with the one female terminal side wall 812*c*. To integrally form these features, the female terminal 800 is typically formed using a die-cutting process. However, it should be understood that other types of forming the female terminal 800 may be utilized, such as casting or using an additive manufacturing process (e.g., 3D printing). In other embodiments, the features of the female terminal 800 may not be formed from a one-piece or be integrally formed, but instead formed from separate pieces that are welded together.

D. Coupling of the Female Terminal within the Female Housing

FIGS. 29-32 show the positioning and the coupling of the female terminal 800 within the female housing assembly 620. Coupling the female terminal 800 within the female housing assembly 620 occurs across multiple steps or stages, which moves the female terminal 800 from an unseated positon $P_{US}$ to a seated positon $P_S$. The first step in this process starts with securing the female terminal 800 within the female housing assembly 620 using a female securing means 647. The securing means 647 in this exemplary embodiment includes a female securing arm 648. A first insertion force, $F_I$, causes the securing arms 648 to interact with a forwardmost extent 818 of the female terminal 800. This interaction will cause the securing arms 648 to elastically deform outward and towards the side walls 642*b*, 642*d*. Specifically, the securing arms 648 will elastically deform into a securing arm gap 650. Positioning the securing arms 648 within the securing arm gap 650 will allow the female terminal 800 to be inserted into the female housing assembly 620. It should be understood that the assembler must apply a sufficient amount of insertion force, $F_I$, to cause the securing arms 648 to elastically deform. Without apply this sufficient amount of insertion force, $F_I$, the assembler will not be able to cause the securing arms 648 to elastically deform; thus, it will not be able to position the female terminal 800 within the female housing assembly 620. It further should be understood that the length of the securing arm 648, the thickness of the securing arm 648, and the material of the securing arm 648 will alter the amount of insertion force, $F_I$, that is necessary to couple the female terminal 800 to the female housing assembly 620.

The next step in the process of coupling of the female terminal 800 within the female housing assembly 620 occurs when the assembler applies a second insertion force, $F_I$, on the female terminal 800 to cause: (i) the forwardmost extent 818 of the female terminal 800 to be positioned against the rearmost extent 654 of the internal segment 651, (ii) the rearmost extent 820 of the female terminal 800 to be positioned against the securing arms 648. At this point, the securing arms 648 can return to their original or non-deformed state due to the fact the securing arm 648 can fit into a rearmost extent 654 of the female terminal 800. The return of the securing arm 648 may cause an audible sound (e.g., click) when it moves from the deformed state to the non-deformed state. This audible sound will inform the assembler that the female terminal 800 is properly positioned within the female housing assembly 620; thus meeting industry standards and/or requirements (e.g., USCAR). Also, as shown in FIGS. 15-26, the female housing assembly 620 can be properly positioned within the female housing assembly 620 while the female locking member 700 is only connected to the first locking member projection 644*a*. This is because the female locking member 700 does not extend upward past the inner surface 656 of the side wall 642*c* (see FIG. 20). Once the securing arms 648 are return to their original or non-deformed state and the female housing assembly 620 can be properly positioned within the female housing assembly 620, the female housing assembly is in a seated position $P_S$.

While the ability to disconnect the female terminal 800 from the female housing assembly 620 is beneficial because it makes manufacturing easier and less expensive, this functionality may provide a greater benefit to connectors that have alternative configurations. For example, if the female terminal 800 was connected to a wire instead of utilizing a female terminal connection plate 816; then this disconnection functionality may provide a greater benefit because it would be difficult for the customer to couple (e.g., weld) the wire 890 to the female terminal 800 without potentially compromising the integrity of the female housing assembly 620. Nevertheless, there are alternative embodiments that allow void the need to be able to disassemble the female housing assembly 620. For example, the female housing assembly 620 may be formed around the female terminal 800 using an injection molding or additive manufacturing process. In further embodiments, the female housing assembly 620 may be configured to provide a secondary locking component as described within PCT/US2019/36070 (see component 712).

E. Touch Proof Probe

The touch proof probe is configured to fit within the female terminal 800 is designed to reduce the chance that a foreign object (e.g., human finger) is placed in contact with the female terminal 800. Thus, the distance between the inner surface 822 to the outermost edge 782 of the touch proof probe is smaller than 10 mm and preferably less than 6 mm. The shape of the touch proof probe opening 510 is configured to substantially match the shape of the touch proof probe 780. Matching these shapes helps ensure proper insertion of the touch proof probe 780 with the touch proof probe opening 510. In addition, matching and dimensioning the touch proof probe 780 and touch proof probe opening 510 may provide a reduction in the vibration between the male connector assembly 200 and the female connector assembly 600. This reduction in the vibration between these components may help reduce failures of the shielded connector system 100.

In alternative embodiments, the touch proof probe 780 and opening 510 may have different configurations, including different shapes. The touch proof probe 780 is typically formed from the same material as the female housing assembly 620, which is a non-conductive material (e.g., plastic or nylon). In other embodiments, the touch proof probe 780 may be formed for other materials. However, for the touch proof probe 780 to operate as intended the material should not be highly conductive because such a material would transfer the current from the female terminal 800 to the touch proof probe 780; thus, removing one of the purposes of the touch proof probe 780. Further, it should be understood that more than one touch proof probe may be utilized in connection with a single male terminal assembly 430.

III. Coupling of the Male Connector Assembly with the Female Connector Assembly

FIGS. 35-40 shows the coupling of the male connector assembly 200 with the female connector assembly 600. Specifically, the connector assemblies 200, 600 starts in a separated or disengaged position $P_D$ where the connector assemblies 200, 600 are not in mechanical or electrical contact with one another. From the disengaged state $P_D$ the assembler applies a coupling force, $F_C$, on the male connector assembly 200 to force the male connector assembly 200 towards the female connector assembly 600. This force causes the connector assemblies 200, 600 to move into an intermediate position $P_I$ (see FIGS. 35-37). In this intermediate position $P_I$: (i) the side walls 228*a*, 228*c* of the internal male housing 224 are in contact with the side walls 642*b*, 642*d* of female housing assembly 620 and (ii) the contact arms 494*a*-949*h* are placed in contact with the internal segment 651 of the female housing assembly 620. However, in this intermediate position $P_I$, the male connector assembly 200 is not mechanically or electrically coupled to the female connector assembly 600 because assemblies 200, 600 are not fully engaged with each other.

From the intermediate position $P_I$ the assembler continues to apply a coupling force, $F_C$, on the male connector assembly 200 to force the male connector assembly 200 towards the female connector assembly 600. This force causes the connector assemblies 200, 600 to move into a connected position $P_C$ (see FIGS. 38-40). As the connector assemblies 200, 600 move from the intermediate position $P_I$ to connected position $P_C$, the contact arms 494*a*-494*h* are compressed towards the center 490 of the male terminal 470 (compare FIGS. 36-37 with FIGS. 39-40). The inward compression of the contact arms 494*a*-494*h* in turn causes the spring arms 452*a*-452*h* to deform inward towards the center 490 of the male terminal 470. As discussed above, the spring member 440 resists this inward compression and applies an outwardly directed spring biasing force on the contact arms 494*a*-494*h*. The connected position $P_C$ the male connector assembly 200 is mechanically and electrically coupled to the female connector assembly 600.

Additionally, in the connected position $P_C$, the following component are positioned within the external female housing 623: (i) at least an extent of the internal female housing 621, (ii) at least an extent of the internal male housing 224, (iii) at least an extent of the external male housing 280, (iv) at least an extent of the male terminal 470, (v) at least an extent of the spring member 440*a*, and (vi) at least an extent of the female terminal 800. In other words, at least an extent of the internal female housing 621, at least an extent of the internal male housing 224, at least an extent of the external male housing 280, at least an extent of the male terminal 470, at least an extent of the spring member 440*a*, and at least an extent of the female terminal 800 reside within the external female housing 623 in the connected position. Further, in the connected position $P_C$, the following component are positioned within the internal female housing 621: (i) at least an extent of the internal male housing 224, (ii) at least an extent of the male terminal 470, (iii) at least an extent of the spring member 440*a*, and (iv) at least an extent of the female terminal 800. In other words, at least an extent of the internal male housing 224, at least an extent of the male terminal 470, at least an extent of the spring member 440*a*, and at least an extent of the female terminal 800 reside within the internal female housing 621 in the connected positon. Moreover, in the connected position $P_C$, at least an extent of the male terminal 470 and at least an extent of the spring member 440*a* are positioned within the female terminal 800. In other words, at least an extent of the male terminal 470 and at least an extent of the spring member 440*a* reside within the female terminal 800 in the connected position. Also, in the connected position $P_C$, at least an extent of the male terminal 470 and at least an extent of the spring member 440*a* are positioned within or reside within the internal male housing 224. Additionally, a major extent of both the male terminal 470 and the spring member 440*a* extend beyond the external male housing 280.

As shown in FIGS. 36-37 and 39-40, the shielded connector system 100 includes: (i) a first set of structures (e.g., the male terminal assembly 430 and the female terminal 800) made from a highly conductive material that are substantially encased by a second set of structures (e.g., the internal male housing 224 and the internal female housing 621) that are made from non-conductive, (ii) the second set of structures (e.g., the internal male housing 224 and the internal female housing 621) is substantially encased by a third set of structures (e.g., the external male housing 280 and the external female housing 623), (iii) the third set of structures (e.g., the external male housing 280 and the external female housing 623) is partially encased by a fourth structure (e.g., casing 330), and (iv) the fourth structure is substantially encased by a fifth structure (e.g., protective member 340).

Figure 41:
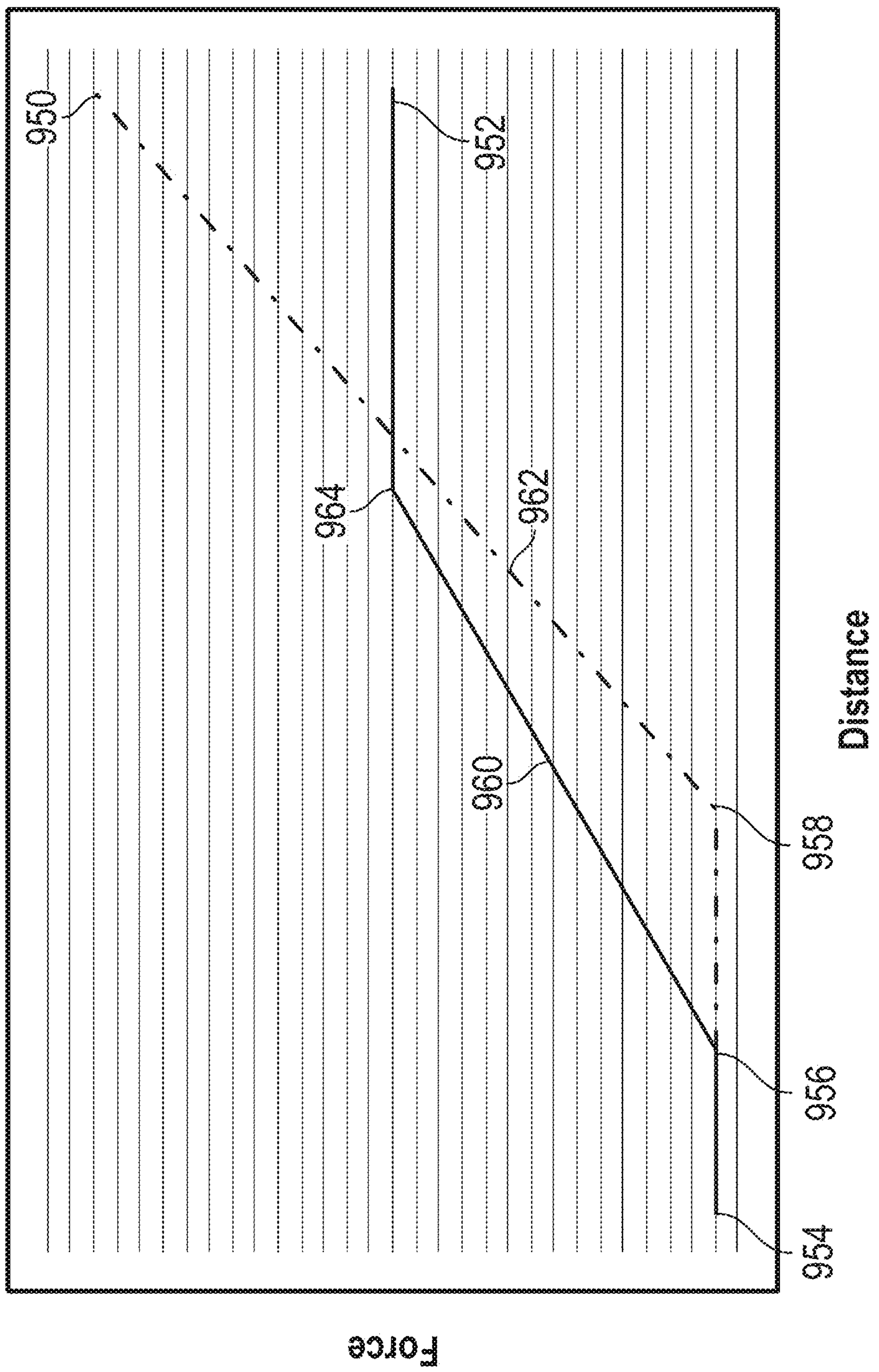
FIG. 41 is a graph showing the insertion forces associated with the shielded connector assemblies disclosed herein and the unshielded connector assemblies disclosed within PCT/US2018/019787.
Figure 42:
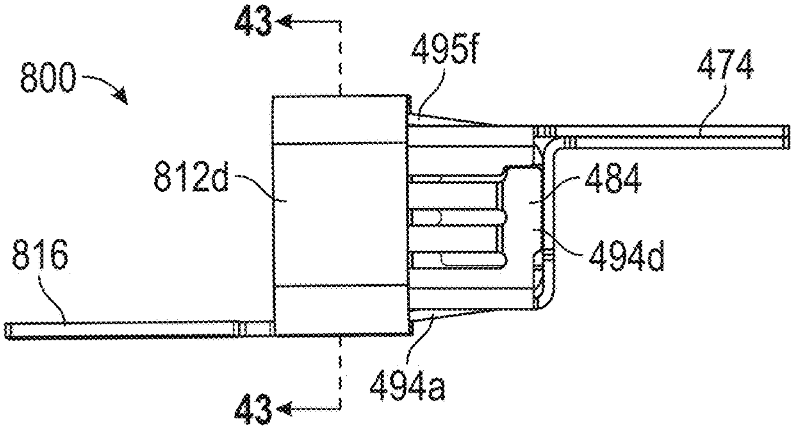
FIG. 42 is a side view of the female and male terminals of the shielded connector system of FIG. 1.
Figure 43:
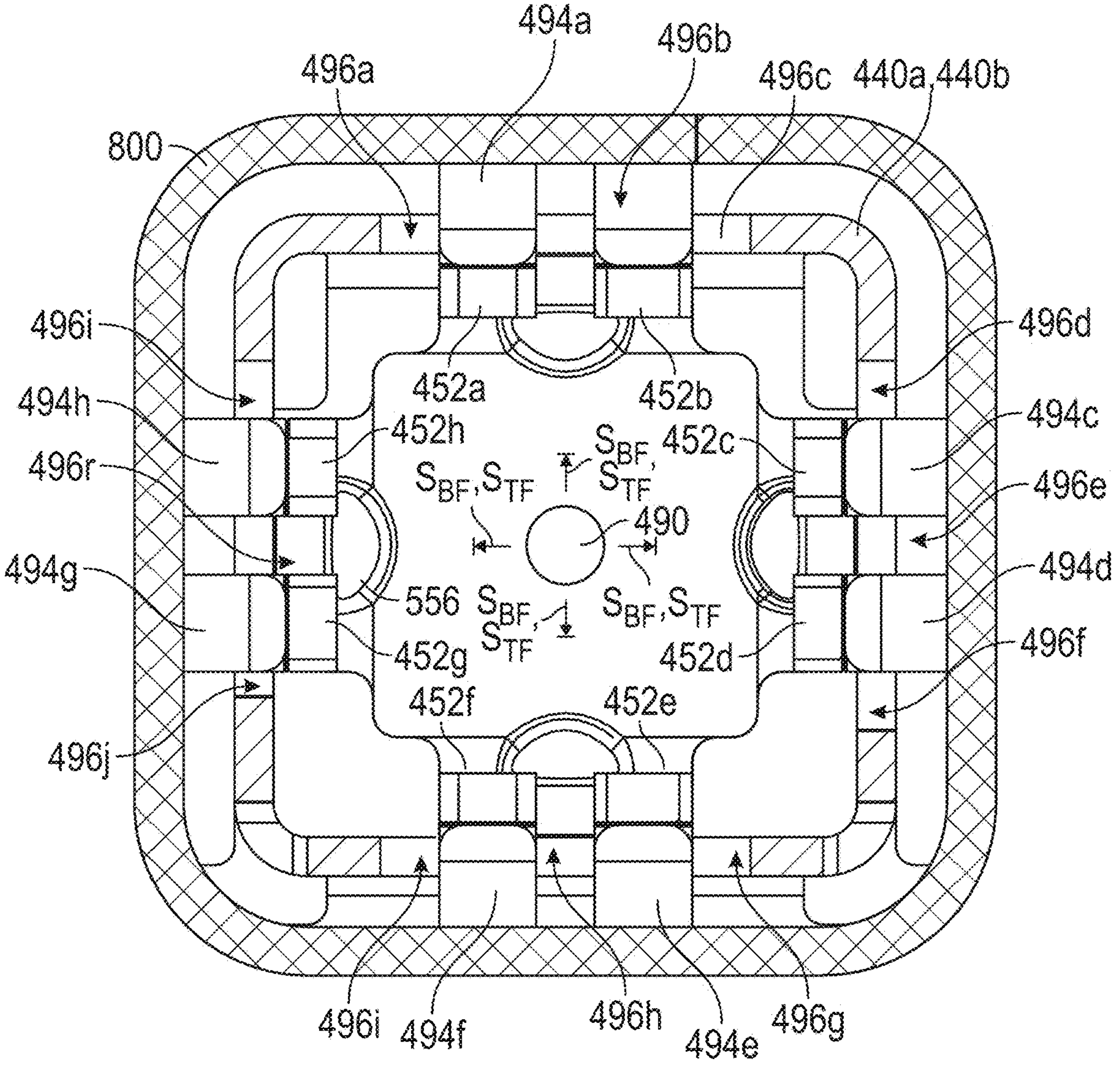
FIG. 43 is a cross-section view of the female and male terminals taken along the 43-43 line of FIG. 42.

The male connector assembly 200 and the female connector assembly 600 are beneficial over the connectors described in connection in PCT/US2018/019787 for the reasons shown in the graph of FIG. 41. Specifically, the insertion force is graphed on the Y axis and insertion distance is graphed on the X axis. The shielded connector system 100 is shown by the solid line 950, while the unshielded connector that is described in PCT/US2018/019787 is shown in the dotted line 952. Lines for both connectors are equal between points 954 and 956 because these lines represent the connector moving from the disconnected position $P_D$ to the intermediate position $P_I$. At point 956, the insertion force for the shielded connector system 100 starts to increase because the contact arms 494*a*-494*h* are being forced inward by internal segment 651. The insertion force for the connector disclosed within PCT/US2018/019787 does not start to increase at point 956 because the alternative configuration of the contact arms requires that the assembler insert the connecter a further distance before the contact arms engage any structures within the connector. Therefore, at point 958, the insertion force for the connector disclosed within PCT/US2018/019787 finally starts to increase because the contact arms have come into contact with an internal structure of the connector. Based on this attribute, the shielded connector system 100 described in this application is desirable over the connector system described within PCT/US2018/019787 because the distance the connector assemblies 200, 600 experience before they progress from the disconnected position $P_D$ to the intermediate position $P_I$ is less. In turn, this means that the shielded connector system 100 can be installed within a smaller space or footprint because it does not need this additional distance to form a connection.

Next, the lines 960 and 962 describe the insertion force that is required to move the connector from the intermediate position $P_I$ towards the connected position $P_C$. In particular, line 960 is associated with the shielded connector system 100, while line 962 is the connector described within PCT/US2018/019787. The slope of line 960 is less than the slope of line 962, meaning that a more gradual amount of force is required by the connector assemblies 200, 600 described herein in comparison to the connector assembly described within PCT/US2018/019787. This is because the contact arms 494*a*-494*h* described herein are sliding along the polymer or plastic material surface of the internal segment 651, while the contact arms described within PCT/US2018/019787 are sliding along a metal surface. This is another benefit of the shielded connector system 100 over the connector system described within PCT/US2018/019787. In other words, the shielded connector system 100 described herein can utilize a spring member 440 that has a larger biasing force while satisfying the USCAR 25, specification in comparison to the connector system described within PCT/US2018/019787. This is beneficial because the use of a spring member 440*a* that has a larger biasing force will ensure that the shielded connector system 100 remains properly connected while receiving larger amounts of power during the operational life of the system 100.

Finally, after the contact arms 494*a*-494*h* described herein have cleared the rearmost extent 654 of the internal segment 651, the insertion force for the connection system 100 plateaus after point 964. This is because the contact arms 494*a*-494*h*, at this point, have been fully compressed and thus very little, if any, additional force is required to move the male terminal assembly 400 from the rearmost extent 654 of the internal segment 651 to the connected position. The leveling off of the insertion force at this point almost feels like the shielded connector system 100 is "pulling" or attracting the male connector assembly 200 towards the female connector assembly 600. In contrast, the insertion force required for the connector system described within PCT/US2018/019787 only increases. This is because the contact arms described are not fully compressed until the male connector is coupled to the female connector. This is another substantial benefit for the shielded connector system 100 is beneficial over the connector system described within PCT/US2018/019787.

A. Male and Female Terminals

FIGS. 1-43 and discussed within PCT/US2019/036010, depict various views of the male terminal assembly 430 and the female terminal 800. Specifically, referring to FIGS. 42-43, the combination of outer surfaces of the contact arms 494*a*-494*h* form a rectangle that has a width/height that is slightly larger (e.g., between 0.1% and 15%) than the width/height of the rectangle that is associated with the female terminal 800. When the slightly larger male terminal assembly 430 is inserted into the slightly smaller female terminal 800, the outer surface of the contact arms 494*a*-494*h* are forced towards the center 490 of the male terminal assembly 430. Because the outer surface of the contact arms 494*a*-494*h* is forced towards the center 490 of the male terminal assembly 430, the free ends 446 of the spring member 440*a* are also forced towards the center 490 of the male terminal assembly 430. The spring member 440*a* resists this inward displacement by providing a spring biasing force $S_{BF}$ (as depicted by the arrows labeled "$S_{BF}$" in FIG. 43). This spring biasing force $S_{BF}$ is generally directed outward against the free ends 488 of the male terminal 470. In other words, this spring biasing force $S_{BF}$ provides a wedging or shimmering effect against the contact arms 494*a*-494*h* thereby holding the outer surfaces of the contact arms 494*a*-494*h* in engagement with the female terminal 800.

The Figures show that the shielded connector system 100 provides a connector that is 360° compliant, which meets a certain car or automotive specifications. As shown in this embodiment, the contact arms 494*a*-494*h* are symmetrical and evenly spaced. The shielded connector system 100 is 360° compliant because the outer surface of the contact arms 494a-494h are in contact with each side wall 482a-482d of the female terminal 800 and the spring biasing force $S_{BF}$ applies out a force that is generally directed outward from the center 490 in all four primary directions (e.g., up, down, left, and right). The 360° compliance attribute of the shielded connector system 100 aids in maintaining mechanical and electrical connections under strenuous mechanical conditions, e.g., vibration. In a traditional blade or fork-shaped connectors, i.e., connection on only two opposing sides, vibration may develop a harmonic resonance that causes the connector to oscillate with greater amplitude at specific frequencies. For example, subjecting a fork-shaped connector to harmonic resonance may cause the fork-shaped connector to open. The opening of the fork-shaped connector during electrical conduction is undesirable because the momentary mechanical separation of the fork-shaped connector from an associated terminal may result in electrical arcing. Arcing may have significant negative effects on the terminal as well as the entire electrical system of which the terminal is a component. However, the 360° compliance feature of the present disclosure may prevent catastrophic failures caused by strong vibration and electrical arcing.

The male terminal 470, including the contact arms 494a-494h, may be formed from a first material such as copper, a highly-conductive copper alloy (e.g., C151 or C110), aluminum, and/or another suitable electrically conductive material. The first material preferably has an electrical conductivity of more than 80% of IACS (International Annealed Copper Standard, i.e., the empirically derived standard value for the electrical conductivity of commercially available copper). For example, C151 typically has 95% of the conductivity of standard, pure copper compliant with IACS. Likewise, C110 has a conductivity of 101% IACS. In certain operating environments or technical applications, it may be preferable to select C151 because it has anti-corrosive properties desirable for high-stress and/or harsh weather applications. The first material for the male terminal 470 is C151 and is reported, per ASTM B747 standard, to have a modulus of elasticity (Young's modulus) of approximately 115-125 gigapascals (GPa) at room temperature and a coefficient of terminal expansion (CTE) of 17.6 ppm/degree Celsius (from 20-300 degrees Celsius) and 17.0 ppm/degree Celsius (from 20-200 degrees Celsius). The spring member 400a, 400b may be formed from a second material such as spring steel, stainless steel (e.g., 301SS, ¼ hard), and/or another suitable material having greater stiffness (e.g., as measured by Young's modulus) and resilience than the first material of the male terminal 470. The second material preferably has an electrical conductivity that is less than the electrical conductivity of the first material. The second material also has a Young's modulus that may be approximately 193 GPa at room temperature and a coefficient of terminal expansion (CTE) of approximately 17.8 ppm/degree Celsius (from 0-315 degrees Celsius) and 16.9 ppm/degree Celsius (from 0-100 degrees Celsius).

Based on the above exemplary embodiment, the Young's modulus and the CTE of the spring member 400a, 400b is greater than the Young's modulus and the CTE of the male terminal 470. Thus, when the male terminal 470 is used in a high power application that subjects the shielded connector system 100 to repeated thermal cycling with elevated temperatures (e.g., approximately 150° Celsius) then: (i) the male terminal 470 become malleable and loses some mechanical resilience, i.e., the copper material in the male terminal 470 softens and (ii) the spring member 400a, 400b does not become as malleable or lose as much mechanical stiffness in comparison to the male terminal 470. Thus, when utilizing a spring member 440a that is mechanically cold forced into shape (e.g., utilizing a die forming process) and the spring member 440a is subjected to elevated temperatures, the spring member 440a will attempt to at least return to its uncompressed state, which occurs prior to insertion of the male terminals assembly 430 within the female terminal 800, and preferably to its original flat state, which occurs prior to the formation of the spring member 440a. In doing so, the spring member 400a, 400b will apply a generally outward directed thermal spring force $S_{TF}$ (as depicted by the arrows labeled "$S_{TF}$" in FIG. 49) on the free end 488 of the male terminal 470. This thermal spring force $S_{TF}$ is dependent upon local temperature conditions, including high and/or low temperatures, in the environment where the system 100 is installed. Accordingly, the combination of the spring biasing force $S_{BF}$ and the thermal spring force $S_{TF}$ provides a resultant biasing force $S_{RBF}$ that ensures that the outer surface of the contact arms 494a-494h are forced into contact with the inner surface of the female terminal 800 when the male terminal 470 is inserted into the female terminal 800 and during operation of the system 100 to ensure an electrical and mechanical connection. Additionally, with repeated thermal cycling events, the male terminal assembly 430 will develop an increase in the outwardly directed resultant spring forces $S_{RBF}$ that are applied to the female terminal 800 during repeated operation of the system 100.

Overall, the system 100 is a T4/V4/S3/D2/M2, wherein the system 100 meets and exceeds: (i) T4 is exposure of the system 100 to 150° C., (ii) V4 is severe vibration, (iii) S1 is sealed high-pressure spray, (iv) D2 is 200 k mile durability, and (v) M2 is less than 45 newtons of force is required to connect the male connector assembly 200 to the female connector assembly 600. The system 100 requires less than 10 newtons of force to coupled the male connector assembly 200 to the female connector assembly 600, while having a normal force that is greater than 10 newtons. The male terminal assembly 430 and female terminal 800 shown in the following figures are rated to carry at 55° C. RoA or 80° C. with a derating of 80%: (i) FIG. 50 can carry 190 amps with a 16 $mm^2$ wire, 220 amps with a 25 $mm^2$ wire, 236 amps with a 35 $mm^2$ wire, 245 amps with a 50 $mm^2$ wire, (ii) FIGS. 1-43 can carry 245 amps with a 50 $mm^2$ wire, 280 amps with a 75 $mm^2$ wire, 330 amps with a 100 $mm^2$ wire, (iii) FIG. 49 can carry 335 amps with a 100 $mm^2$ wire, 365 amps with a 150 $mm^2$ wire, 395 amps with a 200 $mm^2$ wire, (iv) FIG. 51 can carry 365 amps with a 100 $mm^2$ wire, (v) FIG. 54 can carry 88 amps with a 16 $mm^2$ wire, (vi) FIG. 52 can carry 185 amps with a 16 $mm^2$ wire and (vi) FIG. 55 can carry 225 amps with a 25 $mm^2$ wire. Additionally, other performance specifications of the system 100 disclosed herein will be obvious to one of skill in the art.

IV. Conductive Materials

As discussed above, the terminals (the male terminal assembly 430 and the female terminal 800) are formed from conductive materials. As such, this section focuses on conductive materials that may be utilized within the system 100 in connection with structures other than: (i) structures that are made from a non-conductive material and (ii) terminals (the male terminal assembly 430 and the female terminal 800). Specifically, the following structures may be made from a conductive material: (i) the external male housing 280, (ii) grounding leadframe 276, (iii) seal 270, (iv) frontal cap 286, (v) retainer 554, (vi) elongated fastener 284, (vii) casing 330, (viii) protective member 340, and (ix) external female housing 623. These structures may be formed from conductive plastics or polymers using any technique known in the art (e.g., injection molding techniques, 3D printing, cast, thermoformed, or any other similar technique) into the desired shapes. Examples of conductive plastics that may be used include, but are not limited to, a non-conductive plastics (e.g., PA, PPA, PE, PBT, PP, PVC, or acrylonitrile butadiene styrene (ABS), polycarbonate (PC), polyurethane, nylon 6/6 (PA66), polycarbonate-acrylonitrile butadiene styrene mix (PC-ABS), other similar polymers) that have at least one of the following additives:

a. Metal flakes, strands, fibers, particles, nanowires, powders (e.g., stainless steel, nickel, aluminum, silver, gold, copper, nickel-plated copper, nickel-plated glass, steel, zinc, brass, bronze, iron, platinum, lead, molybdenum, calcium, tungsten, lithium, tin, nickel carbon (NiC) or other similar metals). Said flakes, strands, fibers, particles, nanowires, powders should be small enough to intersperse through the plastic without affecting the shape of the conductive housing;
b. Carbon (e.g., carbon black, single-wall carbon nanotubes, multi-wall carbon nanotubes, graphene sheets, carbon fibers, carbon filaments, vapor grown carbon nanofibers, graphite nanoparticles, graphite fibers, or fullerene nanoparticles). Said carbon materials should be small enough to intersperse through the plastic without affecting the shape of the conductive housing;
c. Metal coated carbon, wherein the metal may include any metal listed above in “a” and the carbon may include any carbon material listed above in “b.”;
d. Conductive polymers (e.g., polyaniline, polypyrrole, poly(fluorene)s, polyphenylenes, polypyrenes, polyazulenes, polynaphthalenes, polycarbazoles, polyindoles, polyazepines, Poly(acetylene)s(PAC), Poly(p-phenylene vinylene), poly(thiophene)s, poly(3,4-ethylenedioxythiophene), or poly(p-phenylene sulfide)).
e. Doped polymers (e.g., polyacetylene, poly(p-phenylene), polyphenylene sulfide or polypyrrole may be doped with iodine or arsenic or electron-donating substance like sodium metal); and
f. Metal mesh (e.g., honeycomb mesh).

It should be understood that the above list is only exemplary and any similar additive is included herein. In addition, all of the chemical compositions, methods of making, and all other related information, which is contained within U.S. Pat. Nos. 8,377,585, 8,268,222, 7,829,006, 7,759,002, 7,726,440, 7,708,920, 7,613,003, 7,503,776, 7,393,218, 7,244,890, and 7,223,469 are of which are fully incorporated herein by reference for any purpose.

Figure 44:
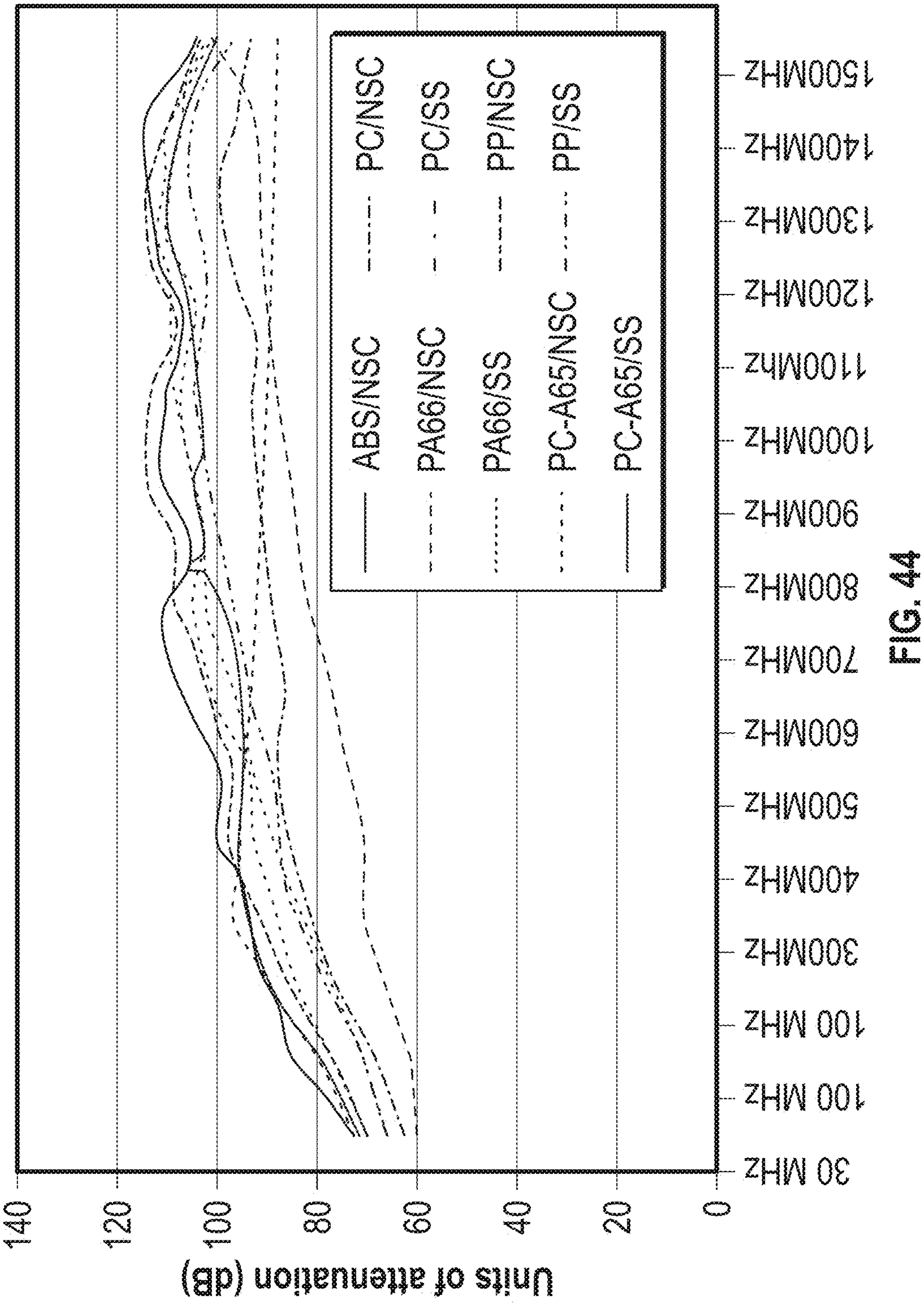
FIG. 44 is a graph showing the shielding efficiency of the shielded connector assembly with an exterior housing made from different materials.
Figure 46:
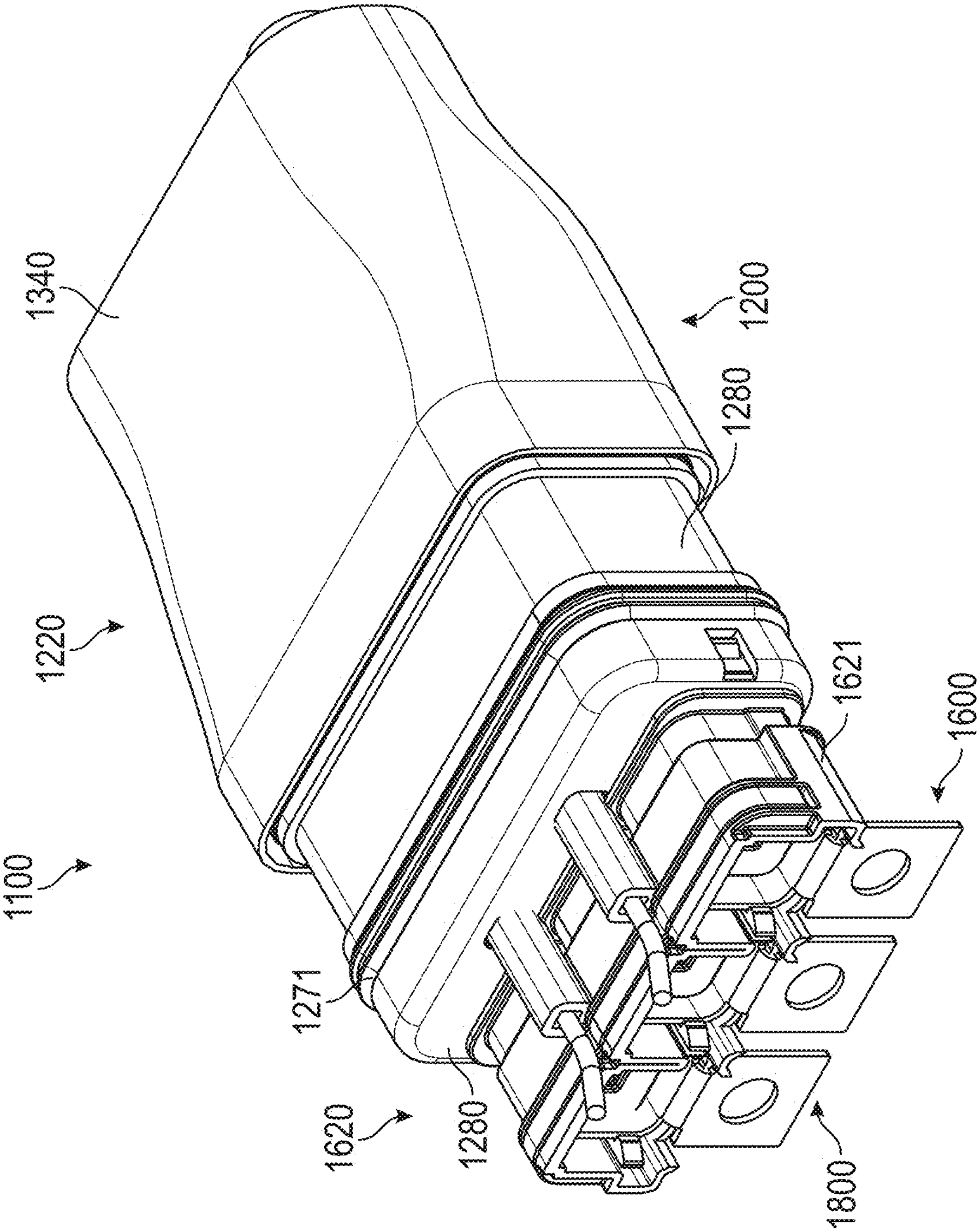
FIG. 46 is a perspective view of a second embodiment of a shielded connector system having a male connector assembly and a female connector assembly.
Figure 47:
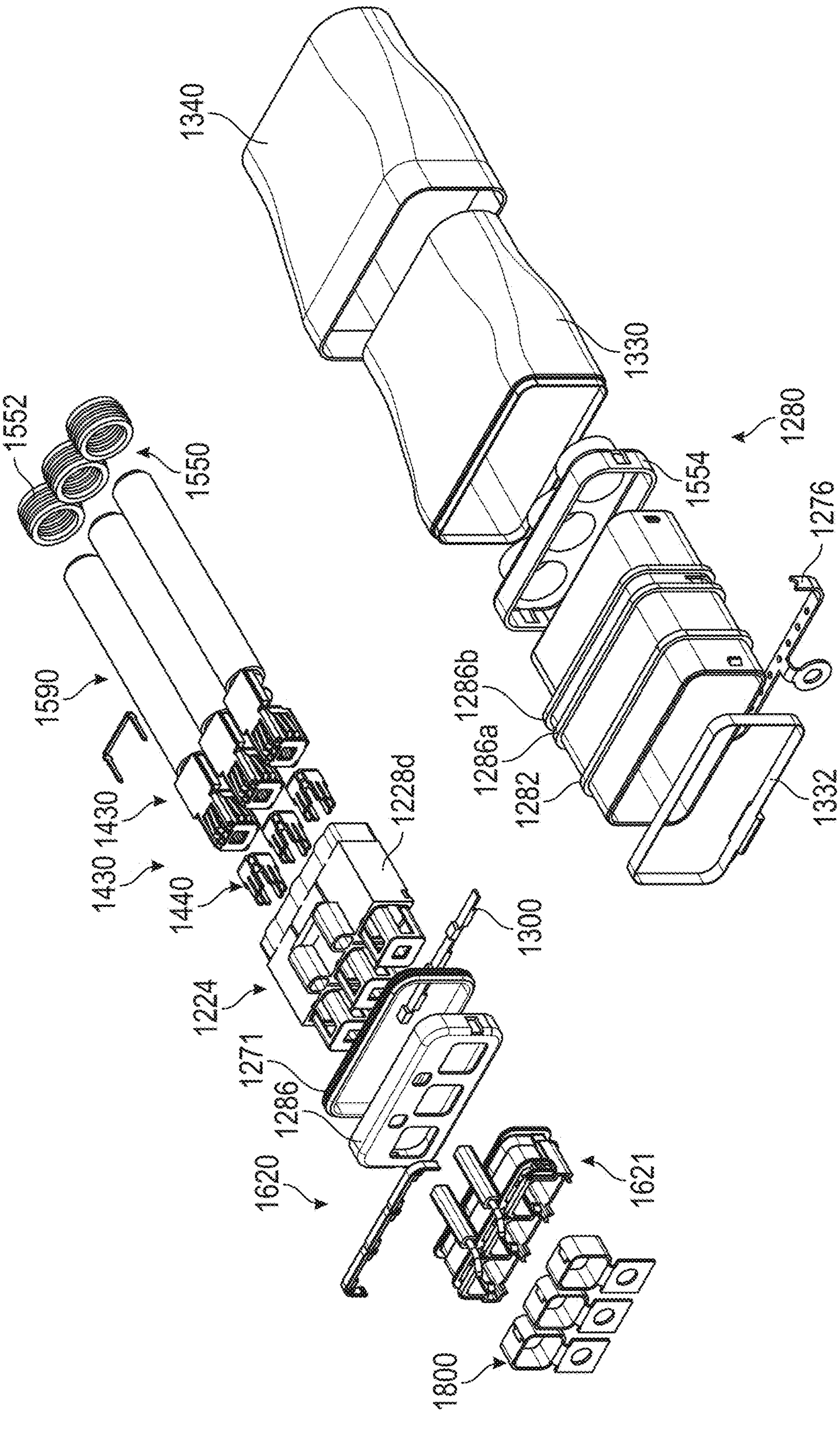
FIG. 47 is an exploded view of the shielded connector system of FIG. 46.

The shielding effectiveness of examples of these materials is shown in connection with FIGS. 44 and 45. Specifically, FIG. 45 shows a table of values for various materials that corresponds to the graph shown in FIG. 44. These graphs and tables shown the attenuation, as tested per ASTM D4935, for a 152 mm×152 mm×3 mm piece of material that contains: (i) various different polymers and other materials and (ii) 14% by weight of the 40% by weight of fibers which bundle contains 12K fibers. Here the fibers were either nickel carbon or stainless steel and the polymers were ABS, PA66, PC-ABS, PC, and PP. From this graph and table, it can be seen that a combination of PC-ABS/NiC provides an attenuation of about 115 dB at 1300 MHz. Overall, attenuation is one of the principal indicators for measuring the effectiveness of electromagnetic interference shielding. It refers to the difference between an electromagnetic signal’s intensity before shielding and its intensity after shielding. Attenuation is marked in decibels (dB) that correspond to the ratio between field strength with and without the presence of a protective medium. The decrease in a signal’s intensity, or amplitude, is usually exponential with distance, while the decibel range falls along a logarithmic scale. This means that an attenuation rating of 50 dB indicates a shielding strength ten times that of 40 dB.

In other embodiments, the direction of the fibers, strands, nanowires, nanotubes, sheets, or filaments may be aligned in a specific direction. This may be done by applying an electrical field to the conductive housing 250 during the manufacturing process. Also, the length and the thickness of the fibers, strands, nanowires, nanotubes, sheets, or filaments may be purposefully selected to maximize shielding effects. For example, it may be desirable to have longer and thinner fibers, strands, nanowires, nanotubes, sheets, or filaments mixed with shorter and thicker fibers, strands, nanowires, nanotubes, sheets, or filaments.

In other embodiments, the conductive material may include only a single type of additive component that is listed above. In other embodiments, the conductive material may include a combination of multiple additive components. For example, the conductive material may be comprised of i) the non-conductive thermoplastic(s), ii) a carbon based substance (e.g., between. 01%-10% by weight), iii) conductive polymer (e.g., between 1%-30% by weight) and iv) metal fibers (e.g., between 10%-60% by weight). In an alternative example, the conductive material may be comprised of: i) the non-conductive thermoplastic(s), ii) a carbon-based substance (e.g., between 1%-20% by weight), and iii) metal fibers (e.g., between 10%-80% by weight). In a further example, the conductive material may be comprised of: i) the non-conductive thermoplastic(s), ii) a carbon based substance (e.g., between 1%-20% by weight), and iii) conductive polymer (e.g., between 1%-30% by weight)). As discussed above, the orientation of these materials may be altered by applying a magnetic field during the formation of the conductive material.

In other embodiments, the external male housing 280 may be formed from non-conductive thermoplastics that are externally coated (e.g., cold spray or hot spray) with a conductive material (e.g., metal, carbon, conductive polymer, or other similar substances). In a further alternative embodiment, the external male housing 280 may be formed from a combination of one of the conductive materials that are listed above and an external coated (e.g., cold spray or hot spray) with a conductive material (e.g., metal, carbon, conductive polymer, or other similar substances).

In other embodiments, the components 270, 276, 280, 284, 286, 330, 340, 554, and 623 may have multiple levels of conductive material (e.g., up to 15 different layers of conductive material). For example, the external male housing 280 may be made from two layers of conductive plastic, wherein the inner material has the lowest amount of additive and the outer layer has a higher amount of additive. Alternatively, the external male housing 280 may be made from two layers of conductive plastic, wherein the outer material has the lowest amount of additive and the inner layer has a higher amount of additive. In another embodiment, the external male housing 280 may have three layers, wherein the inner and outer may have the same amount of additive; however, there may be secondary material (e.g., metal, air, or etc.) that is placed between the inner layer and the outer layer.

In other embodiments, the external male housing 280 may also include conductive material inlays that are molded into the external male housing 280. The conductive inlays may have lower resistance in comparison to the rest of the external male housing 280 and these inlays may be directly coupled to the casing 330 and/or the grounding leadframe 276. In further embodiments, components 270, 276, 280, 284, 286, 330, 340, 554, and 623 may be formed from a conductive metal, such as a stamped metal shield.

V. Alternative Embodiments Shown in FIGS. 46-47

Similar to the shielded connector system 100 that as described above in connection with FIGS. 1-43, FIGS. 46-47 show another embodiment of the connector system 1100. The connector system 1100 is very similar to the shielded connector system 100, except for a few minor changes (e.g., three male terminal assemblies 430 and their associated structures and an external female housing is not shown). Thus, for the sake of brevity, the above disclosure in connection with the shielded connector system 100 will not be repeated below. However, it should be understood that numbers that are separated by 1000 represent like structures. For example, the disclosure relating to male terminal assembly 430 applies in equal force to male terminal assembly 1430.

VI. Alternative Male Terminal Assemblies Shown in FIGS. 49-55

FIGS. 49-55 show alternative embodiments of the male terminal assemblies 430 that may be utilized in connection with the system 100 disclosed herein. It should be understood that these alternative embodiments have many features in common with the male terminal assembly that is disclosed herein. For example, all of these assemblies include a spring member that is positioned within a receiver that has contact arts. Thus, for the sake of brevity, the above disclosure in connection with the shielded connector system 100 will not be repeated below. Instead, additional detail about each of these assemblies is disclosed within PCT/US2019/36010, where: male terminal assembly 2430 is disclosed in connection with FIGS. 39-48, male terminal assembly 3430 is disclosed in connection with FIGS. 49-58, male terminal assembly 4430 is disclosed in connection with FIGS. 59-68, male terminal assembly 5430 is disclosed in connection with FIGS. 69-78, male terminal assembly 6430 is disclosed in connection with FIGS. 79-86, and male terminal assembly 7430 is disclosed in connection with FIGS. 87-96. It should be understood that the shielded connector system 100 may replace the male terminal assembly 430 described above with any one of these male terminal assemblies 2430, 3430, 4430, 5430, 6430, 7430, 8430. Accordingly, the disclosure of PCT/US2019/36010 is fully incorporated herein by reference. If such a replacement is made, it should be understood that the female terminal 800 and the interior extent of the male housing assembly 220 and the female housing assembly 620 will need to be modified to accept this alternative assembly.

VII. System Configuration

Figure 56:
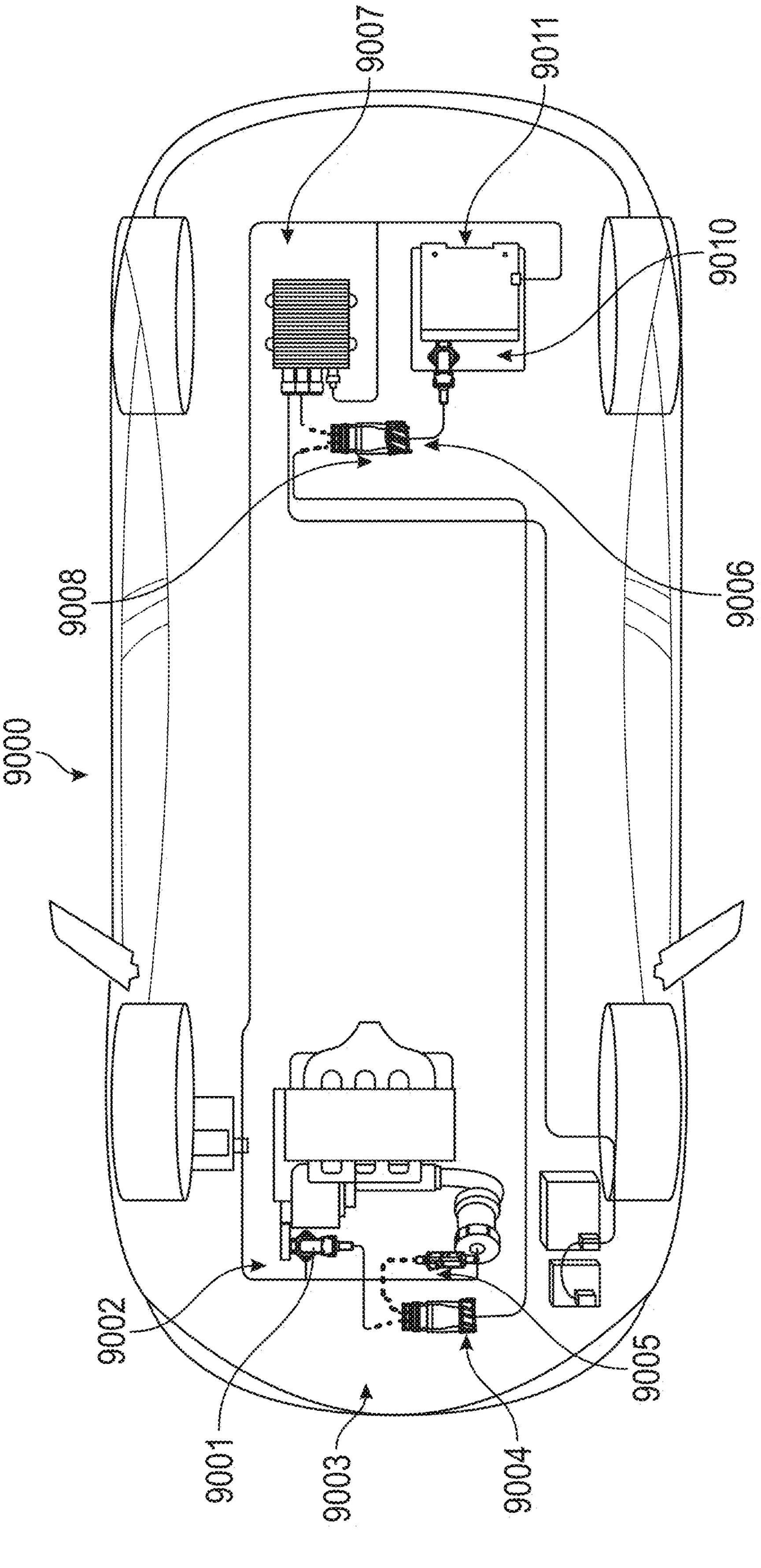
FIG. 56 is an exemplary motor vehicle environment where the first and second shielded connector systems may be utilized.

FIG. 56 provides a simplified electrical diagram of a motor vehicle 9000 that includes multiple connector systems. The motor vehicle 9000 includes: (i) a first connector system 9001 that is connected between an AC/DC converter 9002 and a second connector system 9003 that is connected to a power distribution box 9004, wherein the first and second connector system 9001, 9003 connect the AC/DC converter 9002 to the power distribution box 9004, (ii) a third connector system 9005 is connected to electrical supercharger 9007, wherein the second and third connector systems 9003, 9005 connect the power distribution box 9004 to the electrical supercharger 9007, (iii) a fourth connector system 9008 that is connected to DC/DC converter 9007, a second power distribution box 9006, and the first power distribution box 9004, and (iv) a fifth connector system 9010 that is connected to the second power distribution box 9006 and a 48-volt battery 9011. It should be understood that all or a subset of these connector systems may include a conductive housing the provides shielding capabilities.

Materials and Disclosure that are Incorporated by Reference

PCT Application Nos. PCT/US2019/36127, PCT/US2019/36070, PCT/US2019/36010, and PCT/US2018/019787 and U.S. patent application Ser. No. 16/194,891, each of which are fully incorporated herein by reference and made a part hereof.

SAE Specifications, including: J1742_201003 entitled, "Connections for High Voltage On-Board Vehicle Electrical Wiring Harnesses—Test Methods and General Performance Requirements," last revised in March 2010, each of which are fully incorporated herein by reference and made a part hereof.

ASTM Specifications, including: (i) D4935-18, entitled "Standard Test Method for Measuring the Electromagnetic Shielding Effectiveness of Planar Materials," and (ii) ASTM D257, entitled "Standard Test Methods for DC Resistance or Conductance of Insulating Materials," each of which are fully incorporated herein by reference and made a part hereof.

American National Standards Institute and/or EOS/ESD Association, Inc Specifications, including: ANSI/ESD STM11.11 Surface Resistance Measurements of Static Dissipative Planar Materials, each of which are fully incorporated herein by reference and made a part hereof.

DIN Specification, including Connectors for electronic equipment—Tests and measurements—Part 5-2: Current-carrying capacity tests; Test 5b: Current-temperature derating (IEC 60512-5-2:2002), each of which are fully incorporated herein by reference and made a part hereof.

USCAR Specifications, including: (i) SAE/USCAR-2, Revision 6, which was least revised in February 2013 and has ISBN: 978-0-7680-7998-2, (ii) SAE/USCAR-12, Revision 5, which was last revised in August 2017 and has ISBN: 978-0-7680-8446-7, (iii) SAE/USCAR-21, Revision 3, which was last revised in December 2014, (iv) SAE/USCAR-25, Revision 3, which was revised on March 2016 and has ISBN: 978-0-7680-8319-4, (v) SAE/USCAR-37, which was revised on August 2008 and has ISBN: 978-0-7680-2098-4, (vi) SAE/USCAR-38, Revision 1, which was revised on May 2016 and has ISBN: 978-0-7680-8350-7, each of which are fully incorporated herein by reference and made a part hereof.

Other standards, including Federal Test Standard 101C and 4046, each of which are fully incorporated herein by reference and made a part hereof.

INDUSTRIAL APPLICABILITY AND DEFINITIONS

The above disclosure may represent an improvement in the art because it improves the mechanical and electrical connection between a male connector assembly 200 and a female connector assembly 600. Such improvements include a shielded connector system 100 that is 70% lighter, 30-50% smaller, and 30-40% cheaper than conventional prior art connectors. In some embodiments, the male connector assembly 200 may have a height that is 38 mm, a length that is 74 mm, and a width that is 50 mm, while the female connector assembly 600 may have a height that is 21 mm, a length that is 28 mm, and a width that is 50 mm.

While some implementations have been illustrated and described, numerous modifications come to mind without significantly departing from the spirit of the disclosure; and the scope of protection is only limited by the scope of the accompanying claims. For example, the overall shape of the shielded connector system 100 may be changed to: a triangular prism, a pentagonal prism, a hexagonal prism, octagonal prism, sphere, a cone, a tetrahedron, a cuboid, a dodecahedron, a icosahedron, a octahedron, a ellipsoid, or any other similar shape. While the overall shape of the shielded connector system 100 may be altered, the shape of the male terminal assembly 430 and the female terminal 800 may not be altered to match the shape of the overall shielded connector system 100. For example, the shape of the shielded connector system 100 may be a hexagonal prism, while the male terminal assembly 430 and the female terminal 800 may be substantially cubic. In other embodiments, the shape of the male terminal assembly 430 may be changed to: a triangular prism, a pentagonal prism, a hexagonal prism, octagonal prism, sphere, a cone, a tetrahedron, a dodecahedron, a icosahedron, a octahedron, a ellipsoid, or any other similar shape. If the shape of the male terminal assembly 430 is altered to be any one of the above shapes, then it should be understood that the female terminal 800 may be altered to facilitate insertion, electrical connection, and extraction of the male terminal assembly 430 from the female terminal 800. Additionally, as described above, while the shape of the male terminal assembly 430 and the female terminal 800 may be altered, the overall shape of the shielded connector system 100 may not be altered to match the shape of the male terminal assembly 430.

The shielded connector system 100 may have any number of male terminal assemblies 430 and any number of female terminals 800. For example, the shielded connector system 100 may have: (i) X number of male terminal assemblies, wherein X can be any positive whole number, and Y number of female terminals 800, wherein Y is equal to X, or (ii) X number of male terminal assemblies, wherein X can be any positive whole number, and Y number of female terminals 800, wherein Y is not equal to X (e.g., multiple male terminal assemblies 430 may fit within a single female terminal 800). Preferably, the shielded connector system 100 has between 1 and 50 pairs of male terminal assemblies 430 and female terminals 800, preferably between 1 and 15 pairs of male terminal assemblies 430 and female terminals 800, more preferably between 1 and 8 pairs of male terminal assemblies 430 and female terminals 800, and most preferably between 1 and 4 pairs of male terminal assemblies 430 and female terminals 800. It should be understood these pairs of male terminal assemblies 430 and female terminals 800 may be arranged in any manner within the male housing assembly 220 and the female housing assembly 620. For example, four pairs of male terminal assemblies 430 and female terminals 800 may be organized into a cube format, wherein two pairs are on top and a two pairs are positioned directly below the top two pairs. It should further be understood that when multiple connectors are contained within the shielded connector system 100, the system designer may need to reduce the absolute current/voltage terminal to account for creepage.

In other embodiments, one or both of the rear spring wall 444 may be omitted. The spring member 440*a* may have a different configuration, such as: (i) having curvilinear shoulder disposed near the free end 446, (ii) having a wall that is positioned opposite of the rear wall and is connected to an extent of one of the spring fingers in order to limit movement of the free end 446, (iii) the width of the spring arms may be greater than the width of the middle sections, (iv) the width of the spring fingers may not match the width of the contact arms (e.g., spring fingers may be wider or narrower than the contact arms), (v) or any combination of these features.

In other embodiments, the male terminal body 472 may have a different configuration, such as: (i) the contact openings may not be linear (e.g. curvilinear), may be different lengths, may have different widths, may extend past where the contact arms intersect the side walls or may not span the entire length of each contact arm, (ii) the contact arms may not extent from the side walls at an outward angle, (iii) not gap may not be formed between the spring member and the contact arms, (iv) may be comprised of different materials (e.g., c151 is plated with (a) silver, (b) tin, (c) ss301, (d) other similar materials, or (e) a combination of a plurality of these materials).

Headings and subheadings, if any, are used for convenience only and are not limiting. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure.

The invention claimed is:

1. An electrical connector assembly for use in a high-power application that exposes the electrical connector assembly to elevated temperatures and thermal cycling, the electrical connector assembly comprising:

a first electrically conductive connector formed from a first material, the first electrically conductive connector having a side wall arrangement defining a receiver that extends from an open first end towards a second end, the side wall arrangement having at least one side wall with (i) a contact arm opening and (ii) a contact arm extending from a first portion of the at least one side wall, across an extent of the contact arm opening, and towards a second portion of the at least one side wall, and wherein the contact arm includes a free end that terminates inward of an outer surface of the at least one side wall;

an internal spring member formed from a second material and dimensioned to reside within the receiver of the first electrically conductive connector, the internal spring member having a base and at least one spring arm that extends from the base;

a second electrically conductive connector with a receptacle dimensioned to receive both the first electrically conductive connector and the internal spring member residing within the receiver of the first electrically conductive connector to define a connected position that withstands elevated temperatures and thermal cycling resulting from the high-power application;

wherein in the connected position, the at least one spring arm of the internal spring member exerts an outwardly directed force on the contact arm of the first electrically conductive connector to outwardly displace the contact arm into engagement with an inner surface of the receptacle of the second electrically conductive connector to maintain the first and second electrically conductive connectors in the connected position.

2. The electrical connector assembly of claim 1, wherein the first electrically conductive connector includes a plurality of contact arm and the internal spring member includes a plurality of spring arms, and wherein in the connected position, a first spring arm exerts a first outwardly directed force on a first contact arm to displace the first contact arm into engagement with the inner surface of the receptacle, and a second spring arm exerts a second outwardly directed force on a second contact arm to displace the second contact arm into engagement with said inner surface of the receptacle, the first outwardly directed force being oriented in a different direction than the second outwardly directed force.

3. The electrical connector assembly of claim 1, wherein the first material of the first electrically conductive connector is highly conductive copper, and wherein the second material of the internal spring member is spring steel.

4. The electrical connector assembly of claim 1, wherein the outwardly directed force exerted by the at least one spring arm is applied at the free end of the contact arm.

5. The electrical connector assembly of claim 1, wherein the outwardly directed force applied by the at least one spring arm on the contact arm in the connected position is increased by residual material memory and thermal expansion due to the elevated temperatures and thermal cycling resulting from the high-power, high-voltage application.

6. An electrical connector assembly for use in a power distribution application, the electrical connector assembly comprising:

a first male terminal assembly having:

(i) a first male terminal formed from a first material having a first conductivity, said first male terminal having a receiver and a contact arm, (ii) a first spring member formed from a second material having a second conductivity, said first spring member having a spring arm and dimensioned to reside within the receiver of the first male terminal, and (iii) wherein the spring arm underlies an extent of the contact arm and the first conductivity is greater than the second conductivity;

an internal male housing formed from a non-conductive material and having a receptacle, wherein an extent of said first male terminal resides within the receptacle whereby the internal male housing surrounds said extent of the first male terminal assembly; and an external male housing formed from a conductive material, wherein the external male housing surrounds an extent of both of the internal male housing and the first male terminal assembly.

7. The electrical connector assembly of claim 6, wherein the non-conductive material of the internal male housing has a surface resistivity that is greater than 10^12 ohms per square and the conductive material has a surface resistivity that is less than 10^12 ohms per square.

8. The electrical connector assembly of claim 6, wherein the conductive material of the internal male housing is a conductive plastic.

9. The electrical connector assembly of claim 6, wherein the external male housing includes a grounding projection that is configured to be placed into contact with an extent of a component contained within a vehicle to form a grounding circuit.

10. The electrical connector assembly of claim 9, wherein the grounding circuit has a resistivity that is less than 10 milli-ohms.

11. The electrical connector assembly of claim 6, further comprising a first female terminal with a receiver dimensioned to receive an extent of the first male terminal assembly to define a connected position.

12. The electrical connector assembly of claim 11, further comprising an internal female housing formed from the non-conductive material and having a receptacle, wherein an extent of said first female terminal resides within said receptacle whereby the internal female housing surrounds said extent of the first female terminal; and Wherein when the electrical connector assembly is in the connected position, an extent of the first spring member resides at least partially within each of: (i) the first male terminal, (ii) the first female terminal, (iii) the internal male housing, and (iv) the internal female housing.

13. The electrical connector assembly of claim 6, wherein during a process of coupling the first male terminal assembly to a female terminal, the external male housing is configured to be coupled to an extent of a component to form a grounding circuit prior to when an electrical connection between the first male terminal assembly and the female terminal is formed.

14. The electrical connector assembly of claim 6, further comprising an electrically conductive casing that surrounds at least an extent of the external male housing.

15. The electrical connector assembly of claim 6, further comprising:

a second male terminal assembly having:

(i) a second male terminal formed from the first material having the first conductivity, said second male terminal having a receiver and a contact arm, (ii) a second spring member formed from the second material having the second conductivity, said second spring member having a spring arm and dimensioned to reside within the receiver of the second male terminal, and (iii) wherein the spring arm underlies an extent of the contact arm; and wherein the external male housing surrounds an extent of the second male terminal assembly.

16. The electrical connector assembly of claim 15, wherein when the electrical connector assembly is subjected to certain operating conditions (i) an extent of the first spring member applies an outwardly directed force on an extent of the first male terminal, and (ii) an extent of the second spring member applies an outwardly directed force on an extent of the second male terminal.

17. An electrical connector assembly for use in a power distribution application, the electrical connector assembly comprising:

a first male terminal assembly having:

(i) a first male terminal formed from a first material and having a receiver, and (ii) a first spring member formed from a second material and dimensioned to reside within the receiver of the first male terminal;

a second male terminal assembly having:

(i) a second male terminal formed from the first material and having a receiver, and (ii) a second spring member formed from the second material and dimensioned to reside within the receiver of the second male terminal;

a male housing configured to surround an extent of both the first male terminal assembly and the second male terminal assembly; and wherein when the electrical connector assembly is subjected to certain operating conditions (a) an extent of the first spring member applies an outwardly directed force on an extent of the first male terminal, and (b) an extent of the second spring member applies an outwardly directed force on an extent of the second male terminal.

18. The electrical connector assembly of claim 17, wherein the first male terminal includes a contact arm having a free-end and the first spring member includes a spring arm that is placed in contact with the contact arm, and wherein a portion of the outwardly directed force exerted by the spring arm of the first spring member is applied by the spring arm to said free-end of the contact arm of the first male terminal.

19. The electrical connector assembly of claim 17, wherein the first male terminal has a rear wall and an arrangement of side walls defining the receiver with a frontal opening, wherein at least one side wall within the arrangement of side walls includes:

an opening formed through the at least one side wall;

a side wall portion that includes: (i) an intermediate segment positioned between the opening and the rear wall of the first male terminal and (ii) a side wall segment coupled to the intermediate segment and extending along the opening; and a contact arm extending (i) at an outward angle from the intermediate segment, (ii) along an extent of the opening, and (iii) towards a front extent of the first male terminal.

20. The electrical connector assembly of claim 17, wherein the first spring member includes a spring arm that lacks a curvilinear component.

21. The electrical connector assembly of claim 17, wherein the first male terminal further includes a front wall with a frontal opening formed therein; and wherein when the first male terminal is inserted into a first female terminal assembly to define a connected position, the frontal opening of the first male terminal receives a portion of the first female terminal assembly.

22. The electrical connector assembly of claim 17, further comprising:

a first internal housing positioned between the first male terminal assembly and the male housing; and a second internal housing positioned between the second male terminal assembly and the male housing.

23. The electrical connector assembly of claim 22, wherein the first and second internal housings are formed from a non-conductive material and the male housing is formed from a conductive material.

24. The electrical connector assembly of claim 17, further comprising both a first female terminal dimensioned to receive the first male terminal assembly and a second female terminal dimensioned to receive the second male terminal assembly; and a female housing configured to surround an extent of both of the first and second female terminals.

25. The electrical connector assembly of claim 24, wherein the female housing includes an internal angled wall that is configured to be placed in sliding engagement with an extent of the first male terminal assembly during a process of inserting said first male terminal assembly into the first female terminal assembly.

* * * * *